US012472248B2

(12) United States Patent
Matyas et al.

(10) Patent No.: US 12,472,248 B2
(45) Date of Patent: Nov. 18, 2025

(54) ANTIBODIES AGAINST FENTANYL AND FENTANYL ANALOGS

(71) Applicants: The Government of the United States, as represented by the Secretary of the Army, Fort Detrick, MD (US); THE UNITED STATES OF AMERICA, as represented by the SECRETARY, DEPARMENT OF HEALTH, Bethesda, MD (US)

(72) Inventors: Gary R. Matyas, Olney, MD (US); Rodell C. Barrientos, Rockville, MD (US); Oscar B. Torres, Rockville, MD (US); Connor Whalen, Cranberry Township, PA (US); Therese Oertel, Silver Spring, MD (US); Kenner C. Rice, Bethesda, MD (US); Arthur E. Jacobson, Rockville, MD (US); Eric W. Bow, Washington, DC (US); Agnieszka Sulima, Poolesville, MD (US)

(73) Assignees: The Government of the United States, as represented by the Secretary of the Army, Fort Detrick, MD (US); The United States of America, as represented by the Secretary, Department of Health Bethesda, MD, Washington, DC (US)

( * ) Notice: Subject to any disclaimer, the term of this patent is extended or adjusted under 35 U.S.C. 154(b) by 281 days.

(21) Appl. No.: 17/661,160

(22) Filed: Apr. 28, 2022

(65) Prior Publication Data
US 2022/0362374 A1 Nov. 17, 2022

Related U.S. Application Data

(60) Provisional application No. 63/181,826, filed on Apr. 29, 2021.

(51) Int. Cl.
*A61K 39/00* (2006.01)
*A61K 39/385* (2006.01)
*A61K 47/64* (2017.01)
*A61P 25/36* (2006.01)
*C07K 16/44* (2006.01)

(52) U.S. Cl.
CPC ........ *A61K 39/385* (2013.01); *A61K 39/0013* (2013.01); *A61K 47/6415* (2017.08); *A61K 47/646* (2017.08); *A61P 25/36* (2018.01); *C07K 16/44* (2013.01); *A61K 2039/505* (2013.01); *A61K 2039/55505* (2013.01); *A61K 2039/55572* (2013.01); *A61K 2039/6012* (2013.01); *A61K 2039/6037* (2013.01); *C07K 2317/24* (2013.01); *C07K 2317/565* (2013.01); *C07K 2317/76* (2013.01)

(58) Field of Classification Search
CPC .............. A61K 39/385; A61K 39/0013; A61K 47/6415; A61K 47/646; A61K 2039/505; A61K 2039/55505; A61K 2039/55572; A61K 2039/6012; A61K 2039/6037; A61P 25/36; C07K 16/44; C07K 2317/24; C07K 2317/565; C07K 2317/76; C07K 2317/33; C07K 2317/56; C07K 2317/622; C07K 2317/92; G01N 33/9486
See application file for complete search history.

(56) References Cited

U.S. PATENT DOCUMENTS

| 4,275,149 | A | | 6/1981 | Litman et al. | |
|---|---|---|---|---|---|
| 4,313,734 | A | | 2/1982 | Leuvering | |
| 4,373,932 | A | | 2/1983 | Gribnau et al. | |
| 4,816,567 | A | | 3/1989 | Cabilly et al. | |
| 4,954,452 | A | | 9/1990 | Yost et al. | |
| 5,223,409 | A | | 6/1993 | Ladner et al. | |
| 5,225,539 | A | | 7/1993 | Winter | |
| 5,855,885 | A | * | 1/1999 | Smith | C12N 9/0002 424/94.1 |
| 2011/0312505 | A1 | * | 12/2011 | Reddy | G16B 40/30 435/7.92 |
| 2018/0020677 | A1 | * | 1/2018 | Ambrose | A01N 63/27 504/117 |

FOREIGN PATENT DOCUMENTS

| WO | 199002809 | 3/1990 |
|---|---|---|
| WO | 199117271 | 11/1991 |
| WO | 199201047 | 1/1992 |
| WO | 199209690 | 6/1992 |

(Continued)

OTHER PUBLICATIONS

Chen, C et al. "Enhancement and destruction of antibody function by somatic mutation: unequal occurrence is controlled by V gene combinatorial associations." The EMBO journal vol. 14,12 (1995): 2784-94. doi:10.1002/j.1460-2075.1995.tb07278.x (Year: 1995).*

(Continued)

*Primary Examiner* — Jeffrey Stucker
*Assistant Examiner* — Katrina J. Campbell
(74) *Attorney, Agent, or Firm* — Timothy H. Van Dyke; Wolter Van Dyke; Davis, Pllc

(57) ABSTRACT

The present disclosure is directed to isolated recombinant antibodies, or antigen-binding fragments thereof, that bind to fentanyl or fentanyl analogs. The novel antibodies or antigen-binding fragments thereof can be used to detect, diagnose, treat, and/or prevent opioid use disorder.

14 Claims, 14 Drawing Sheets
Specification includes a Sequence Listing.

(56) References Cited

FOREIGN PATENT DOCUMENTS

| WO | 199215679 | | 9/1992 | |
|---|---|---|---|---|
| WO | 199218619 | | 10/1992 | |
| WO | 199220791 | | 11/1992 | |
| WO | 199301288 | A1 | 1/1993 | |
| WO | WO199301288 | * | 1/1993 | ........... C07K 14/005 |
| WO | 199633735 | A1 | 10/1996 | |
| WO | 199634096 | A1 | 10/1996 | |

OTHER PUBLICATIONS

Kussie, P H et al. "A single engineered amino acid substitution changes antibody fine specificity." Journal of immunology (Baltimore, Md. : 1950) vol. 152,1 (1994): 146-52. (Year: 1994).*

Illicit definition—Dictionary Definitions from Oxford Languages accessed from https://www.google.com/search?q=illicit+definition on Dec. 29, 2023. (Year: 2023).*

Capel, Peter J. A. et al., "Heterogeneity of human IgG Fc receptors", Immunomethods, 1994, vol. 4, pp. 25-34 (Year: 1994).*

Altschul, Stephen F. et al., "Basic local alignment search tool", J. Mol. Biol., 1990, vol. 215, pp. 403-410.

Barbas, Carlos F. et al., "In vitro evolution of a neutralizing human antibody to human immunodeficiency virus type 1 to enhance affinity and broaden strain cross-reactivity", Proc. Natl. Acad. Sci., Apr. 1994, vol. 91, pp. 3809-3813.

Bird, Robert E. et al., "Single-chain antigen-binding proteins", Reports, Oct. 21, 1988, vol. 242, pp. 423-426.

Capel, Peter J. A. et al., "Heterogeneity of human IgG Fc receptors", Immunomethods, 1994, vol. 4, pp. 25-34.

Chothia, Cyprus et al., "Structural repertoire of the human VH segments", J. Mol. Biol., 1992, vol. 227, pp. 799-817.

Clackson, Tim et al., "Making antibody fragments using phage display libraries", Nature, Aug. 15, 1991, vol. 253, pp. 624-628.

Devereux, John et al., "A comprehensive set of sequence analysis for the VAX", Nucleic Acids Research, 1984, vol. 12, No. 1, pp. 387-395.

Fischer, Rainer et al., "Molecular farming of pharmaceutical proteins", Transgenic Research, 2000, vol. 9, pp. 279-299.

Giddings, Glynis et al., "Transgenic plants as factories for biopharmaceuticals", Nature Biotechnology, Nov. 2000, vol. 18, pp. 1151-1155.

Gram, Hermann et al., "In vitro selection and affinity maturation of antibodies from a naive combinatorial immunoglobulin library", Proc. Natd. Acad. Sci, Apr. 1992, vol. 89, pp. 3576-3580.

Green, L.L. et al., "Antigen-specific human monoclonal antibodies from mice engineered with human Ig heavy and light chain YACs", Nature Genetics, May 1994, vol. 7, pp. 13-21.

Hiatt, Andrew et al., "Production of antibodies in transgenic plants", Nature, Nov. 2, 1989, vol. 342, pp. 76-78.

Huston, James S. et al., "Protein engineering of antibody binding sites: Recovery of specific activity in an anti-digoxin single-chain Fv analogue produced in *Escherichia coli*", Proc. Natl. Acad. Sci., Aug. 1988, vol. 85, pp. 5879-5883.

Kohler, G. et al., "Continuous cultures of fused cells secreting antibody of predefined specificity", Nature, Aug. 7, 1975, vol. 256, pp. 495-497.

Lefranc, Marie-Paule et al., "IMGT unique numbering for immunoglobulin and T cell receptor variable domains and Ig superfamily V-like domains", Developmental and Comparative Immunology, 2003, vol. 27, pp. 55-77.

Marks, James D. et al., "By-passing Immunization Human Antibodies from V-gene Libraries Displayed on Phage", J. Afoz. Riol. 1991, vol. 222, pp. 581-597.

Muller, Rolf., "Determination of Affinity and Specificity of Anti-Hapten Antibodies by Competitive Radioimmunoassay", Methods in Enzymology, 1983, vol. 92, pp. 589-601.

Nallet, Sophie et al., "Glycan variability on a recombinant IgG antibody transiently produced in HEK-293E cells", New Biotechnology, May 2012, vol. 29, No. 4, pp. 471-476.

Schier, Robert et al., "Isolation of Picomolar Affinity Anti-c-erbB-2 Single-chain Fv by Molecular Evolution of the Complementarity Determining Regions in the Center of the Antibody Binding Site", J. Mol. Biol., 1991, vol. 263, pp. 551-567.

Smith, George P., "Filamentous Fusion Phage: Novel Expression Vectors That Display Cloned Antigens on the Virion Surface", Science, Jun. 14, 1985, vol. 228, pp. 1315-1317.

Tomlinson, Ian M. et al., "The structural repertoire of the human VK domain", The EMBO Journal, 1995, vol. 14, No. 18, pp. 4628-4638.

Torres, Oscar B. et al., "A simple nonradioactive method for the determination of the binding affinities of antibodies induced by hapten bioconjugates for drugs of abuse", Anal Bioanal Chem., 2016, vol. 408, pp. 1191-1204.

Ward, E. Sally et al., "Binding activities of a repertoire of single immunoglobulin variable domains secreted from *Escherichia coli*", Nature, Oct. 12, 1989, vol. 341, pp. 544-546.

Wilson, Nana et al., "Drug and Opioid-Involved Overdose Deaths—United States, 2017-2018", Morbidity and Mortality Weekly Report, Mar. 20, 2020, vol. 69, No. 11, pp. 290-297.

* cited by examiner a)

b)

ANTIBODIES AGAINST FENTANYL AND FENTANYL ANALOGS

This application claims priority from U.S. provisional patent application 63/181,826, filed Apr. 29, 2021, the contents of which are hereby incorporated by reference, in their entirety.

STATEMENT REGARDING FEDERALLY SPONSORED RESEARCH OR DEVELOPMENT

This invention was made with government support under 1DP1DA034787 and 1UG3DA048351 awarded by the National Institutes of Health, and under W81XWH-07-2-067 awarded by the Department of Defense. The government has certain rights in the invention.

REFERENCE TO SEQUENCE LISTING SUBMITTED VIA EFS-WEB

This application includes an electronically submitted sequence listing in .txt format. The .txt file contains a sequence listing entitled "15969015USO_ST25" created on Jul. 11, 2022 and is 15 kilobytes in size. The sequence listing contained in this .txt file is part of the specification and is hereby incorporated by reference herein in its entirety.

FIELD

This invention relates generally to isolated recombinant antibodies and antigen-binding fragments thereof against fentanyl and fentanyl analogs and methods of using the same for detecting, diagnosing, preventing, and/or treating fentanyl- or fentanyl analog-related opioid use disorder.

BACKGROUND

Opioid use disorders and an epidemic of fatal overdose due to the illicit use of heroin and fentanyl are a growing concern worldwide. According to the CDC, among the 100,306 overdose deaths reported in the 12-month period ending in April 2021, 75% were due to synthetic opioids, mostly fentanyl and its analogs.

Fatal respiratory depression is the primary hazard of these compounds. Fentanyl is 35-50 times more potent as an analgesic than heroin. Because of its potency, ease of manufacturing, and low cost, fentanyl has been used to lace other illicit substances of abuse. Alarmingly, highly potent fentanyl analogs such as carfentanil, cyclopropyl fentanyl, (±)-cis-3-methyl fentanyl, and furanyl fentanyl have been used as adulterants in illicit drugs, which have resulted in many fatal overdose cases (Drummer, 2018 Forensic Sci Prog 4: 95-110).

Currently available FDA approved medication for opioid overdose include use of small molecule agonists and antagonists of opioid receptors and include naltrexone, methadone and buprenorphine used alone or in combination with naloxone. These small molecules have no effect on individuals who have no prior exposure to opioids in their system and may also cause withdrawal symptoms in opioid-dependent individuals. Furthermore, multiple doses of naloxone might be required for stronger opioids such as fentanyl. There is an unmet need for developing novel approaches such as the utilization of anti-opioid (anti-fentanyl) antibodies for passive immunization. The advantage of passive immunization using antibodies against fentanyl is the immediate sequestration of fentanyl in peripheral blood.

SUMMARY

We recently reported an efficacious vaccine candidate against fentanyl in mice. (Barrientos, et al., Novel vaccine that blunts fentanyl effects and sequesters ultrapotent fentanyl analogues. Mol Pharm. 2020; 17(9):3447-60. doi: 10.1021/acs. molpharmaceut.0c00497) This vaccine, called TT-para-AmFenHap/ALF43A, (FIG. 3a) elicited a high titer of drug-specific antibodies that cross-reacted with fentanyl, fentanyl analogs, but not with drugs used for OUD therapy. Using the same animal model, we developed the chimeric mAbs described herein. Each chimeric mAb is composed of the constant domain of human IgG and the variable domains derived from mouse IgG.

The present disclosure is directed to antibodies, or antigen-binding fragments thereof, that bind with high affinity and specificity to fentanyl and fentanyl analogs. The present invention is also directed to methods of using the antibodies and antibody fragments thereof, such as methods on sequestering fentanyl and fentanyl analogs, methods of treatment, methods of prevention, methods of diagnosis, and pharmaceutical compositions for use in the treatment of opioid use disorder.

The present invention also relates to nucleic acids encoding the antibodies and antibody fragments thereof of the present invention, including vectors and host cells containing the nucleic acids.

The antibodies described herein that bind to fentanyl and fentanyl analogs can be used in a variety of research and medical applications. For example, the disclosure provides compositions comprising any of the antibodies disclosed herein that bind to fentanyl or fentanyl analogs and their use for detecting fentanyl and analogs in various samples or preventing and treating opioid use disorder in humans.

BRIEF DESCRIPTION OF THE DRAWINGS

The accompanying drawings, which are incorporated in and constitute a part of this specification, illustrate certain embodiments, and together with the written description, serve to explain certain principles of the compositions and methods disclosed herein.

DETAILED DESCRIPTION

Figure 1:
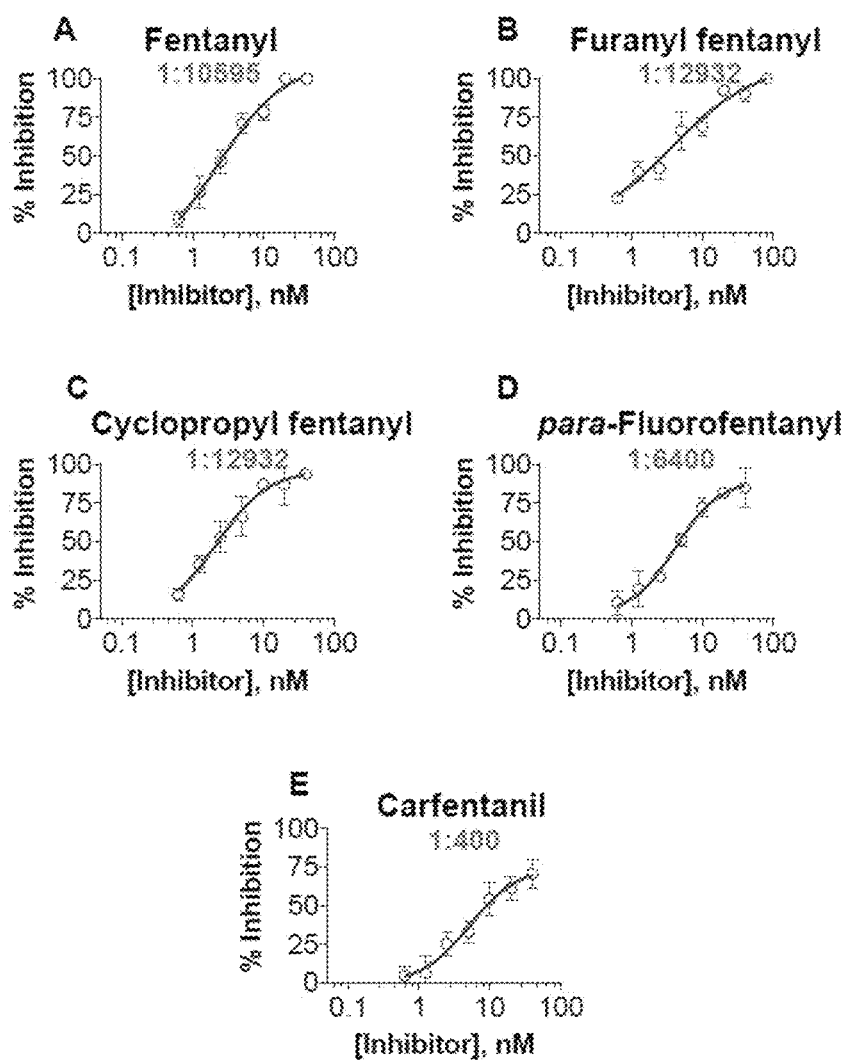
FIG. 1 depicts competitive inhibition curves of fentanyl and fentanyl analogs for the determination of $IC_{50}$ and $K_d$. Post-immune sera (week 16) were incubated with 5 nM of isotopically labeled drugs and dialyzed against buffer containing 0 to 40 nM of their unlabeled versions in an equilibrium dialysis plate. Drug levels in the sample and buffer chambers were quantified after 24 h and fraction bound was calculated. Data shown are mean±SEM.
Figure 2:
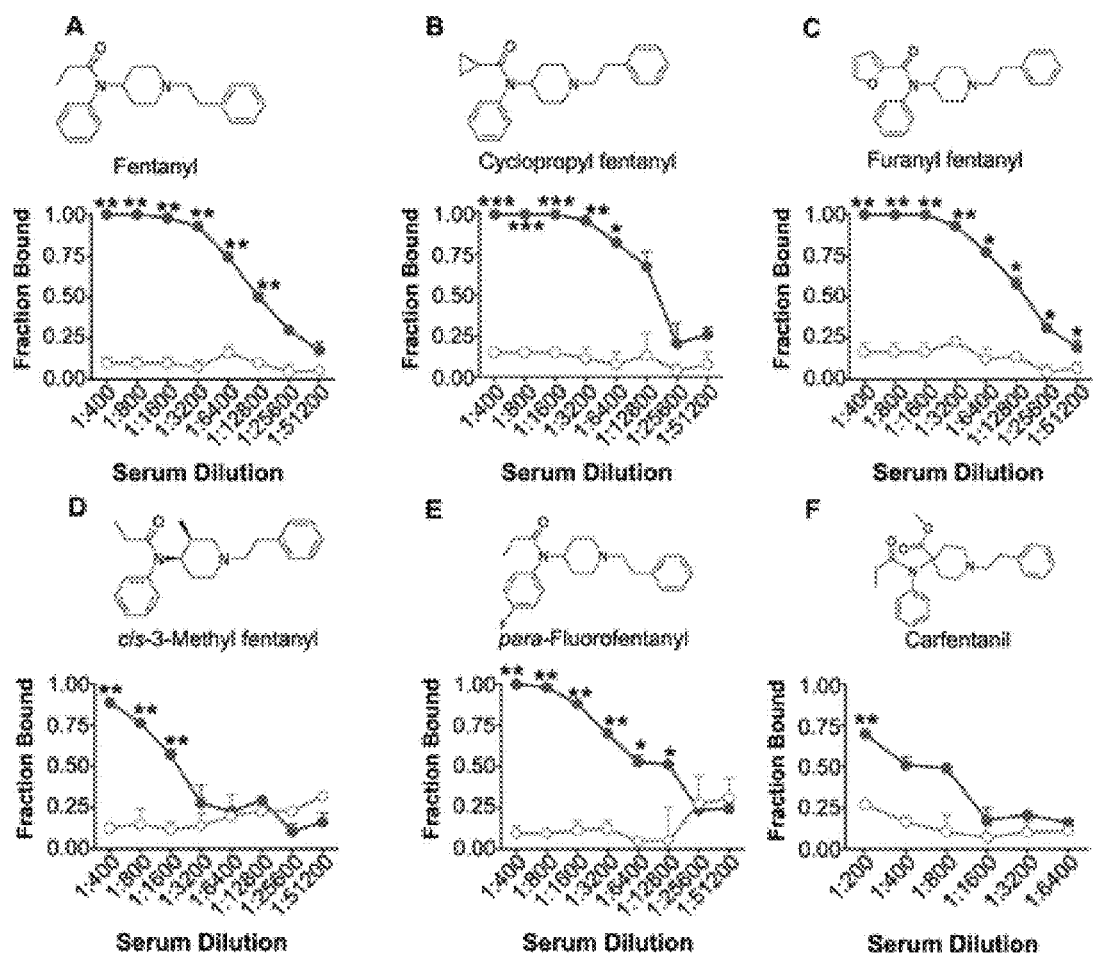
FIG. 2 depicts serum binding of fentanyl and fentanyl analogs. Preimmune sera (week 0, line with open circle) and postimmune sera (week 16, line with solid circle) were diluted with a buffer that contained 5 nM of indicated drugs and dialyzed against buffer in an ED plate. Drug levels in the sample and buffer chambers were quantified after 24 h, and fraction bound was calculated. (A) Fentanyl. (B) Cyclopropyl fentanyl. (C) Furanyl fentanyl. (D) cis-3-Methyl fentanyl. (E) para-Fluorofentanyl. (F) Carfentanil. Data shown are mean±standard error of the mean (SEM) of triplicate determinations. Statistical comparisons (preimmune vs postimmune sera) were performed using paired t-test (*, p<0.0001; , p<0.001; *, p<0.010; the absence of asterisk indicates that the difference is not significant).

References are to be made in detail to various exemplary embodiments, examples of which are illustrated in the accompanying drawings. It is to be understood that the following detailed description is provided to give the reader a fuller understanding of certain embodiments, features, and details of aspects of the disclosure, and should not be interpreted as a limitation of the scope of the disclosure.

Definitions

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

The term "antibody" or "antibodies" as used in this disclosure refers to an immunoglobulin or an antigen-binding fragment thereof. As will be understood by those in the art, the immunological binding reagents encompassed by the term "antibody" or "antibodies" extend to all antibodies from all species, and antigen binding fragments thereof and include, unless otherwise specified, polyclonal, monoclonal, monospecific, bispecific, polyspecific, humanized, human, camelised, mouse, non-human primates, single-chain, chimeric, synthetic, recombinant, hybrid, mutated, CDR-grafted, and in vitro generated antibodies. The antibody can include a constant region, or a portion thereof, such as the kappa, lambda, alpha, gamma, delta, epsilon and mu constant region genes. For example, heavy chain constant regions of the various isotypes can be used, including: $IgG_1$, $IgG_2$, $IgG_3$, $IgG_4$, IgM, $IgA_1$, $IgA_2$, IgD, and IgE. By way of example, the light chain constant region can be kappa or lambda.

The terms "antigen-binding domain" and "antigen-binding fragment" refer to a part of an antibody molecule that comprises amino acids responsible for the specific binding between antibody and antigen. For certain antigens, the antigen-binding domain or antigen-binding fragment of an antibody molecule may only bind to a part of the antigen. The part of the antigen that is specifically recognized and bound by the antibody is referred to as the "epitope" or "antigenic determinant" Antigen-binding domains and antigen-binding fragments include Fab (Fragment antigen-binding); a $F(ab')_2$ fragment, a bivalent fragment having two Fab fragments linked by a disulfide bridge at the hinge region; Fv fragment; a single chain Fv fragment (scFv) (see e.g., Bird et al. (1988) Science 242:423-426; and Huston et al. (1988) Proc. Natl. Acad Sci. USA 85:5879-5883): a Fd fragment having the two $V_H$ and $C_H1$ domains; dAb (Ward et al., (1989) Nature 341:544-546), and other antibody fragments that retain antigen-binding function. The Fab fragment has $V_H$-$C_H1$ and $V_L$-$C_L$ domains covalently linked by a disulfide bond between the constant regions. The $F_v$ fragment is smaller and has $V_H$ and $V_L$ domains non-covalently linked. To overcome the tendency of non-covalently linked domains to dissociate, a $scF_v$ can be constructed. The $scF_v$ contains a flexible polypeptide that links (1) the C-terminus of $V_H$ to the N-terminus of $V_L$, or (2) the C-terminus of $V_L$ to the N-terminus of $V_H$. These antibody fragments are obtained using conventional techniques known to those with skill in the art, and the fragments are evaluated for function in the same manner as are intact antibodies.

The terms "reduce," "inhibit," "diminish," "suppress," "decrease," "prevent" and grammatical equivalents (including "lower," "smaller," etc.) when in reference to the expression of any symptom in an untreated subject relative to a treated subject, signify that the quantity and/or magnitude of the symptoms in the treated subject is lower than in the untreated subject by any amount or degree that is recognized as clinically relevant by any medically trained personnel.

The terms "treatment of a opioid use disorder" or "treating a opioid use disorder" and the like refer to any treatment of any disorder or condition in a subject caused by a opioid use and includes preventing and/or treating an overdose condition or symptom of overdose, e.g., arresting its development and/or delaying or treating and/or preventing its onset or manifestation in the subject; relieving an illness, disorder, condition, or symptom related to opioid abuse, e.g., causing regression of the condition or disorder and/or one or more of its symptoms related to opioid use or treating and/or preventing or reducing the recurrence or relapse of a disorder, condition, or symptom related to opioid use disorder.

The term "administered" or "administering." as used herein, refers to any method of providing a composition to a patient such that the composition has its intended effect on the patient. An exemplary method of administering is by a direct mechanism such as, local tissue administration (i.e., for example, extravascular placement), oral ingestion, transdermal patch, topical, inhalation, suppository, etc.

The terms "treatment" or "treating" and the like refer to any treatment of any illness, disorder or condition in a mammal, e.g. particularly a human, and includes inhibiting a disorder, condition, or symptom of a disease or condition, e.g., arresting its development and/or delaying its onset or manifestation in the patient or relieving an illness, disorder, condition, or symptom of an illness, disorder or condition, e.g., causing regression of the condition or disorder, illness and/or its symptoms.

The term "patient," as used herein, is an animal, such as, for example, a mammal, such as, for example, a human that need to be or not be hospitalized. For example, out-patients and persons in nursing homes are "patients," A patient may comprise any age of a human or non-human animal and therefore includes both adult and juveniles (i.e., children). It is not intended that the term "patient" connote a need for medical treatment, therefore, a patient may voluntarily or involuntarily be part of experimentation whether clinical or in support of basic science studies.

The term "subject," as used herein, refers to a vertebrate, preferably a mammal, more preferably a primate, still more preferably a human. Mammals include, without limitation, humans, primates, wild animals, feral animals, farm animals, sports animals and pets. Examples of non-human mammals include horse, donkey, pig, mouse, rat, hamster, monkey and chicken. The subject may be a juvenile or an adult.

In the present context, the term "therapeutically effective" or "effective amount" indicates that the materials or amount of material is effective to prevent, alleviate, or ameliorate one or more symptoms of an illness, disease or medical condition, and/or to prolong the survival of the subject being treated. The therapeutically effective amount will vary depending on the antibody or other co-administered therapeutics, the disorder or condition and its severity and the age, weight, etc., of the mammal to be treated. For example, an effective amount is an amount sufficient to effectuate a beneficial or desired clinical result.

The term "opioid use disorder" refers to a chronic disorder associated with problematic pattern of opioid use that causes clinically significant distress or impairment.

The term "opioids" refers to a class of drugs that include heroin, synthetic opioids, such as fentanyl, and pain relievers, such as oxycodone, hydrocodone, codeine, morphine, and many others.

The term "fentanyl analog" refers to a molecule, such as carfentanil, cyclopropyl fentanyl, (±)-cis-3-methyl fentanyl, para-fluorofentanyl, furanyl fentanyl or the like, that has been designed to mimic the pharmacological effects of fentanyl.

The terms "subject," "host," "patient," and "individual" are used interchangeably herein to refer to any mammalian subject for whom diagnosis or therapy is desired, particularly humans.

The term "pharmaceutically acceptable excipient" means solvents, diluents, dispersion media, coatings, isotonic agents, solid and liquid fillers, and the like, that are suitable for administration into a human. The use of such media and agents for pharmaceutically active substances is well known in the art.

The term "human antibody" refers to an antibody having variable and/or constant regions corresponding substantially to human germline immunoglobulin sequences. A human antibody may also include amino acid residues not encoded by human germline immunoglobulin sequences (e.g., mutations introduced by random or site-specific mutagenesis in vitro or by somatic mutation in vivo), for example in the CDRs, and in particular, CDR3.

The term "recombinant antibody" refers to an antibody produced or expressed using a recombinant expression vector, where the expression vector comprises a nucleic acid encoding the recombinant antibody, such that introduction of the expression vector into an appropriate host cell or transgenic animal results in the production or expression of the recombinant antibody.

As is known in the art, recombinant antibodies, are not merely proteins isolated from a human donor, but are proteins that are produced in a host cell or transgenic animal. Appropriate host cells and suitable transgenic animals for production of the antibodies of the disclosure are described in Gene Expression Systems, Academic Press, eds. Fernandez et al., 1999. Suitable production hosts include yeast, mammalian, bacterial or insect cells or transgenic animals such as transgenic Drosophila or mice. The recombinant antibodies of the disclosure are glycosylated. The amount of glycosylation by weight for the IgG, IgM, IgA, IgD and IgE is typically about 3%, 12%, 10%, 13% and 12%, respectively. The glycosylation pattern of a recombinant human protein varies from the glycosylation pattern of its natural human protein counterpart since glycosylation is dependent upon the type of host cell or organism used to express the recombinant protein.

As is also known in the art, the glycosylation patterns of recombinant antibodies are not the same as those of any existing natural counterparts, even when the antibodies are expressed in human cells (see Nallet et al., New Biotechnology, 2012, 29: 471-476, who report that IgG expressed in a human embryonic kidney cell line results in similar, but not identical, glycosylation patterns in comparison to those expressed in humans. Further, Luac et al., Biochimica et Biophysica Acta, 2015, 1860: 1574-1582 report that variation in glycosylation patterns for IgG differ between and within humans. Accordingly, the recombinant monoclonal antibodies of the instant disclosure may be structurally distinguishable from antibodies obtained from human donors.

The term "isolated antibody." refers to an antibody that is substantially free of its natural environment, including other antibodies having different antigenic specificities. For example, an isolated antibody may refer to an antibody that specifically binds fentanyl or a fentanyl analog. An isolated antibody may also be substantially free of antibodies that specifically bind to other opioids. The isolated antibody may be combined with one or more antibodies of the present disclosure.

The term "isolated nucleic acid," as used in the context of a nucleic acid encoding an antibody, or antigen-binding fragment thereof, refers to a nucleic acid molecule in which the nucleotide sequences encoding the antibody, or antigen-binding fragment thereof, are free of other nucleotide sequences encoding antibodies or portions thereof that bind antigens other than fentanyl or a fentanyl analog, which other sequences may naturally flank the nucleic acid in human genomic DNA. Thus, for example, an isolated nucleic acid encoding a VH region of a fentanyl antibody contains no other sequences encoding other VH regions that bind antigens other than fentanyl or fentanyl analog.

The term "identity," as known in the art, is a relationship between two or more polypeptide sequences or two or more polynucleotide sequences, as determined by comparing the sequences. In the art, "identity" also means the degree of sequence relatedness between polypeptide or polynucleotide sequences, as determined by the match between strings of such sequences. "Identity" and "similarity" can be readily calculated by known methods, including, but not limited to, those described in Computational Molecular Biology. Lesk, A. M., ed., Oxford University Press, New York, 1988; Biocomputing. Informatics and Genome Projects, Smith, D. W., ed., Academic Press, New York, 1993: Computer Analysis of Sequence Data. Part I. Griffin. A. M., and Griffin. H. G., eds., Humana Press, New Jersey, 1994; Sequence Analysis in Molecular Biology, von Heinje, G., Academic Press, 1987; and Sequence Analysis Primer, Gribskov, M. and Devereux, J., eds., M Stockton Press, New York, 1991, and Carillo, H., and Lipman, D., Siam J. Applied Math., 48:1073 (1988).

Typical methods to determine identity are designed to give the largest match between the sequences tested. Methods to determine identity and similarity are codified in publicly available computer programs. Typical computer program methods to determine identity and similarity between two sequences include, but are not limited to, the GCG program package (Devereux, J., et al., Nucleic Acids Research 12(1): 387 (1984)), BLASTP, BLASTN, and FASTA (Atschul, S. F. et al., J. Molec. Biol. 215:403-410 (1990). The BLAST X program is publicly available from NCBI and other sources (BLAST Manual, Altschul, S., et al., NCBINLM NIH Bethesda, Md. 20894: Altschul, S., et al., J. Mol. Biol. 215:403-410 (1990). The well-known Smith Waterman algorithm may also be used to determine identity. IgBlast may also be used to determine germline V, D and J gene matches to a query sequence, which is available on the world wide web at ncbi.nlm.nih.gov/igblast/. VBASE2 database (www.vbase2.org) may also be used for defining designated complementary determining regions (CDRs) of light and heavy chain of isolated immunoglobulin genes.

The term "preventing" or "prevention" refers to a reduction in risk of acquiring or developing an illness, disease or disorder (i.e., causing at least one of the clinical symptoms of the disorder or disease not to be developed) in a subject that is exposed to an opioid or may become exposed to an opioid such fentanyl or fentanyl analogs.

The term "prophylaxis" is related to "prevention" and refers to a measure or procedure with a purpose of prevention, rather than to treating or curing a disease.

Antibodies

Antibodies, also known as immunoglobulins, are typically tetrameric glycosylated proteins composed of two light (L) chains of approximately 25 kDa each and two heavy (H) chains of approximately 50 kDa each. Two types of light chain, termed lambda and kappa, may be found in an antibody. Depending on the amino acid sequence of the constant domain of heavy chains, immunoglobulins can be assigned to five major classes: A, D, E, G, and M, and several of these may be further divided into subclasses (isotypes), e.g., IgG1, IgG2, IgG3, IgG4, IgA1, and IgA2. Each light chain includes a variable (V) domain (VL) and a constant (C) domain (CL). Each heavy chain includes a V domain (VH), three or four C domains (CHs), and a hinge region. The CH domain most proximal to VH is designated as CH1. The VH and VL domains consist of four regions of relatively conserved sequences called framework regions (FR1, FR2, FR3, and FR4), which form a scaffold for three regions of hypervariable sequences termed complementarity determining regions (CDRs). The CDRs contain most of the residues responsible for specific interactions of the antibody with the antigen. CDRs are referred to as CDR1, CDR2, and CDR3. Accordingly. CDR constituents on the heavy chain are referred to as H1, H2, and H3, while CDR constituents on the light chain are referred to as L1, L2, and L3. Identification and numbering of framework and CDR residues is as described by Chothia et al., Structural determinants in the sequences of immunoglobulin variable domain. J Mol Biol 1998, 278:457-79, which is hereby incorporated by reference in its entirety. CDR3 is typically the greatest source of molecular diversity within the antibody-binding site. H3, for example, can be as short as two amino acid residues or greater than 26 amino acids. The subunit structures and three-dimensional configurations of different classes of immunoglobulins are well known in the art. For a review of the antibody structure, see Antibodies: A Laboratory Manual, Cold Spring Harbor Laboratory, eds. Harlow et al., 1988. One of skill in the art will recognize that each subunit structure, e.g., a CH, VH, CL, VL, CDR, FR structure, comprises active fragments, e.g., the portion of the VH, VL, or CDR subunit the binds to the antigen, i.e., the antigen-binding fragment, or, e.g., the portion of the CH subunit that binds to and/or activates, e.g., an Fc receptor and/or complement. The CDRs typically refer to the Kabat CDRs, as described in Sequences of Proteins of Immunological Interest, US Department of Health and Human Services (1991), eds. Kabat et al. Another standard for characterizing the antigen binding site is to refer to the hypervariable loops as described by Chothia. See, e.g., Chothia, D. et al. (1992) J. Mol. Biol. 227:799-817; and Tomlinson et al. (1995) EMBO J. 14:4628-4638. Still another standard is the AbM definition used by Oxford Molecular's AbM antibody modeling software. See, generally. e.g., Protein Sequence and Structure Analysis of Antibody Variable Domains. In: Antibody Engineering Lab Manual (Ed.: Duebel, S. and Kontermann, R., Springer-Verlag, Heidelberg). Embodiments described with respect to Kabat CDRs can alternatively be implemented using similar described relationships with respect to Chothia hypervariable loops or to the AbM-defined loops. Another standard for residue numbering that can be used is IMGT (Lefranc et al., Dev & Comp Immunol, 27(1):55-77 (2003).

The Fab fragment (Fragment antigen-binding) consists of $V_H$-$C_H$1 and $V_L$-$C_L$ domains covalently linked by a disulfide bond between the constant regions. The Fv fragment is smaller and consists of $V_H$ and $V_L$ domains non-covalently linked. To overcome the tendency of non-covalently linked domains to dissociate, a single chain Fv fragment (scFv) can be constructed. The scFv contains a flexible connector, usually a polypeptide, that links (1) the C-terminus of $V_H$ to the N-terminus of $V_L$, or (2) the C-terminus of $V_L$ to the N-terminus of $V_H$.

In addition, protein engineering can recombinantly generate variable regions or graft or conjugate variable region sequences on a multi-domain and multi-function protein. Such proteins can have specific antigen binding properties, but are not typically referred to as monoclonal antibodies per se. Protein engineering can also be used to produce recombinant, polyclonal, bispecific, bivalent, multivalent and heteroconjugate antibodies.

It is also possible to modify an antibody to increase productivity and functionality and/or when relevant, to decrease possible immunogenicity. In addition, monoclonal antibodies may be modified at either the DNA sequence level to improve expression by removing hairpins or other secondary structure, by optimizing codon utilization, or at the amino acid level to improve expression or stability. For example, it is possible to remove residues such as unpaired cysteines to reduce aggregation, to alter glycosylation sites, or to substitute residues prone to deamidation or oxidization.

It may also be desirable to modify an antibody to improve effector function, e.g., so as to enhance antigen-dependent cell-mediated cytotoxicity (ADCC) and/or complement dependent cytotoxicity (CDC) of the antagonist. One or more amino acid substitutions or the introduction of cysteine in the Fc region may be made, thereby improving internalization capability and/or increased complement-mediated cell killing and ADCC. See Caron et al., J. Ex. Med. 176:1191-1195 (1991) and Shopes, B. J. Immunol. 148: 2918-2022 (1992), incorporated herein by reference in their entirety. An antibody fusion protein may be prepared that has dual Fc regions with both enhanced complement lysis and ADCC capabilities. Typical Fc receptors that bind to an Fc region of an antibody (e.g., an IgG antibody) include, but are not limited to, receptors of the FcγRII, and FcγRIII and FcRn and FcRn subclasses, including allelic variants and alternatively spliced forms of these receptors. Fc receptors are reviewed in Ravetch and Kinet, Annu. Rev. Immunol 9:457-92, 1991; Capel et al., Immunomethods 4:25-34, 1994; and de Haas et al., J. Lab. Clin. Med. 126:330-41, 1995). It is also possible to couple or join an antibody to another agent, such as a cytotoxic agent, drug, or therapeutic.

In order to avoid possible effects due to antibody dependent enhancement (ADE), the Fc-binding domain of monoclonal antibodies may be mutated to prevent uptake into immune cells. Such mutations include those that abrogate the binding of antibodies to Fcγ receptors, such as LALA (L234A L235A), LALA-PG (L234A L235A P329G), and elimination of the glycosylation site at N297.

Anti-fentanyl antibodies described in this application may optionally comprise antibody constant regions, such as human constant regions, or parts thereof. For example, a VL domain may be attached at its C-terminal end to a light chain constant domain like $C_κ$ or $C_λ$. Similarly, a VH domain or portion thereof may be attached to all or part of a heavy chain like IgA, IgD, IgE, IgG, and IgM, and any isotype subclass. Constant regions are known in the art (see, for example, Kabat et al., Sequences of Proteins of Immunological Interest, No. 91-3242, National Institutes of Health Publications, Bethesda, MD (1991)).

In some embodiments, the constant region is a human constant region. Typically, the source of the heavy chain variable domain and the light chain variable domain is different from the source of the human constant region. For example, using recombinant technology, the antibodies of the disclosure can include any human constant region of interest.

Figure 3:
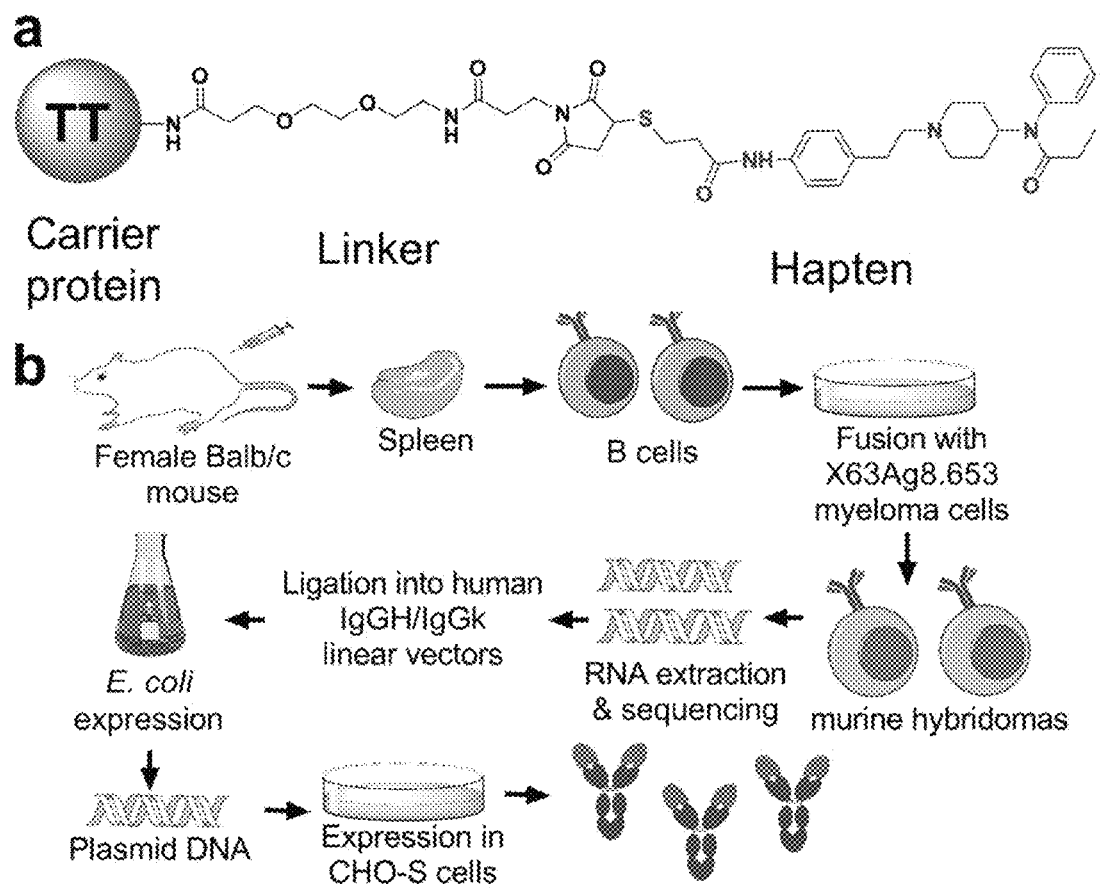
FIG. 3. Description of immunogen and experimental strategy. 3a) Design of the fentanyl vaccine that was used to immunize mice. The immunogen is composed of tetanus toxoid (TT) carrier protein conjugated to the para-AmFen-Hap hapten through the NHS-PEG2-maleimide linker. 3b) Experimental strategy to generate the chimeric mAb described in this study. The constant IgG domains in the chimeric mAbs originated from human IgG while the variable domains were from mouse.
Figure 4:
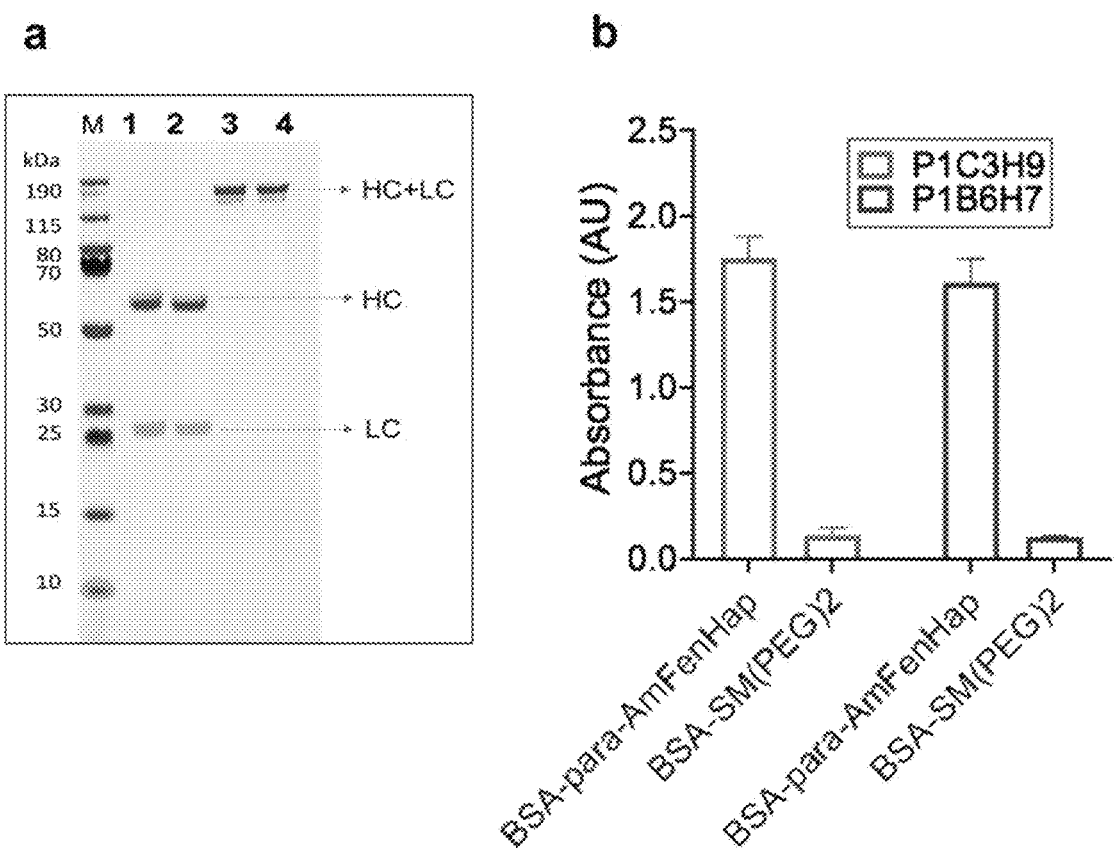
FIG. 4. Characterization of purified mAb. 4a) SDS-PAGE analysis of purified anti-fentanyl chimeric antibodies. Purification of anti-fentanyl antibodies using protein A affinity chromatography. Lane M represents molecular marker, lane 1 represents P1B6H7 Ab under reduced condition, and lane 2 represents P1C3H9 Ab under reduced condition, respectively. Lanes 3 and 4 represent P1B6H7 and P1C3H9 Abs under non-reducing condition, respectively. HC indicates heavy chain and LC indicates light chain. 4b) Confirmatory ELISA of chimeric version of anti-fentanyl antibodies derived from hybridomas.

The antibodies of this disclosure may be tagged with a detectable or functional label. These labels include radiolabels (e.g., $^{131}$I or $^{99}$Tc), enzymatic labels (e.g., horseradish peroxidase or alkaline phosphatase), fluorescent labels, Anti-Fentanyl Antibodies As described in detail below, female Balb/c mice were immunized with TT-para-AmFenHap/ALF43A vaccine and collected splenocytes were used to generate hybridoma clones. The experimental strategy is depicted in FIG. 3b. P1B6H7 and P1C3H9 hybridoma candidates, based on their binding properties and specificity, were selected for further studies. The cDNAs from these clones were synthesized using random hexamers and PCR amplification using the respective V and J gene-specific forward and reverse primers with 15-bp overlap at 5' and 3' ends, including restriction sites (Table 6). The resulting PCR products, variable domains of heavy (VH) and light (VL) chains, were cloned into linear vectors containing the human IgG1, and Ig$_\kappa$ constant region genes using in-fusion cloning kits, respectively. The P1B6H7 and P1C3H9 sequences were analyzed using the Kabat database of VH and VL sequences: the variable region sequences are shown in Table 2 and Table 8. The recombinant chimeric antibodies VL and VH genes belonged to mouse IgG V subgroups, including J and D gene segments as shown in Table 7. Recombinant chimeric antibodies were transiently expressed in Chinese hamster ovary (CHO) cells, purified using protein A affinity chromatography as shown in FIG. 4a, and further characterized by enzyme-linked immunosorbent assay (ELISA) (FIG. 4b). The mAbs reacted with BSA-para-AmFenHap in an ELISA, but did not react with BSA-SM(PEG). The Examples below provide supportive information and data.

This disclosure provides antibodies or antigen-binding fragments thereof, recombinant antibodies, or grafted antibodies that bind to fentanyl or a fentanyl analog. The antibodies disclosed herein have been shown to bind to fentanyl or fentanyl analogs with high affinity, e.g. a dissociation constant ($K_d$)<5 nM. The fentanyl analogs that can bind to antibodies disclosed herein include, but are not limited to, acryl fentanyl, cyclopropyl fentanyl, furanyl fentanyl, cis-3-methyl fentanyl, para-fluorofentanyl, and carfentanil. Some of the antibodies have been shown to possess broad cross-reactivity against fentanyl and different fentanyl analogs.

The variable heavy and light chain regions of the antibodies disclosed herein were sequenced from antibodies that had been isolated from mice following immunization with a fentanyl hapten conjugated to tetanus toxoid (TT-para-AmFenHap) and adjuvanted with liposomes containing monophosphoryl lipid A adsorbed on aluminum hydroxide. The present antibodies may be used to bind and sequester fentanyl and/or fentanyl analogs. As also herein described, the antibodies of the disclosure may be used therapeutically for prevention or treatment of fentanyl or fentanyl analog overdose. In some embodiments, the antibodies of the disclosure have capability of being used commercially in antigen-capture fentanyl or fentanyl analog diagnostic assays.

In one embodiment, the antibody is an isolated P1B6H7 antibody. As used herein, the term P1B6H7 antibody refers to a monoclonal antibody, or antigen-binding fragment thereof, that binds to fentanyl or a fentanyl analog, wherein the fentanyl analog is acryl fentanyl, cyclopropyl fentanyl, furanyl fentanyl, cis-3-methyl fentanyl, para-fluorofentanyl, or carfentanil. Also provided are antibodies that include the same CDRs or variable regions as P1B6H7.

In some embodiments, provided is an antibody or an antigen-binding fragment thereof, wherein the antibody, or the antigen-binding fragment thereof, comprises a heavy chain variable domain comprising the amino acid sequence of SEQ ID NO:1 and a light chain variable domain comprising the amino acid sequence of SEQ ID NO:2. In some embodiments, provided is an antibody or an antigen-binding fragment thereof, wherein the antibody, or the antigen-binding fragment thereof, comprises a heavy chain variable domain comprising a CDR1 comprising the amino acid sequence of SEQ ID NO:3, a CDR2 comprising the amino acid sequence of SEQ ID NO:4, and a CDR3 comprising the amino acid sequence of SEQ ID NO:5 and a light chain variable domain comprising a CDR1 comprising the amino acid sequence of SEQ ID NO:6, a CDR2 comprising the amino acid sequence of SEQ ID NO:7, and a CDR3 comprising the amino acid sequence of SEQ ID NO:8 (Table 1).

TABLE 1

| | Amino acid and nucleotide sequences |
|---|---|
| P1B6H7 | VH (SEQ ID NO: 1):<br>EVMLVESGPELVKPGASVKMSCKASGYTFTSSVMHWVKQKPGQGLEW<br>IGNINPYNDGTKYNEKFKGKATLTSDKSSSTAYMELSSLTSEDSAVYYCA<br>REGIYYGSSYRDYWGQGTTVTVSS<br>VL (SEQ ID NO: 2):<br>DTTVTQSQKFMSTSLGDRVSVTCKASQNVGNNVAWYQHKPGQSPKALI<br>YSASYRYSGVPDRFTGSGSGTDFTLTISNVQSEDLAEYFCQQYNSYPFTF<br>GSGTKLEIK |
| P1C3H9 | VH (SEQ ID NO: 9):<br>DVQLQESGPSLVKPSQALSLTCSVTGDSITSGYWNWIRKFPGNKLEYLG<br>YISYSGSTYYNPSLKSRISITRDTSKNQFYLQLNSMTTEDTATYFCVRYPY<br>NGHNGYLDYWGQGTTLTVSA<br>VL (SEQ ID NO: 10):<br>DVVMTQATFSNPVTLGTSASISCRSSKSLLHRNGITYLYWFLQKPGQSPQ<br>LLIYQMSNLASGVPDRFSSSGSGTDFTLRISRVEAEDVGVYYCAQNLELP<br>WTFGGGTKLEIK |
| P1B6H7 | VH (SEQ ID NO: 17):<br>GAGGTGATGCTGGTGGAGTCTGGACCTGAGCTGGTAAAGCCTGGGG<br>CTTCAGTGAAGATGTCCTGCAAGGCTTCTGGATACACATTCACTAGCT<br>CTGTTATGCACTGGGTGAAGCAGAAGCCTGGGCAGGGCCTTGAGTGG<br>ATTGGAAATATTAATCCTTACAATGATGGAACTAAGTACAATGAGAAG |

TABLE 1-continued

Amino acid and nucleotide sequences

| | | | |
|---|---|---|---|
| | | TTCAAAGGCAAGGCCACACTGACTTCAGACAAATCCTCCAGCACAGC<br>CTACATGGAGCTCAGCAGCCTGACCTCTGAGGACTCTGCGGTCTATTA<br>CTGTGCAAGAGAGGGAATTTACTACGGAGTAGTTATAGGGACTACTG<br>GGGCCAAGGCACCACTGTCACCGTCTCCTCGGC<br>VL (SEQ ID NO: 18):<br>GACACAACTGTGACCCAGTCTCAAAAATTCATGTCCACATCATTAGG<br>AGACAGGGTCAGCGTCACCTGCAAGGCCAGTCAGAATGTGGGTAATA<br>ATGTAGCCTGGTATCAACATAAACCAGGGCAATCTCCTAAAGCACTGA<br>TTTACTCGGCATCCTACCGGTACAGTGGAGTCCCTGATCGCTTCACAG<br>GCAGTGGATCTGGGACAGATTTCACTCTCACCATCAGCAATGTGCAG<br>TCTGAAGACTTGGCAGAGTATTTCTGTCAGCAATATAACAGCTATCCA<br>TTCACGTTCGGCTCGGGGACAAAATTGGAAATAAAA | |
| P1C3H9 | | VH (SEQ ID NO: 19)<br>GATGTGCAGCTTCAGGAGTCAGGACCTAGCCTCGTGAAGCCTTCTCA<br>GGCTCTGTCCCTCACCTGTTCTGTCACTGGCGACTCCATCACCAGTGG<br>TTACTGGAACTGGATCCGGAAATTCCCAGGGAATAAACTTGAATACTT<br>GGGGTACATAAGCTACAGTGGTAGCACTTACTACAATCCGTCTCTCAA<br>AAGTCGAATCTCCATCACTCGAGACACATCCAAGAACCAGTTCTACC<br>TGCAGTTGAATTCTATGACTACTGAGGACACAGCCACATATTTTGTG<br>TAAGATATCCCTACAATGGGCACAACGGCTACTTGGACTACTGGGGCC<br>AAGGCACCACTCTCACTGTCTCTGCGGC<br>VL (SEQ ID NO: 20):<br>GATGTTGTGATGACCCAGGCTACATTCTCCAATCCAGTCACTCTTGGA<br>ACATCAGCTTCCATCTCCTGCAGGTCTAGTAAGAGTCTCCTACATAGA<br>AATGGCATCACTTATTTGATTGGTTCTGCAGAAGCCAGGCCAGTCT<br>CCTCAGCTCCTGATTTATCAGATGTCCAACCTTGCCTCAGGAGTCCCA<br>GACAGGTTCAGTAGCAGTGGGTCAGGAACTGATTTCACACTGAGAAT<br>CAGCAGAGTGGAGGCTGAGGATGTGGGTGTTTATTACTGTGCTCAAA<br>ATCTAGAACTTCCTTGGACGTTCGGTGGAGGCACCAAGCTGGAAAFA<br>AAA | |

| | | P1B6H7 (SEQ ID NO: ) | P1C3H9 (SEQ ID NO: ) |
|---|---|---|---|
| Light<br>chain | CDR1<br>CDR2<br>CDR3 | KASQNVGNNVA (6)<br>SASYRYS (7)<br>QQYNSYPFT (8) | RSSKSLLHRNGITYLY (14)<br>QMSNLAS (15)<br>AQNLELPWT (16) |
| Heavy<br>chain | CDR1<br>CDR2<br>CDR3 | SSVMH (3)<br>NINPYNDGTKYNEKFKG (4)<br>EGIYYGSSYRDY (5) | SGYWN (11)<br>YISYSGSTYYNPSLKS (12)<br>YPYNGHNGYLDY (13) |

In another embodiment, the antibody is an isolated P1C3H9 antibody. As used herein, the term P1C3H9 antibody refers to a monoclonal antibody, or antigen-binding fragment thereof, that binds to fentanyl or a fentanyl analog, wherein the fentanyl analog is acryl fentanyl, cyclopropyl fentanyl, furanyl fentanyl, cis-3-methyl fentanyl, para-fluorofentanyl, or carfentanil. Also provided are antibodies that include the same CDRs or variable regions as P1C3H9.

In some embodiments, provided is an antibody or an antigen-binding fragment thereof, wherein the antibody, or the antigen-binding fragment thereof, comprises a heavy chain variable domain comprising the amino acid sequence of SEQ ID NO:9 and a light chain variable domain comprising the amino acid sequence of SEQ ID NO:10. In some embodiments, provided is an antibody or an antigen-binding fragment thereof, wherein the antibody, or the antigen-binding fragment thereof, comprises a heavy chain variable domain comprising a CDR1 comprising the amino acid sequence of SEQ ID NO: 11, a CDR2 comprising the amino acid sequence of SEQ ID NO:12, and a CDR3 comprising the amino acid sequence of SEQ ID NO:13 and a light chain variable domain comprising a CDR1 comprising the amino acid sequence of SEQ ID NO:14, a CDR2 comprising the amino acid sequence of SEQ ID NO:15, and a CDR3 comprising the amino acid sequence of SEQ ID NO:16 (Table 1).

Also provided are antibodies and antigen-binding fragments that are able to bind to fentanyl or a fentanyl analog like P1B6H7 or P1C3H9. In some embodiments, these antibodies or antigen-binding fragments bind to the same groups or atoms on the fentanyl or a fentanyl analog as P1B6H7 or P1C3H9. In some embodiments, like P1B6H7 or P1C3H9, these antibodies or antigen-binding fragments do not cross-react with opioid abuse pharmacotherapeutics. In some embodiments, like P1B6H7 or P1C3H9, these antibodies or antigen-binding fragments do not bind to drugs used for opioid abuse management, such as but not limited to naltrexone, buprenorphine, and naloxone.

In some embodiments, like P1B6H7 or P1C3H9, these antibodies or antigen-binding fragments bind specifically to fentanyl or fentanyl analog with a dissociation constant (Ks) equal to or less than 5 nM. The fentanyl analog may be acryl fentanyl, cyclopropyl fentanyl, furanyl fentanyl, cis-3-methyl fentanyl, para-fluorofentanyl, or carfentanil.

Modified Antibodies

Modified versions of P1B6H7 and P1C3H9 are also provided. Typically, modifications to an antibody can be introduced through the nucleic acids that encode the heavy or light chain variable domains of the antibody. These modifications can include deletions, insertions, point mutations, truncations, and amino acid substitutions and addition of amino acids or non-amino acid moieties. For example, random mutagenesis of the disclosed VH or VL sequences can be used to generate variant VH or VL domains still capable of binding fentanyl or fentanyl analogs including acryl fentanyl, cyclopropyl fentanyl, furanyl fentanyl, cis- 3-methyl fentanyl, para-fluorofentanyl, and carfentanil. A technique using error-prone PCR is described by Gram et al. (Proc. Nat. Acad. Sci. U.S.A. (1992) 89: 3576-3580). Another method uses direct mutagenesis of the disclosed VH or VL sequences. Such techniques are disclosed by Barbas et al. (Proc. Nat. Acad. Sci. U.S.A. (1994) 91: 3809-3813) and Schier et al. (J. Mol. Biol. (1996) 263: 551-567). Modifications can also be made directly to the amino acid sequence, such as by cleavage, addition of a linker molecule or addition of a detectable moiety, such as biotin, addition of a fatty acid, and the like.

In one embodiment, the antibody is a monoclonal antibody that binds to fentanyl or fentanyl analogs including acryl fentanyl, cyclopropyl fentanyl, furanyl fentanyl, cis-3-methyl fentanyl, para-fluorofentanyl, and carfentanil, and comprises 1) a heavy chain variable domain that is at least about 70%, at least about 80%, at least about 90%, at least about 95%, at least about 98% identical, or 100% identical to the amino acid sequence of the heavy chain variable domain of the P1B6H7 and P1C3H9 antibodies as described herein, and 2) a light chain variable domain that is at least about 70%, at least about 80%, at least about 90%, at least about 95%, at least about 98% identical, or 100% identical to the amino acid sequence of the light chain variable domain of the P1B6H7 and P1C3H9 antibodies as described herein.

In another embodiment, the monoclonal antibody binds to fentanyl or fentanyl analogs including acryl fentanyl, cyclopropyl fentanyl, furanyl fentanyl, cis-3-methyl fentanyl, para-fluorofentanyl, and carfentanil, and comprises six CDRs (H1, H2, H3, L1, L2, and L3) that are at least about 90%, at least about 95% or at least about 98% identical to the amino acid sequences of the six CDRs (H1, H2, H3, L1, L2, and L3) of the heavy and light chain variable domains of the P1B6H7 and P1C3H9 antibodies as described herein.

In another embodiment, the monoclonal antibody binds to fentanyl or fentanyl analogs including acryl fentanyl, cyclopropyl fentanyl, furanyl fentanyl, cis-3-methyl fentanyl, para-fluorofentanyl, and carfentanil, and comprises a heavy chain variable domain identical to the heavy chain variable domain sequences of the P1B6H7 and P1C3H9 antibodies as described herein except for 1, up to 2, up to 3, up to 4, up to 5, up to 6, up to 7, and in certain cases, up to 10 amino acid substitutions in the CDR sequences. In another embodiment, the monoclonal antibody binds to fentanyl or fentanyl analogs including acryl fentanyl, cyclopropyl fentanyl, furanyl fentanyl, cis-3-methyl fentanyl, para-fluorofentanyl, and carfentanil, and comprises a light chain variable domain identical to the light chain variable domain sequences of the P1B6H7 and P1C3H9 antibodies as described herein except for 1, up to 2, up to 3, up to 4, up to 5, up to 6, up to 7, and in certain cases, up to 10 amino acid substitutions in the CDR sequences. In some embodiments, the amino acid substitutions are conservative substitutions.

The specific amino acid positions that can be substituted in a CDR, as well as the donor amino acid that can be substituted into those positions can be readily determined by one of skill in the art using known methods, such as those disclosed in published U.S. Application 2006/0099204, the disclosure of which is hereby incorporated by reference in its entirety. Typically, this involves substitution of an amino acid with an amino acid having similar charge, hydrophobic, or stereochemical characteristics. More drastic substitutions in FR regions, in contrast to CDR regions, may also be made as long as they do not adversely affect (e.g., reduce affinity by more than 50% as compared to unsubstituted antibody) the binding properties of the antibody.

Modified versions of the P1B6H7 and P1C3H9 antibodies can also be screened to identify which mutation provides a modified antibody that retains a desired property, such as high affinity binding of fentanyl or fentanyl analogs including acryl fentanyl, cyclopropyl fentanyl, furanyl fentanyl, cis-3-methyl fentanyl, para-fluorofentanyl, and carfentanil.

Nucleic Acids, Cloning and Expression Systems

The present disclosure further provides isolated nucleic acids encoding the P1B6H7 antibody and P1C3H9 antibody or antigen-binding fragments thereof. The nucleic acids may comprise DNA or RNA and may be wholly or partially synthetic or recombinant. Reference to a nucleotide sequence as set out herein encompasses a DNA molecule with the specified sequence and encompasses an RNA molecule with the specified sequence in which U is substituted for T, unless context requires otherwise.

The nucleic acids provided herein encode at least one CDR, all six CDRs (i.e., H1, H2, H3, L1, L2, and L3), a VH domain, and/or a VL domain of one of the P1B6H7 antibody and P1C3H9 antibody.

In some embodiments, the disclosure provides an isolated nucleic acid that encodes the heavy chain variable domain of the P1B6H7 antibody, wherein the isolated nucleic acid comprises SEQ ID NO: 17 and/or the isolated nucleic acid encodes the light chain variable domain of the of the P1B6H7 antibody, wherein the isolated nucleic acid comprises SEQ ID NO: 18.

In some embodiments, the disclosure provides an isolated nucleic acid that encodes the heavy chain variable domain of the P1C3H9 antibody, wherein the isolated nucleic acid comprises SEQ ID NO: 19 and/or the isolated nucleic acid encodes the light chain variable domain of the of the P1C3H9 antibody, wherein the isolated nucleic acid comprises SEQ ID NO: 20.

The present disclosure also provides expression vectors (or plasmids) comprising at least one nucleic acid encoding a CDR, all CDRs (i.e., H1, H2, H3, L1, L2, and L3), a VH domain, and/or a VL domain of one of the P1B6H7 and P1C3H9 antibodies, as well as other nucleic acid sequences useful for regulating polypeptide expression. Suitable expression vectors can be chosen or constructed, so that they contain appropriate regulatory sequences, including promoter sequences, terminator sequences, polyadenylation sequences, enhancer sequences, marker genes and other sequences as appropriate.

The expression vectors can be introduced into a host cell to produce the desired antibody. Systems for cloning and expression of a polypeptide in a variety of different host cells are well known in the art. For cells suitable for producing antibodies, see Gene Expression Systems, Academic Press, eds. Fernandez et al., 1999. Typically, the instant antibodies are expressed, e.g., in a transgenic animal (see Gene Expression Systems, Academic Press, eds. Fernandez et al., 1999), a Chinese Hamster Ovary Cell, a Human Embryonic Kidney 293T cell or in a cell described in the Examples. Any protein compatible expression system may be used to produce the disclosed antibodies.

A further aspect of the disclosure provides an isolated host cell comprising a nucleic acid (or expression vector) as disclosed herein. A still further aspect provides a method comprising introducing such nucleic acid (or expression vector) into a host cell. The introduction may employ any available technique. For eukaryotic cells, suitable techniques may include calcium phosphate transfection, DEAE-Dextran, electroporation, liposome-mediated transfection and transduction using retrovirus or other virus, e.g., vaccinia or, for insect cells, baculovirus. For bacterial cells, suitable techniques may include calcium chloride transformation, electroporation and transfection using bacteriophage. The introduction of the nucleic acid into the cells may be followed by causing or allowing expression from the nucleic acid, e.g., by culturing host cells under conditions for expression of the gene. Following production by expression an antibody may be isolated and/or purified using any suitable technique, then used as appropriate.

Methods of Making Antibodies

Methods of making antibodies are described in the Examples. Numerous methods known to those skilled in the art are available for obtaining antibodies or antigen-binding fragments thereof. For example, antibodies can be produced using recombinant DNA methods. See, e.g., U.S. Pat. No. 4,816,567, EPO 8430268.0; EPO 85102665.8; EPO 85305604.2; PCT/GB 85/00392; EPO 85115311.4; PCT/US86/002269; and Current Trends in Monoclonal Antibody Development (Steven Shire et al., Eds. Springer, 2010), the disclosures of which are incorporated herein by reference in their entirety. Given the disclosure in this application of specific nucleic acid sequences and the VH, VL, and CDR amino acid sequences encoded thereby, it is possible, using recombinant DNA techniques, to insert a nucleic acid of interest into an expression vector or otherwise express the nucleic acid of interest in a host cell to produce the desired antibody. In addition, as disclosed elsewhere in this application, modified versions of the antibodies described herein can be produced using known techniques, including, for example, random mutagenesis, error-prone PCR, and direct mutagenesis.

Monoclonal antibodies may also be produced by preparing immortalized cell lines capable of producing antibodies having desired specificity against fentanyl and/or fentanyl analogs. Such immortalized cell lines may be produced in a variety of ways. Conveniently, a small non-human animal, such as a mouse, is hyperimmunized with the desired immunogen. The vertebrate is then sacrificed, usually several days after the final immunization, the spleen cells removed, and the spleen cells immortalized. The most common technique is fusion with a myeloma cell fusion partner, as first described by Kohler and Milstein (1975) Nature 256:495-497. Other techniques including EBV transformation, transformation with bare DNA, e.g., oncogenes, retroviruses, etc., or any other method which provides for stable maintenance of the cell line and production of monoclonal antibodies. Specific techniques for preparing monoclonal antibodies are described in Antibodies: A Laboratory Manual, Harlow and Lane, eds., Cold Spring Harbor Laboratory, 1988, the full disclosure of which is incorporated herein by reference.

In one embodiment, the non-human animal includes at least a part of a human immunoglobulin gene. For example, it is possible to engineer transgenic mouse strains that express human heavy and light chain genes, but are incapable of expressing the endogenous mouse immunoglobulin heavy and light chain genes. Using the hybridoma technology, antigen-specific monoclonal antibodies derived from the genes with the desired specificity may be produced and selected. See, e.g., XENOMOUSE™, Green et al. (1994) Nature Genetics 7:13-21, US 2003-0070185, U.S. Pat. No. 5,225,539, WO 96/34096, published Oct. 31, 1996, and PCT Application No. PCT/US96/05928, filed Apr. 29, 1996, the disclosures of which are incorporated herein by reference in their entirety.

Immortalized cell lines can be screened using standard methods, such as enzyme-linked immunosorbent assay (ELISA) or surface plasmon resonance analysis, to identify one or more hybridomas that produce an antibody that specifically binds with a specified antigen and/or epitope. Any form of the specified antigen may be used as the immunogen, e.g., recombinant antigen, naturally occurring forms, any variants or fragments thereof, as well as antigenic peptide thereof.

Another exemplary method of making antibodies includes screening protein expression libraries, e.g., phage or ribosome display libraries. Phage display technology mimics the mammalian immune system by cloning large libraries of antibody genes and selecting for binding to a desired target, such as the fentanyl or analogs. Phage display is described, for example, in Ladner et al., U.S. Pat. No. 5,223,409; Smith (1985) Science 228:1315-1317; Clackson et al. (1991) Nature, 352: 624 628; Marks et al. (1991) J. Mol. Biol., 222: 581 597WO 92/18619; WO 91/17271; WO 92/20791; WO 92/15679; WO 93/01288: WO 92/01047; WO 92/09690; and WO 90/02809, the disclosures of which are incorporated herein by reference in their entirety.

The antibodies or antibody fragments of the present invention may furthermore, of course, be produced in plants. In 1989, Hiatt et al. (Nature 342:76-78 (1989)) first demonstrated that functional antibodies could be produced in transgenic plants. Since then, a considerable amount of effort has been invested in developing plants for antibody (or "plantibody") production (for reviews see Giddings, 2000 Nat. Biotechnol., 18:1151-1155; Fischer, 2000 Transgenic Res., 9:279-299).

Methods of Use

The antibodies described in this application that bind to fentanyl or fentanyl analogs can be used in a variety of medical applications and research use. In one aspect, the disclosure provides a method of treating or preventing the symptoms of opioid use disorder in a subject, comprising administering to the subject one or more of the antibodies described herein in an amount effective to treat or prevent opioid use disorder, such as fentanyl use disorder or fentanyl overdose. Subjects that can be treated with the antibodies disclosed in this application include humans and non-human mammals, including, but not limited to, non-human primates, dogs, cats, horses, cows, sheep, pigs, goats, minks, mice, rats, hamsters, ferrets, and guinea pigs.

In one aspect, one or more of the antibodies described herein is used in a method of treating or preventing fentanyl or fentanyl analog use disorder or reversing the effects of fentanyl or fentanyl analog overdose in a subject.

In another aspect, a cocktail of one or more of the antibodies described herein is used in a method of treating or preventing fentanyl or fentanyl analog use disorder or reversing the effects of fentanyl or fentanyl analog overdose in a subject.

In some embodiments, one or more of the instant antibodies can be administered prophylactically before exposure to fentanyl or fentanyl analogs, or before any clinical indication of illness or effects of fentanyl or fentanyl analog overdose. In some embodiments, the one or more antibodies can be administered in a time period days before exposure to fentanyl or fentanyl analogs or before possible or presumed exposure or risk of exposure as a prophylactic. For example, one or more of the antibodies of the disclosure may be administered a day prior or before, 2 days before or prior, 3 days prior or before, 4 days prior or before, 5 days prior or before, 6 days prior or before, 7 days prior or before, a week prior or before, more than 7 days prior or before, more than a week prior or before, up to 9 days prior or before, up to 10 days prior or before expected exposure to fentanyl or fentanyl analogs. The present antibodies may be used to provide immediate immunity, for example, by sequestering fentanyl or fentanyl analogs in the blood or other body fluids and impeding the ability of free fentanyl or fentanyl analogs to permeate the blood-brain barrier thereby preventing access to the receptors in the brain.

In addition, one or more of the antibodies disclosed herein can be used to detect fentanyl or fentanyl analogs as described herein, such as fentanyl or fentanyl analog in a sample. In one embodiment, the method comprises contacting one or more of the antibodies disclosed herein with the sample and analyzing the sample to detect binding of the antibody to fentanyl or fentanyl analog in the sample, wherein binding of the antibody to fentanyl or analog in the sample indicates the presence of the fentanyl or fentanyl analogs in the sample.

In one embodiment, the sample comprises a non-biological sample, such as soil, water, or food products, gas sample, illicit drugs, or the like. In other embodiments, the sample comprises a biological sample, such as serum, urine, saliva, mucus (e.g. nasal swab), cerebrospinal fluid, blood, stool or the like; a solid or semi-solid such as tissues, feces, vitreous humour or the like: or, alternatively, a solid tissue such as those commonly used in histological diagnosis. Such methods can be used to detect fentanyl or fentanyl analogs in a patient, wherein binding of the antibody to the fentanyl or fentanyl analog molecules in a sample from the patient indicates the presence of the fentanyl or fentanyl analog in the patient.

Any appropriate label may be used in the detection methods and compositions described herein. A label is any molecule or composition bound to an antibody, or a secondary molecule that is conjugated thereto, and that is detectable by spectroscopic, photochemical, biochemical, immunochemical, electrical, optical or chemical means. Examples of labels, including enzymes, colloidal gold particles, colored latex particles, have been disclosed (U.S. Pat. Nos. 4,275, 149; 4,313,734; 4,373,932; and 4,954,452, each incorporated by reference herein). Additional examples of useful labels include, without limitation, haptens (e.g., biotin, digoxigenin (DIG), dintrophenol (DNP), etc.), radioactive isotopes, co-factors, ligands, chemiluminescent or fluorescent agents, protein adsorbed silver particles, protein adsorbed iron particles, protein adsorbed copper particles, protein adsorbed selenium particles, protein adsorbed sulphur particles, protein adsorbed tellurium particles, protein adsorbed carbon particles, and protein coupled dye sacs. The attachment of a compound to a label can be through any means, including covalent bonds, adsorption processes, hydrophobic and/or electrostatic bonds, as in chelates and the like, or combinations of these bonds and interactions and/or may involve a linking group.

In some embodiments, a molecule, such as an antibody (e.g., monoclonal antibody or recombinant antibody), is detected directly by conjugation with a detectable moiety. For example, monoclonal antibodies as described herein can be directly conjugated to a detectable moiety, such as a fluorescent compound (including fluorescein, fluorescein isothiocyanate (FITC), rhodamine, 5-dimethylamine-1-naphthalenesulfonyl chloride, phycoerythrin, lanthanide phosphors, ALEXA FLUOR® (Invitrogen. Carlsbad, CA) dyes, or the cyanine family of dyes (such as Cy-3 or Cy-5) and the like); a bioluminescent compound (such as luciferase, green fluorescent protein (GFP), yellow fluorescent protein, etc.); an enzyme that produces a detectable reaction product (such as horseradish peroxidase, β-galactosidase, luciferase, alkaline phosphatase, or glucose oxidase and the like), or a radiolabel (such as $^3$H, $^{14}$C, $^{15}$N, $^{35}$S, $^{90}$Y, $^{99}$Tc, $^{111}$In, $^{125}$I, or $^{131}$I). In some embodiments, a molecule, such as an antibody (e.g., monoclonal antibody), is indirectly detected. For example, secondary antibodies are raised against primary antibodies (e.g., a monoclonal anti-fentanyl antibody as described herein) as known to a skilled artisan, where the secondary antibody is labeled for detection. The secondary antibody is conjugated to a detectable moiety. For example, the secondary antibody can be conjugated to a reporter enzyme such as alkaline phosphatase (AP) or horseradish peroxidase (HRP) for subsequent colorimetric detection. In some embodiments, the secondary antibody is conjugated to a fluorescent moiety as previously described (e.g., FITC, Cy dyes, ALEXA FLUOR® (Invitrogen, Carlsbad, CA) dyes, rhodamine, etc.). In some embodiments, a primary monoclonal anti-fentanyl antibody is indirectly detected with a secondary antibody conjugated to a hapten, such as, biotin DNP, DIG, etc., which is further coupled to a detectable reagent molecule such as streptavidin-HRP, which is subsequently detected colorimetrically by reaction with 3,3'-Diaminobenzidine (DAB). A skilled artisan will appreciate the myriad of enzymatic and luminescent detection methods utilized for visualization of protein-protein interactions as described herein.

Formulations and Administration

The disclosure provides compositions comprising an antibody described herein that binds fentanyl or a fentanyl analog as also herein described. In certain embodiments, the compositions are suitable for pharmaceutical use and administration to patients. These compositions comprise one or both antibodies P1B6H7 and P1C3H9 and a pharmaceutically acceptable excipient.

Pharmaceutically acceptable excipients include, but are not limited to a carrier or diluent, such as a gum, a starch (e.g. corn starch, pregelatinized starch), a sugar (e.g. lactose, mannitol, sucrose, dextrose), a cellulosic material (e.g. microcrystalline cellulose), an acrylate (e.g. polymethylacrylate), calcium carbonate, magnesium oxide, talc, or mixtures thereof; a binder (e.g. acacia, cornstarch, gelatin, carbomer, ethyl cellulose, guar gum, hydroxypropyl cellulose, hydroxypropyl methyl cellulose, povidone); a disintegrating agent (e.g. cornstarch, potato starch, alginic acid, silicon dioxide, croscarmellose sodium, crospovidone, guar gum, sodium starch glycolate), a buffer (e.g. Tris-HCl, acetate, phosphate) of various pH and ionic strength; and additive such as albumin or gelatin to prevent absorption to surfaces; a detergent (e.g. Tween 20, Tween 80, Pluronic F68, bile acid salts); a protease inhibitor; a surfactant (e.g. sodium lauryl sulfate); a permeation enhancer; a solubilizing agent (e.g. glycerol, polyethylene glycerol); an anti-oxidants (e.g. ascorbic acid, sodium metabisulfite, butylated hydroxyanisole); a stabilizer (e.g. hydroxypropyl cellulose, hydroxypropylmethyl cellulose): a viscosity increasing agent (e.g. carbomer, colloidal silicon dioxide, ethyl cellulose, guar gum); a sweetener (e.g. aspartame, citric acid); a preservative (e.g. Thimerosal, benzyl alcohol, parabens); a lubricant (e.g. stearic acid, magnesium stearate, polyethylene glycol, sodium lauryl sulfate); a flow-aid (e.g. colloidal silicon dioxide), a plasticizer (e.g. diethyl phthalate, triethyl citrate); an emulsifier (e.g. carbomer, hydroxypropyl cellulose, sodium lauryl sulfate); a polymer coating (e.g. poloxamers or poloxamines); a coating and film forming agent (e.g. ethyl cellulose, acrylates, polymethacrylates); an adjuvant; a pharmaceutically acceptable carrier for liquid formulations, such as an aqueous (water, alcoholic/aqueous solution, emulsion or suspension, including saline and buffered media) or non-aqueous (e.g., propylene glycol, polyethylene glycol, and injectable organic esters such as ethyl oleate) solution, suspension, emulsion or oil; and a parenteral vehicle (for subcutaneous, intravenous, intraarterial, or intramuscular injection), including but not limited to, sodium chloride solution, Ringer's dextrose, dextrose and sodium chloride, lactated Ringer's and fixed oils.

Intravenous vehicles include fluid and nutrient replenishers, electrolyte replenishers such as those based on Ringer's dextrose, and the like. Examples are sterile liquids such as water and oils, with or without the addition of a surfactant and other pharmaceutically acceptable adjuvants. In general, water, saline, aqueous dextrose and related sugar solutions, and glycols such as propylene glycols or polyethylene glycol are preferred liquid carriers, particularly for injectable solutions. Examples of oils are those of animal, vegetable, or synthetic origin, for example, peanut oil, soybean oil, olive oil, sunflower oil, fish-liver oil, another marine oil, or a lipid from milk or eggs.

A pharmaceutical composition of the disclosure is formulated to be compatible with its intended route of administration. Methods to accomplish the administration are known to those of ordinary skill in the art. This includes, for example, injections, by parenteral routes such as intravenous, intravascular, intraarterial, subcutaneous, intramuscular, intraperitoneal, intraventricular, intraepidural, or others as well as oral, nasal, ophthalmic, rectal, or topical. Sustained release administration is also specifically contemplated, by such means as depot injections or erodible implants. Localized delivery is particularly contemplated, by such means as delivery via a catheter to one or more arteries, such as the renal artery or a vessel supplying a localized site of interest.

In some embodiments, the present compositions may be formulated in nasal sprays or inhalation solutions or suspensions using approaches known and acceptable in the art and in the medical field and clinical practice. The Food and Drug Administration (FDA) provides guideline and guidance with regard to such sprays, solutions and suspensions and spray drug products, including in Guidance for Industry documents available at fda.gov. An exemplary July 2002 Guidance for Industry document entitled Nasal Spray and Inhalation Solution, Suspension and Spray Drug Products—Chemistry, Manufacturing and Controls Documentation includes details regarding formulation components and compositions, specifications therefore, manufacturing, and closed container systems.

Nasal Sprays are drug products that contain active ingredients dissolved or suspended in a formulation, typically aqueous-based, which can contain other excipients and are intended for use by nasal inhalation. Container closure systems for nasal sprays include the container and all components that are responsible for metering, atomization, and delivery of the formulation to the patient. Nasal spray drug products contain therapeutically active ingredients (drug substances) dissolved or suspended in solutions or mixtures of excipients (e.g., preservatives, viscosity modifiers, emulsifiers, buffering agents) in nonpressurized dispensers that deliver a spray containing a metered dose of the active ingredient. The dose can be metered by the spray pump or could have been premetered during manufacture. A nasal spray unit can be designed for unit dosing or can discharge numerous metered sprays of formulation containing the drug substance. Nasal sprays are applied to the nasal cavity for local and/or systemic effects.

In some embodiments, the pharmaceutical compositions are aerosolized administration. A nebulizer is a drug delivery device used to administer medication in the form of aerosol into the respiratory tract. Nebulizers can be used for intranasal and inhalation delivery of monoclonal antibodies through the mouth and nasal passage and are effective devices for delivery of monoclonal antibodies to the upper and/or lower respiratory tract. Nebulizers use oxygen, compressed air or ultrasonic power to break up medical solutions and suspensions into small aerosol droplets that can be directly inhaled from the mouthpiece of the device. In some embodiments, a metered-dose inhaler (MDI) device is used to deliver the one or more antibodies in a specific amount of medication to the lungs in the form of a short burst of aerosolized medicine that is usually self-administered by the patient via inhalation. Dry powder inhalers, which utilize micronized powder often packaged in single dose quantities in blisters or gel capsules containing the powdered medication, may also be used to deliver the one or more antibodies to the lungs. In one embodiment a subject antibody is administered to a patient by intravenous, intramuscular or subcutaneous injection. The antibody may be administered, for example, by bolus injunction or by slow infusion.

The dosage may depend on the type and severity of the infection and/or on the characteristics of the individual, such as general health, age, sex, body weight and tolerance to drugs and should be adjusted, as needed, according to individual need and professional judgment. The dosage may also vary depending upon factors, such as route of administration, target site, or other therapies administered. The skilled artisan will be able to determine appropriate doses depending on these and other factors.

Toxicity and therapeutic efficacy of the composition can be determined by standard pharmaceutical procedures in cell cultures or experimental animals. e.g., determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Antibodies that exhibit large therapeutic indices may be less toxic and/or more therapeutically effective.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

EXAMPLES

Materials and Methods for Examples 1-3

Materials

Centricon filters were purchased from Amicon (Beverly, MA). Super Blue TMB Microwell Substrate was a product of KPL (Gaithersburg, MD). Microwell plates for ELISA (high-binding, flat bottom) and standard tissue culture plastic were purchased from Corning/Costar (Cambridge, MA). Ultralink Bio-support beads (50-80 μm diameters) for equilibrium binding studies were purchased from SapidyneInc (Boise, ID). Horseradish peroxidase-labeled goat anti-human IgG were purchased from Jackson ImmunoResearch Laboratories (Catalog; AB_2337577, West Grove, PA). Fetal bovine serum (FBS) (low IgG) was from Hyclone Laboratories (Logan, UT). HEPES-buffered saline (HBS, 137 mM NaCl, 3 mM KCl, 10 mM HEPES, pH 7.4) was prepared using reagents from Fisher Scientific (Pittsburgh, PA). L-glutamine (Catalog; 25030149), Penicillin-Streptomycin (Catalog; 15140122) from Fisher Scientific, Pittsburgh, PA), and bovine serum albumin (BSA) (fraction V, metal-free (Catalog; 10735094001) from Sigma Aldrich Inc St. Louis, MO 68178.

Cell Lines

The P1B6H7 and P1C3H9 hybridomas were grown in Dulbecco's Modified Eagle's Medium (DMEM) (Gibco BRL, USA) supplemented with 10% (v/v) FBS (Gibco BRL, USA), 100 U/ml penicillin (Gibco BRL, USA) and 100 µg/mL streptomycin (Gibco BRL). ExpiCHO-S cells used for transient expression of antibody were obtained from Thermo Fisher Scientific (Waltham, MA) and cultured according to the manufacturer's protocol.

Generation of Recombinant Chimeric Antibodies, Production, and Purification

Total RNA was extracted from P1B6H7 and P1C3H9 hybridomas cells using QIAGEN's RNeasy Kit. cDNA was synthesized from RNA using SuperScript™ III First-Strand system for reverse transcription (RT)-PCR (Invitrogen Cat-Log: 8080051) according to the manufacturer's protocol using oligo (dT) and random hexamer primers. The variable region sequences of heavy-chain and light-chain genes were amplified from the cDNA using primer sets (Table 6). PCR reactions were performed in a volume of 50 µl with 4 µl cDNA using Phusion®, High-Fidelity PCR master Mix with HF Buffer (New England BioLabs, Ipswich, MA). The PCR reactions were carried out for 35 cycles, using annealing temperature (Tm) 58±2° C. The size of PCR products was verified by agarose gel electrophoresis. All primers used in Ig gene-specific PCRs included restriction sites (AgeI and Sal/I for IgGH, AgeI and BsiWI for Igk), which allowed direct cloning into expression vectors containing the human IgGH, IGK constant regions, respectively. Ligation of PCR-amplified variable regions of the heavy and light chains of P1B6H7 and P1C3H9 antibodies were performed using In-Fusion® HD Eco-Dry T Cloning Kit (Takara Bio USA) fused into linear human IgG1/kappa vectors, respectively. Each ligation reaction was used to transform 50 µL of One Shot™ TOP10 Chemically Competent E. coli (Thermo Fisher Scientific, Waltham, MA). The transformed single bacterial colonies were used to re-amplify and isolate plasmid DNA, and subsequently clones were sequenced by Sanger sequencing. The sequences were assembled and assessed for translation into functional polypeptides using SnapGene 5.0.7 software and were analyzed in IMGT-VQUEST. Amino acid sequences predicted from the nucleic acid sequence were numbered and designated CDRs of light and heavy chain of isolated immunoglobulin genes were defined using VBASE2.

ExpiCHO-S cell (Thermo Fisher Scientific) were used for recombinant antibody expression. Transfection reactions were carried out using both correct sequenced variable region of heavy- and light-chain plasmid DNA with a 1:1 ratio 1 µg plasmid per 1 mL culture using an Expi-Fectamine™ CHO Transfection Kit (Catalog, A29129, Thermo Fisher Scientific) including other supply reagents according to the manufacturer's instructions. The transfected cells incubated for an additional 3-6 days, at which time the conditioned medium was collected as recombinant chimeric antibodies (rchmAb) culture supernatant for analysis. The functionality of isolated VH/VL combination antibodies were validated by ELISA and Western analysis.

Figure 14:
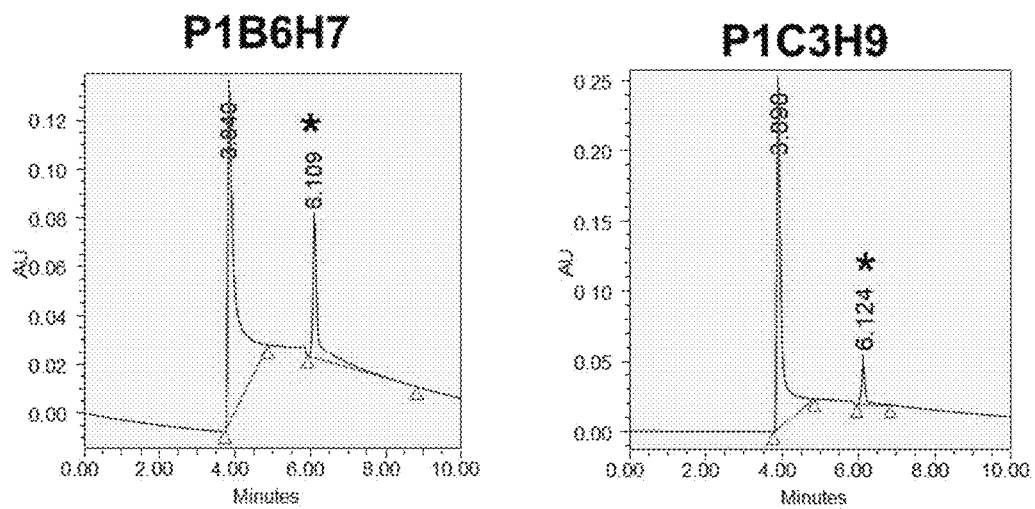
FIG. 14. High Performance Size exclusion chromatographic (HP-SEC) analysis of mAbs P1C3H9 and P1B6H7. Samples (2 μL, 1 mg/mL in PBS, pH 7.4) were injected to a binary UPLC system (Waters, Milford, MA) equipped with an Acquity UPLC BEH SEC200 column (Waters, 200 Å, 1.7 μm, 4.6×100 mm). A 100 mM sodium phosphate buffer. pH 6.8 was used as an eluent in isocratic mode from 0 to 10 min. Column and autosampler temperature were ambient. Data analysis was performed using Empower software (Waters, Milford, MA). The asterisk (*) represents the peak that was also detected in the blank.

The chimeric IgG1/k antibodies were purified using a HiTrap™ MabSelect™ PrismA 5 mL column (Cytiva, Catalog: 17549852, MA) according to the manufacturer's protocol. Briefly, ExpiCHO-S cell culture supernatants were loaded on protein A agarose column to capture expressed IgG in the medium, then washed with 20 mM sodium phosphate, 250 mM sodium chloride (NaCl), pH7.4, followed by an additional wash with 20 mM sodium phosphate, pH 7.4, before elution with 100 mM sodium acetate, pH 3.5 and subsequently neutralized by 0.1 M Tris-HCl (pH 9.0). The purified IgG was further equilibrated in phosphate-buffered saline (PBS), pH 7.4 and concentrated using a Centricon centrifugal concentrator (30 KD MW cutoff, Fisher Scientific) at 4° C. Levels of endotoxin in each batch of purified antibody were determined to be <1 EU/mg of antibody measured by a LAL chromogenic quantitation kit (Thermo Scientific). The purified mAbs were subjected to matrix-assisted laser desorption/ionization time-of-flight mass spectrometry to determine molecular weight homogeneity and the presence of contaminating proteins (Supplementary Figure S5). High performance-size exclusion chromatography was also performed to assess aggregation states of the mAbs. Negligible aggregation was observed in the purified P1B6H7 and P1C3H9 that has been stored at −20° C. for over 3 months of storage (FIG. 14).

Molecular Modeling of the Antigen-Binding Domain of Anti-Fentanyl mAb

The homologues modeling structures of the murine antibodies (IgG1/k) P1B6H7 and P1C3H9 single-chain variable fragments were generated using Chemical Computing Group MOE software (Chemical Computing Group ULC, Montreal Canada) and models were visualized with the program PyMoL (Schrödinger Inc., New York, New York). To understand the molecular interaction of fentanyl hapten ligand with the P1B6H7 and P1C3H9 antibodies, MOE software was used to analyze antigen-antibody docking. The PDB structure of fentanyl ligand was obtained from the PubChem compound database. In this study, the fentanyl ligand affinity score was obtained when ligand binds to antibody paratope. Furthermore, rigid, and induced fit (flexible) dockings were performed using the MOE software package. In MOE, all antibody structures were subjected to energy minimization using the CHARMM force field, and docking was performed with the 'Rigid Receptor' and 'Induced Fit' docking protocols. The docking was performed using the 'Triangle Matcher' placement method, which is the most efficient method for well-defined binding sites. All conformations per ligand were scored using the 'London dG' scoring function, submitted to a refinement step based on molecular mechanics and rescored with the 'GBVI/WSA dG' scoring function. GBVI/WSA dG, a force field-based scoring function, determines the binding free energy (kcal/mol) of the ligand from a given pose.

In this study, the rotamer explorer RMSD limit was set to 2.0 Å, energy window to 4 kcal/mol and residues farther than 4.5 Å were kept fixed, and 10 ligand binding poses were ranked according to their CDOCKER energies. The electrostatic density of P1B6H7 and P1C3H9 antibodies and the binding pockets were predicated and visualized with the program MOE software. To predict the most critical binding contacts between the P1B6H7 and P1C3H9 antibodies and fentanyl ligand, Chemical Computing Group MOE software was used as described software method.

Passive Transfer Experiments in Mice

Female BALB/c mice, 6-7 weeks of age received 1.0 mg of each test mAb by i.v. injection in the tail vein. Mice in the control group received saline. Thirty minutes after test mAb administration, animals received an s.c. fentanyl (0.1 mg/kg) challenge dose. This route has been used previously to evaluate anti-fentanyl vaccines. Antinociceptive effects were assessed 15 min after each fentanyl injection using tail immersion.

The tail-immersion assay involved immersing the mouse tail in a water bath set at 54° C. The latency times were measured with a cutoff time of 8 sec to prevent tail injury. Antinociception, measured as % Maximum Potential Effect (% MPE), was calculated using equation (1):

$$\% \ MPE = \frac{\text{Post fentanyl injection latency time} - \text{baseline latency time}}{\text{Cutoff latency} - \text{baseline latency time}} \times 100 \quad (1)$$

Analysis of Fentanyl in Blood and Brain

The collected brain tissues were homogenized using a Benchmark Bead Bud 6 homogenizer. Samples were weighed in a tared 2 mL microcentrifuge tube with ceramic beads, then diluted with 2:1 ratio 1×DPBS. The tubes were then mixed at 6 m/s for 30 seconds, with a 30 second pause between each of the 3 cycles. The tubes were then transferred to a standard benchtop centrifuge and spun at 500×g for 2 minutes, and homogenized brain samples were aspirated into clean 2 mL microcentrifuge tubes. Blood samples were prepared by standard benchtop centrifugation at 3100×g for 3 minutes, and the resulting supernatant transferred to a new tube.

Samples were spiked with 10 µL of fentanyl-d5 internal standard (100 ng/mL in methanol). Next, 100 µL of the respective samples were combined with LC-MS grade acetonitrile (3:1, vol:vol) and spun down at 9300×g for 10 minutes at 4° C. Following centrifugation, the supernatant was collected in 18-150 mm glass tubes, and dried with nitrogen gas or air at 40-50° C. Samples were then reconstituted with 200 µL 1×DPBS and rapidly vortexed. Potential high abundant interferents in the sample such as phospholipids were eliminated using solid-phase extraction. Samples were applied to Bond Elute Plexa PCX cartridge and eluted by a fresh mixture of acetonitrile and ammonium hydroxide (95:5, vol:vol). The eluate was dried and reconstituted in 100 µL of 10 mM ammonium formate with 0.1% formic acid for LC-MS/MS analysis.

The resulting samples were then analyzed using a Waters Acquity UPLC system with Tandem Quadrupole Detector as previously described.37 The detailed method is provided in Tables S4 and S5. The samples were run under the column conditions ACQUITY HSS T3, 2.1×100 mm, 1.8 µm at 65° C. The strong and weak wash were 90% acetonitrile in water and 10% methanol in water, respectively. The following mobile phases were used: Mobile phase A (10 mM ammonium formate with 0.1% formic acid) and mobile phase B (methanol with 0.1% formic acid). The instrument ran at a flow rate of 500 µL/minute, and injection volume of 10 µL, and 8.0 minutes per sample. Internal standard technique was used for quantification. The limit of quantification was 0.25 ng/mL fentanyl.

Data Analysis

GraphPad Prism 8 (GraphPad Software, La Jolla, CA) was used for all statistical analyses and graphing of data. Ordinary one-way ANOVA with Bonferroni correction for multiple comparisons was used for statistical analysis of the blood-brain fentanyl distribution data. Differences were considered significant if $p \leq 0.05$. All values represent the mean±standard error of the mean (SEM).

Example 1. Antibody Generation

All animal studies were conducted under an approved animal use protocol in an Association for Assessment and Accreditation of Laboratory Animal Care International (AAALACi)-accredited facility in compliance with the Animal Welfare Act and other federal statutes and regulations relating to animals. Experiments involving animals adhered to the principles stated in the Guide for the Care and Use of Laboratory Animals, 8th edition. A vaccine composed of a fentanyl hapten conjugated to tetanus toxoid (TT-para-AmFenHap) and adjuvanted with liposomes containing monophosphoryl lipid A adsorbed on aluminum hydroxide was used to immunize mice. Female BALB/c mice (n=10 per group) were immunized intramuscular (i.m.) on weeks 0, 3, 6, and 14 using 50 µL of the vaccine formulation as described. This dose contained 10 µg of TT-para-AmFenHap (based on the protein content of the protein hapten conjugate), 20 µg of synthetic monophosphoryl 3-deacyl lipid A (3D-PHAD) in ALF43, and 30 µg of aluminum in aluminum hydroxide (Alhydrogel) in DPBS pH 7.4. ALF43 contained DMPC/DMPG/cholesterol/3D-PHAD at a molar ratio of 9:1:7.5:1.136; the molar ratio of phospholipids/3D-PHAD was 8.8:1. Mice were boosted at week 38 with 10 µg TT-para-AmFenHap, 20 µg 3D-PHAD in ALF43, without Alhydrogel by the intravenous route in the tail vein. Three days after boost, an animal was euthanized and the spleen was removed, homogenized and splenocytes were collected and washed with ClonaCell™-HY Medium B (serum-free). A ClonaCell™-HY Hybridoma Kit (STEMCELL Technologies) was used for the fusion and cloning of the hybridoma. Briefly, the resulting B-cells were fused with X63Ag8.653 nonproducing mouse myeloma cells using PEG 3350 and cultured overnight in ClonaCell™ Medium C in a 75 cm2 tissue culture flask. 0000005590-ClonaCell_HY_Hybridoma_Cloning_Kit) The next day the cells were placed in methylcellulose containing medium containing HAT (hypoxanthine, thymidine and aminopterin) and transferred to 100 mm culture plates. Ten-14 days later clones were picked and expanded.

Hybridomas were selected based on the ability of cell culture media to bind BSA-para-AmFenHap in ELISA using the method described previously. Positive clones were recloned in methylcellulose, colonies were selected, expanded and assayed as described above. Two hybridomas that showed high absorbance reading were selected (P1B6H7 and P1C3H9). Monoclonal antibodies were isotype IgG1 heavy chain and kappa light chain, respectively.

Example 2. Anti-fentanyl Antibody Binds Fentanyl and Fentanyl Analogs with High Affinity 1. Affinity and IC50 Determination Antibody affinity by serum binding was measured using equilibrium dialysis (ED), as described previously (Torres, et al (2016) *Anal Bioanal Chem* 408:1191-1204). Mouse sera from week 16 were diluted with 0.05% BSA in DPBS, pH 7.4 (ED buffer) containing 5 nM of fentanyl or fentanyl analog. An aliquot (100 µL) was seeded into sample chambers of rapid ED plate, and the buffer chamber was filled with 300 µL of ED buffer. The plate was incubated at 4° C. and 300 rpm for 24 h in a thermomixer. Aliquots (90 µL) from sample and buffer chambers were pipetted out, spiked with 1 µL of 10% FA, and analyzed by LC-MS/MS. The Kd of antibodies in serum was measured using competition ED as noted. Briefly, mouse sera were diluted with 5 nM of isotopically labeled tracer drug (dx where x=3, 5, or 6 heavy isotopes) in ED buffer at a serum dilution that yielded 50% binding in the serum binding experiments. The buffer chambers were filled with ED buffer that contains an increasing concentration of unlabeled competitor drug (final concentration, 0 to 40 nM). Drug levels in the sample and buffer chambers were quantified after 24 h and fraction bound was calculated. Using the competition ED-LC-MS/MS procedure, the Kd values of fentanyl and selected fentanyl analogs were measured. The detailed LC-MS/MS method has been previously described (Barrientos R C, Bow E W, Whalen C, Torres O B, Sulima A, Beck Z, Jacobson A E, Rice K C, Matyas G R. Novel vaccine that blunts fentanyl effects and sequesters ultrapotent fentanyl analogues. Mol Pharm. 2020; 17(9):3447-60. doi:10.1021/acs. molpharmaceut.0c00497) and provided in (Tables 9 and 10). These values translated to nanomolar affinities following the order: cyclopropyl fentanyl (0.36 nM)~furanyl fentanyl (0.44 nM)~fentanyl (0.56 nM)>para-fluorofentanyl (1.16 nM)>carfentanil (4.66 nM). The relative antibody binding site concentrations for these analogs was calculated using the relationship between fraction bound at equilibrium and Kd values, as proposed by Müller (Muller (1983) *Methods Enzymol* 92: 589-601). The relative antibody binding site concentrations obtained were 13.83±1.62 µM (fentanyl), 15.67±1.08 µM (cyclopropyl fentanyl), 18.8 4±1.60 µM (furanyl fentanyl), 12.99±1.49 µM (para-fluorofentanyl), and 1.44±0.18 µM (carfentanil). Half maximal inhibitory concentration (IC50) was interpolated using four-parameter logistic curve (plot of % inhibition vs concentration of the competitive inhibitor). The % inhibition values were obtained were calculated as described before (Torres, et al (2016) *Anal Bioanal Chem* 408:1191-1204).

Drug binding of antibody was measured using equilibrium dialysis (ED). Briefly, mAbs were diluted with 0.05% BSA in DPBS, pH 7.4 (ED buffer) containing 5 nM of a drug. The following drugs were tested: fentanyl, cyclopropyl fentanyl, furanyl fentanyl, methadone, naloxone, buprenorphine, and methadone. An aliquot (100 µL) was seeded into sample chambers of the ED plate and the buffer chamber was filled with 300 µL of ED buffer. The plate was incubated at 4° C. and 300 rpm for 24 h in a thermomixer. Aliquots (90 µL) from sample and buffer chambers were pipetted out and analyzed by LC-MS/MS. The detailed method of the LC-MS/MS method has been previously described.

Determination of Ks used competition ED as noted. Briefly, mAb was diluted with 5 nM of isotopically labeled tracer drug ($d_x$ where x=3 or 5 heavy isotopes) in ED buffer at a serum dilution that yielded 50% binding in the serum binding experiments. The buffer chambers were filled with ED buffer that contains an increasing concentration of competitor drug (final concentration, 0 nM to 40 nM). Half maximal inhibitory concentration ($IC_{50}$) was interpolated using four-parameter logistic curve (plot of % inhibition vs. concentration of competitive inhibitor). The % inhibition values were obtained using equation (3) and were used to calculate $K_d$.

2. Serum or Antibody Binding of Fentanyl and Fentanyl Analogs.

The binding ability of antibodies to fentanyl was assessed by ED followed by LC-MS/MS. To limit nonspecific binding and to permit multiple measurements from limited serum samples, sera were diluted subsequent to measurements. This was acceptable, given that the endpoint titers measured were sufficiently high (vide supra). Preimmune (week 0) and postimmune (week 16) sera were diluted with 5 nM fentanyl in ED buffer and dialyzed against buffer for 24 h using a semipermeable membrane with 12 kDa MWCO. Dilutions were chosen such that 100% of the initial concentration of 5 nM fentanyl is bound (1:400 to 1:51, 200). The amount of fentanyl in both sample and buffer chambers was quantified and used to determine fraction bound. Postimmune sera effectively bound fentanyl (fraction bound ≥0.60) even at very high serum dilution (1:6400) in contrast to preimmune sera (fraction bound <0.25) in all dilutions tested (1:400 to 1:51, 200). The serum-binding property of fentanyl analogs carfentanil, cyclopropyl fentanyl, (±)-cis-3-methyl fentanyl, para-fluorofentanyl, and furanyl fentanyl were then measured. These were chosen because they have been among the most commonly seized fentanyl analogs by law enforcement within the last 5 years according to the U.S. National Forensic Laboratory Information System (NFLIS). For ease of comparison with fentanyl, the analyses for all the compounds were performed at serum dilutions of 1:400 to 1:51, 200, except for carfentanil, where the analysis was performed at serum dilutions of 1:200 to 1:6400. It was found that binding of all of the tested analogs were significantly higher in postimmune compared to preimmune sera. Analogs with modifications at the N-alkyl moiety (cyclopropyl fentanyl and furanyl fentanyl) had comparable postimmune sera binding with fentanyl (fraction bound ≥0.60 at dilutions 1:400 to 1:6400). However, those that have modifications in the piperidine b), and phenyl (a) rings showed lower fraction bound at the same sera dilution. Specifically, the analogs (±)-cis-3-methyl fentanyl, para-fluorofentanyl, and carfentanil had fraction bound values of ~0.25, ~0.50, and ~0.25, respectively, at 1:6400 dilution. Norfentanyl (a metabolite of fentanyl that lacks the phenethyl group, i.e., ring c) was also tested and it was found that the fractions bound at 1:1600 to 1:6400 were less than those of fentanyl.

Example 3. Specificity of Anti-Fentanyl Antibodies to Fentanyl and Fentanyl Analogs To determine if the antibodies can cross-react with drugs used for opioid abuse therapy, serum binding was tested against methadone, naltrexone, buprenorphine, and naloxone using ED-LC-MS/MS. Binding to naloxone, methadone, buprenorphine, and naltrexone to postimmune sera was low (fraction bound <0.25) in all serum dilutions tested where fentanyl and fentanyl analogs were observed to bind (1:400 to 1:51,200). No difference was observed (p>0.05) in postimmune and preimmune serum binding of naloxone, methadone, buprenorphine, and naltrexone.

Results of Examples 1-3

Two clones, P1B6H7 and P1C3H9 emerged as the best hybridoma candidates. The cDNAs from these clones were synthesized using random hexamers and PCRs were amplified with respective V and J gene-specific forward and reverse primers carrying restriction sites including 15-bp overlap at 5' and 3' ends that can be engineered into the primers designed for PCR amplification of the desired sequences. All PCR products were cloned into linear vectors containing the human IgH1, and Igκ constant region genes using In-fusion cloning kits, respectively. Antibodies sequences of P1B6H7 and P1C3H9 were analyzed using Kabat of VH and VL sequences annotation. The light chain variable region of the P1B6H7 antibody gene belonged to immunoglobulin mouse $V_{κ6}$ subgroup and contained $J_{κ1}$ gene segment; the heavy chain belonged to Viii subgroup gene family with $J_{H2}$ and $D_1$ segments. Similarly, the light chain variable region of the P1C3H9 antibody gene belonged to immunoglobulin mouse $V_{\kappa 2}$ subgroup and contained $J_{\kappa 1}$ gene segment; the heavy chain belonged to $V_{H3}$ subgroup gene family with $J_{H2}$ and $D_2$ segments. Amino acid sequences predicted from the nucleic acid sequence were numbered, and designated complementary determining regions (CDRs) of light and heavy chain of isolated immunoglobulin genes were defined using VBASE2 (www.vbase2.org).

Opioid sequestration by antibodies could be an effective approach to reduce the incidence of fatal overdose. By the law of mass action, high doses of opioid drugs will require a higher concentration of neutralizing IgG, which may depend on antibody affinity. This suggests that a more relevant metric of "effective" IgG concentration in vivo should account for the antibody-drug binding strength (i.e., Kd). The fentanyl-specific relative antibody binding site concentration was found to be ~13.83 μM. At this concentration, assuming a 25 g mouse with a total blood volume of ~2.0 mL, the maximum dose of fentanyl required to saturate antibodies is ~9.3 μg (~0.37 mg/kg dose in 25 g mouse, molar mass of fentanyl=336.47 g/mol). Indeed, immunized mice remained partially protected even up to 0.50 mg/kg dose, that is, ~12.5 μg fentanyl. The potency of fentanyl is much higher in humans than in rodents. While approximately 2 mg fentanyl is considered deadly in humans (i.e. ~0.029 mg/kg assuming 70 kg average human), mice have a fentanyl 50% lethal dose (LD50) value of ~4 mg/kg in male Swiss Webster mice. In this present disclosure, at the 4 mg/kg cumulative dose of fentanyl, all mice that generated antibodies survived. Control mice only received a maximum cumulative dose of 1 mg/kg. These results suggest that active vaccination using antibodies is a potential prophylactic to prevent fatal overdose due to fentanyl.

One important consideration in developing antibodies against opioids is the non-cross reactivity with opioid abuse pharmacotherapeutics. The present disclosure demonstrates that anti-fentanyl antibodies strongly bound fentanyl and relevant analogs in serum but not drugs such as naltrexone, buprenorphine, methadone and naloxone, which are used for opioid abuse management. Because recovering substance abusers who suddenly halt or begin to taper medications are among the most vulnerable population to opioid overdose, prophylactic immunization with opioid antibodies may offer them an additional layer of protection. Taken together, these findings emphasize that active immunization and pharmacotherapeutics could be used in combination to combat opioid use disorders.

Example 7. Drug Binding and Cross-Reactivity

We assessed whether the mAb candidates are able to sequester fentanyl and analogs in vitro using equilibrium dialysis-liquid chromatography-tandem mass spectrometry (ED-LC-MS/MS).37 Both mAb candidates P1C3H9 and P1B6H7 effectively bound fentanyl at 6.7 nM concentration of either mAb (FIG. 5a). The 50% fractional bound fentanyl were at 1:3200 dilution of the stock, corresponding to ~0.2 nM mAb. The antibody-drug dissociation constants (Kd) were in the nanomolar range (Table 5). We also tested other fentanyl analogs acryl fentanyl, cyclopropyl fentanyl, and furanyl fentanyl, and obtained a similar trend using their respective EC50 values (FIG. 5b-d). The EC50 corresponds to the mAb concentration that effectively bound 50% of the drug used in the assay. A low EC50 suggests a relatively higher affinity to the assayed drug.

To determine if recombinant antibodies are cross-reactive with drugs used for OUD therapy, we tested the binding against methadone, naltrexone, buprenorphine, and naloxone using ED-LC-MS/MS. Results showed that neither mAb had significant binding to these four drugs (fraction bound <0.25) (FIG. 5e-h).

Example 8. Molecular Modeling of the Antigen-Binding Domain of Anti-Fentanyl mAb We next investigated the molecular interactions of fentanyl with the two mAb candidates in silico. Sequence alignment for P1B6H7 and P1C3H9 antibody variable regions shows the heavy chains are 42% identical and light chains are 52.47% identical, respectively. The homologues modeling structures of the murine P1B6H7 and P1C3H9 (IgG1/κ) antigen-binding domains were generated using the Chemical Computing Group MOE software.

Figure 6:
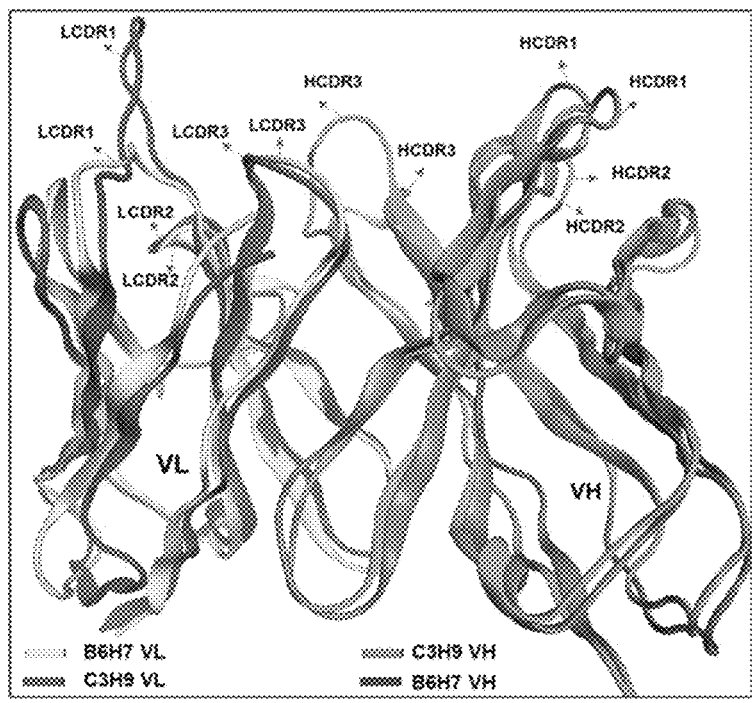
FIG. 6. Molecular modeling of mAbs and their interaction with the fentanyl ligand. 6a) Predicted 3-dimensional (3D) structures alignment of the variable domain of antibodies B6H7 and C3H9 single-chain variable fragments (scFvs) with a comparison of the binding pockets. P1B6H7 is yellow (VL) and dark red (VH). P1C3H9 is purple (VL) and green (VH). The CDRs are indicated using arrow mark, LCDR represents for light chain and HCDR represents for heavy chain, respectively. 6b) The residues forming binding sites with fentanyl ligand (gray black) of antibodies: P1B6H7 and P1C3H9. The elements of specific protein-ligand interactions are shown. The key residues of mAbs interact with fentanyl ligand are shown in red. (This modeling was done by Indiana Biosciences Research Institute, Indianapolis, Indiana, United States.)
Figure 6:
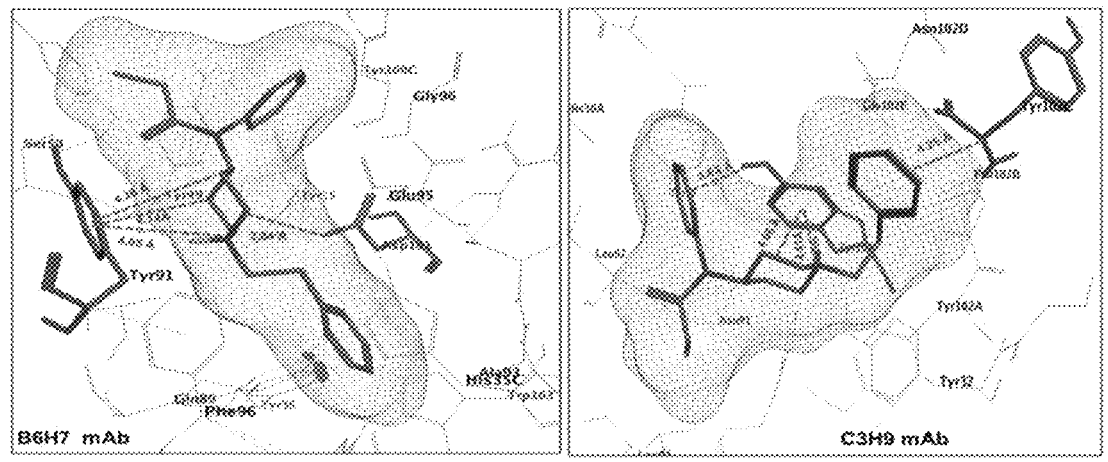
Figure 7:
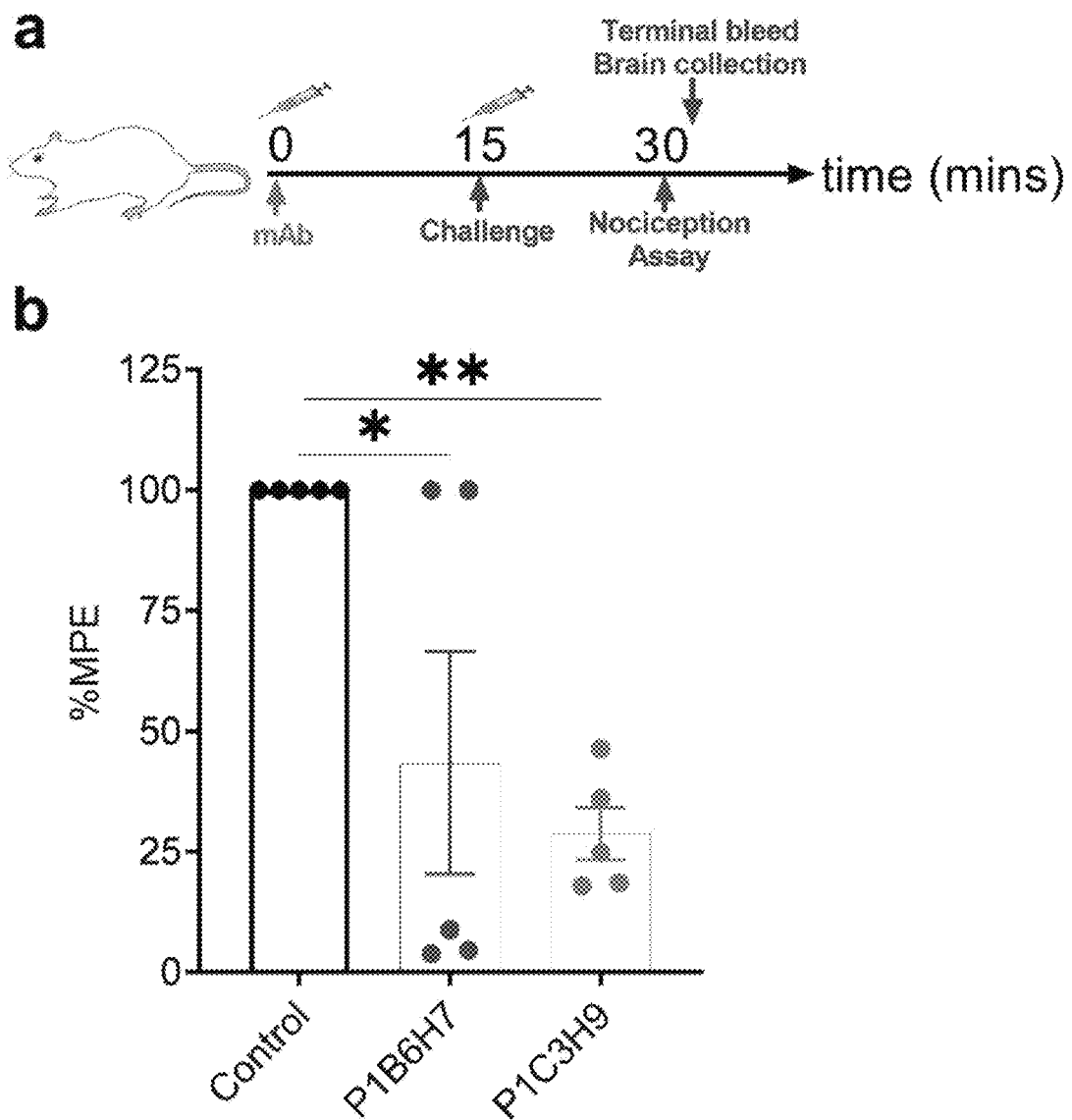
FIG. 7. Effect of mAb on the fentanyl-induced antinociception. Mice (n=5-7/group) were immunized with 1.0 mg of indicated mAb (i.v.) and challenged with 0.1 mg/kg fentanyl (s.c.). Controls did not receive mAb. Antinociception was measured 15 mins post-fentanyl using a tail immersion test. The percentage maximum possible effect (% MPE) was calculated as the posttest latency minus the pretest latency divided by the maximum time (10 seconds) minus the pretest latency times 100. Data shown are mean±s.e.m. Statistical analysis used ordinary one-way ANOVA with Bonferroni correction for multiple comparisons. *$p<0.001$, **$P<0.01$. Red: mAb P1C3H9, Blue: mAb P1B6H7, Black: Control.

The canonical structure designation of the complementarity-determining regions (CDR) loops was based upon the length of the loops and the presence of key residues at specific locations in the antibody sequence. The structural alignment (FIG. 6a) clearly indicated that the structure of these antibodies does not perfectly overlap, and structural differences are in the loop regions, including CDRs. LCDR1 in P1C3H9 is 5 residues longer than its counterpart in P1B6H7 (Table 1). The two antibodies bind the fentanyl ligand in dramatically different modes (FIG. 7). The energy of the final model was determined to be −3,546.84 kJ/mol for P1B6H7 and −3,816.92 kJ/mol for P1C3H9, for the fully minimized energy structures, and the root-mean-square deviation (RMSD) between the fully minimized structure and the initial model was 0.27 Å using all backbone atoms. In P1B6H7, the binding site was almost completely buried with the tip of its benzyl moiety facing solvent. In P1C3H9, the binding site was a groove, and it appears to rely on overall surface complementarity. The ligand interacting residues for the loops shown in FIG. 6(b,c) are summarized in Table 13.

Figure 10:
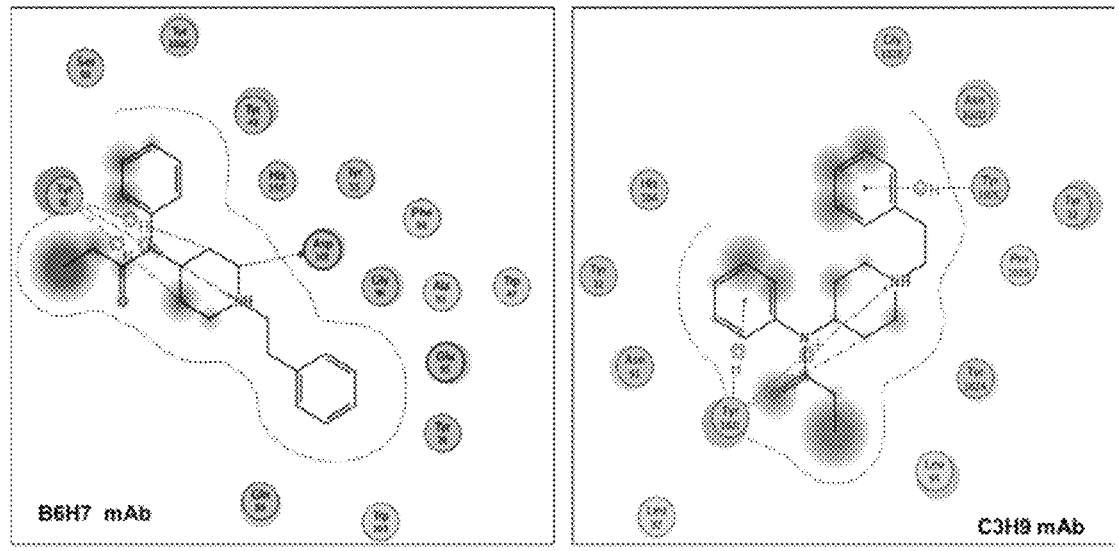
FIG. 10. Panel 10 a). The key residues of P1B6H7 and P1C3H9 interact with fentanyl ligand. Panel 10 b) the residues forming binding sites with Fentanyl ligand (gray black) of antibodies the residues of specific protein-ligand interactions are shown.
Figure 10:
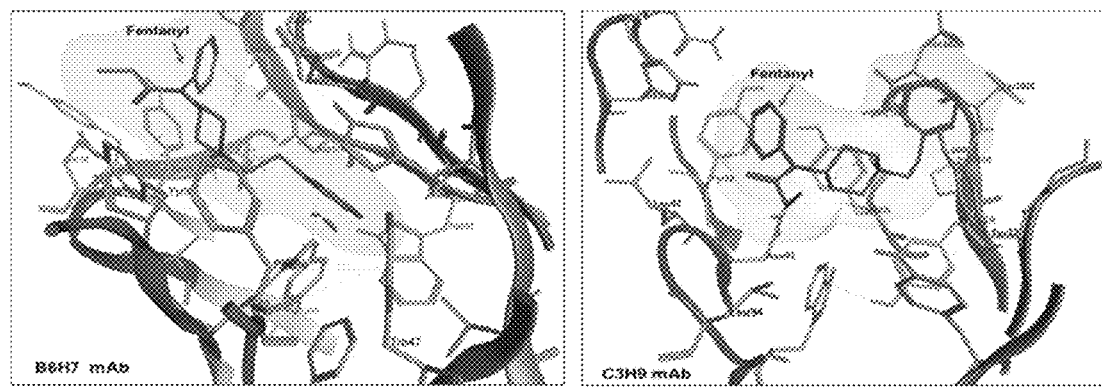

While all CDR loops are involved in forming the binding site of P1B6H7 antibody (FIG. 6b), only five CDR loops are involved in formation the binding site of P1C3H9 (FIG. 6c), with CDRL2 providing no direct contact to the ligand. The molecular structures of the fentanyl ligands bound to the two antibodies are remarkably similar (RMSD value 0.631 Å). A cationic ligand was involved in cation-π interactions with the antibody aromatic side chain, which may increase its binding affinity. The typical nonpolar hydrogen-π interactions are the interactions between hydrogen atoms, attached to carbon atoms, and the conjugate π-systems. In the case of P1B6H7, an aspartic acid (Asp H101) residue of the carboxyl group interacted with the carbon 1 position of fentanyl using a hydrogen donor. Fentanyl ligand's first nitrogen atom interacts with the π-cloud of the aromatic ring of tyrosine (Tyr L91) in a cationic-π interaction, as do the fentanyl ligand's carbon 2 and 4 (C4 and C8) hydrogen atoms interaction Tyr L91 as shown FIG. 6d and FIG. 10. In the case of P1C3H9, fentanyl ligand's nitrogen atom interacts with the π-cloud of the aromatic ring of tyrosine (Tyr H102c) in cationic-π interaction. The fentanyl ligand's carbon 4 (C4) hydrogen atom interacts with the π-cloud of the aromatic ring of tyrosine (Tyr H102I) through nonpolar hydrogen-π interaction. Similarly, fentanyl ligand's aromatic ring π-cloud interacts with Tyr H102I carbon's hydrogen and hydroxyl (OH) group through nonpolar π-hydrogen interaction, as shown in FIG. 6e and FIG. 10.

Example 9. Efficacy Assessment and Fentanyl Biodistribution In Vivo

The efficacy of CHO-cell produced and purified mAbs was assessed using tail immersion after a single fentanyl challenge dose (0.1 mg/kg, subcutaneous (s.c.)). We found that mice intravenously (i.v.) administered 1.0 mg of either mAb were significantly protected against fentanyl-induced antinociception as measured using a tail immersion assay 15 mins post-fentanyl dosing (FIG. 7). The control group exhibited the antinociceptive effects of fentanyl administration.

Figure 8:
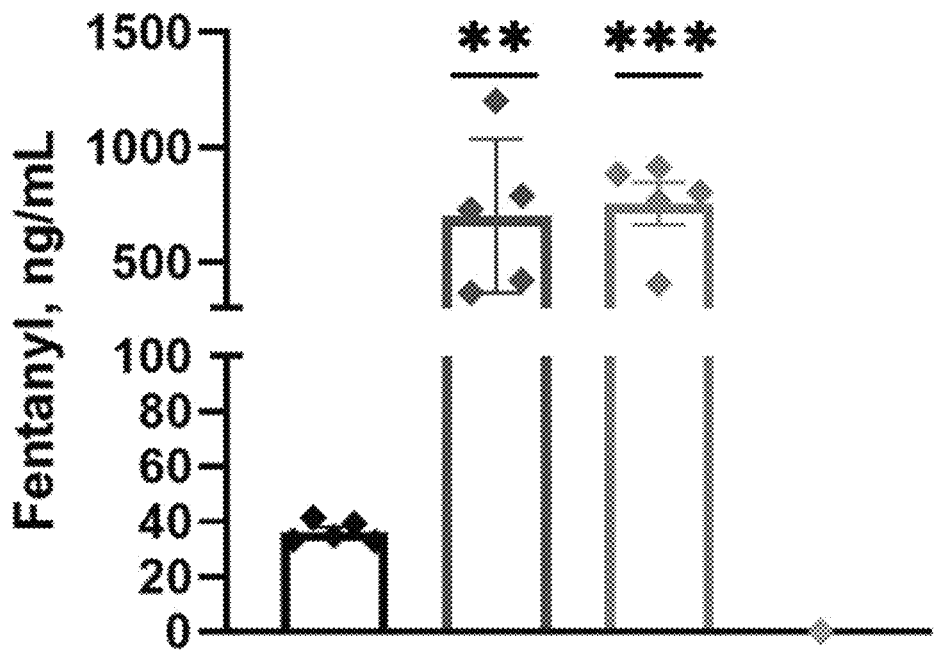
FIG. 8. Effect of mAb on the fentanyl-induced antinociception. Mice (n=5-7/group) were immunized with 1.0 mg of indicated mAb (i.v.) and challenged with 0.1 mg/kg fentanyl (s.c.). Controls did not receive mAb. Antinociception was measured 15 mins post-fentanyl using a tail immersion test. The percentage maximum possible effect (% MPE) was calculated as the posttest latency minus the pretest latency divided by the maximum time (10 seconds) minus the pretest latency times 100. Data shown are mean±s.e.m. Statistical analysis used ordinary one-way ANOVA with Bonferroni correction for multiple comparisons. *$p<0.001$, **$p<0.01$. Red: mAb P1C3H9, Blue: mAb P1B6H7, Black: Control.
Figure 8:
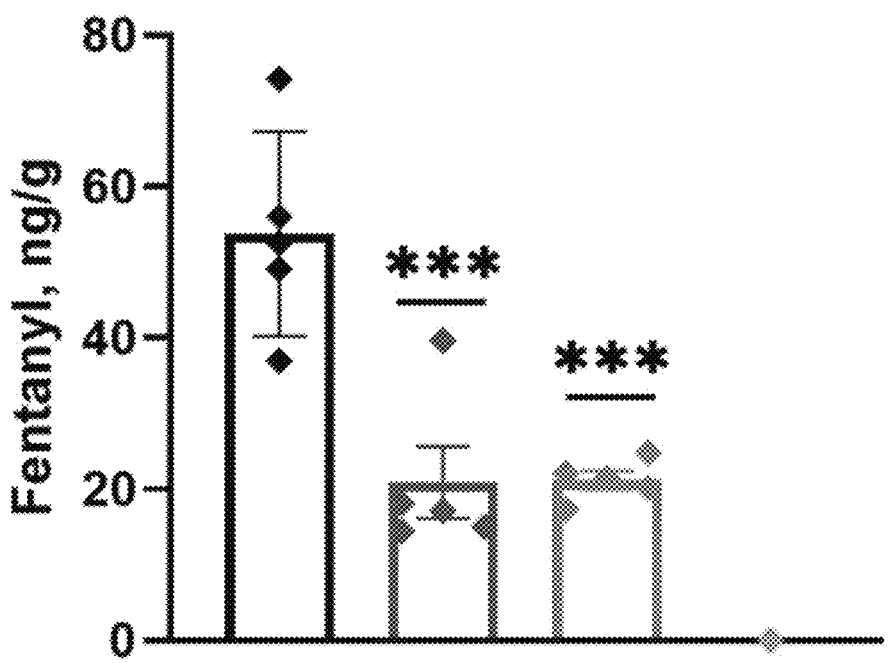
Figure 9:
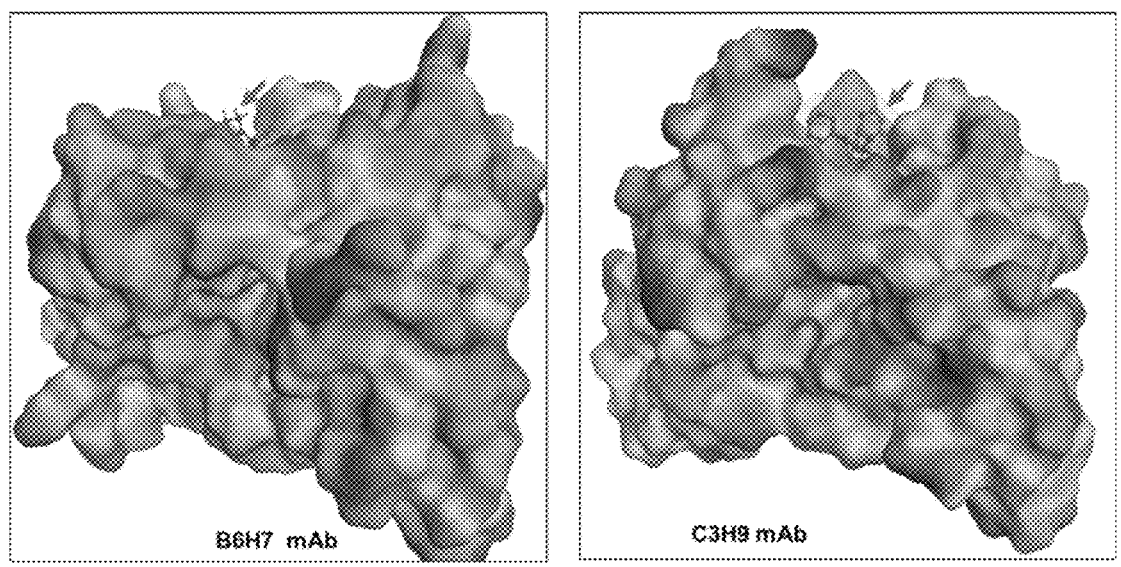
FIG. 9. Comparison of the topology of the binding sites of antibodies P1B6H7 and P1C3H9. Ligand (Fentanyl) in gray black indicated arrow. The ligand binding site for P1C3H9 appears more as a groove and that for P1B6H7 more like a deep pocket.

Immediately after the antinociception test, blood and brain were collected for fentanyl analysis using LC-MS/MS. In mice administered mAbs P1B6H7 and P1C3H9, fentanyl levels in the blood were significantly higher (by ~20-fold) compared to control (FIG. 8a). An opposite trend was observed in the brain (FIG. 8b), where the mAb recipients had significantly lower (~3-fold) fentanyl concentration in the brain compared to controls.

Example 10. Results of Examples 6-9

We have identified anti-fentanyl mAbs that can neutralize both fentanyl and some of its highly potent analogs, and block fentanyl activity in a preclinical model. In particular, we generated chimeric mAbs P1C3H9 and P1B6H7 and determined that 1) these mAbs bound fentanyl and fentanyl analogs (cyclopropyl fentanyl, acryl fentanyl, and furanyl fentanyl), but not drugs used for opioid abuse therapy (naloxone, naltrexone, methadone, or buprenorphine); 2) passive immunization protected mice from antinociceptive effects of fentanyl; and 3) both mAbs effectively sequestered fentanyl in the blood and prevented access to the brain.

This invention is the first chimeric mAbs that target fentanyl and its analogs. Opioid-targeting murine mAbs have been previously reported and found efficacious in animal models. In our work, the clones P1C3H9 and P1B6H7 were formed by the human constant domains and mouse variable domains. Mouse mAbs are not ideally suited for clinical use because they are typically immunogenic. Thus, human patients may generate antibodies that neutralize the mouse mAbs, making chronic antibody treatment ineffective. MAbs that contain human sequence, such as chimeric, humanized, or fully human mAbs, are more desirable for therapeutic purposes.

In silico molecular docking showed that the binding sites of these two antibodies have strikingly different topologies. As expected for a small antigen, the P1B6H7 binding site is a deep pocket that buries most of the ligand surface upon interaction. The fentanyl binding site of P1C3H9 can be described rather as a shallow depression on the protein surface, a topology that is considered to be more appropriate for larger antigens such as peptides. This change in binding site topology is due to conformational rearrangements of CDR loops and can therefore be directly attributed to their sequence differences.

The drastic difference in the overall topology of binding sites (pocket versus groove) allows P1B6H7 to bury a larger part of the ligand. This energetic deficiency due to electrostatic interactions in the P1C3H9-fentanyl complex is compensated by a stacking interaction between the fentanyl phenyl ring motifs and tyrosine (Tyr H102I), the interaction lacking in the P1B6H7-antibody complex. This compensation lowers the binding energy levels (Table 14), directly from the electrostatic interaction between n-electron clouds and from improved van der Waals interactions between protein and piperidine and phenyl moieties of the fentanyl ligand. Both antibodies use water-mediated hydrogen bonding and cation-n interaction between the nitrogen atom of fentanyl and a nearby tyrosine residues in both antibodies, and these should contribute equally to their binding affinity. It is important to note that in each case the interactions are with different parts of the antibody and that this does not appear to relate to activity or efficacy. One interesting conclusion drawn from our analysis of the two binding sites is that hydrophobic interactions contribute similarly to their respective binding affinities.

It is well understood that protein-protein recognition may be achieved in diverse ways, because of the vast number of possible epitopes in large antigens. It is also well understood that protein-protein recognition sites are large enough to provide high affinity via various sets of interactions. It is expected, however, that for progressively smaller ligands recognition may converge to a unique mode because the binding site must encompass the entire ligand and the number of potential antigenic determinants is reduced. Hence, the conclusion may be drawn that even small ligands that have a limited number of recognition determinants can bind to structurally diverse binding sites with comparable affinities.

Our mAb candidates bound to fentanyl and analogs with high affinity. We measured the affinities of P1C3H9 and P1B6H7 using ED-LC-MS/MS and found that the fentanyl Kd values (0.15±0.03 and 1.28±0.12 nM, respectively) are similar to the competitive IC50 of the lead 6A4 mAb reported by Smith et al. 32 that had ~10-11 M affinity and the mAb HY4-1F9 clone reported by Baehr et al., which had <2 nM. These affinity values, however, cannot be directly compared because different techniques were used to measure them. Nevertheless, the mAb candidates have been shown to bind tightly to target drugs. Strong binding mAb are desirable because they can be given at lower doses and still abrogate opioid effects. Both mAb P1C3H9 and P1B6H7 cross-reacted with potent fentanyl analogs acryl fentanyl, cyclopropyl fentanyl, and furanyl fentanyl, which have modifications at the N-acyl moiety (FIG. 5a-d). These analogs have similar or at least three-fold higher potency than fentanyl and have been found in postmortem specimens from opioid overdose victims.

Figure 11:
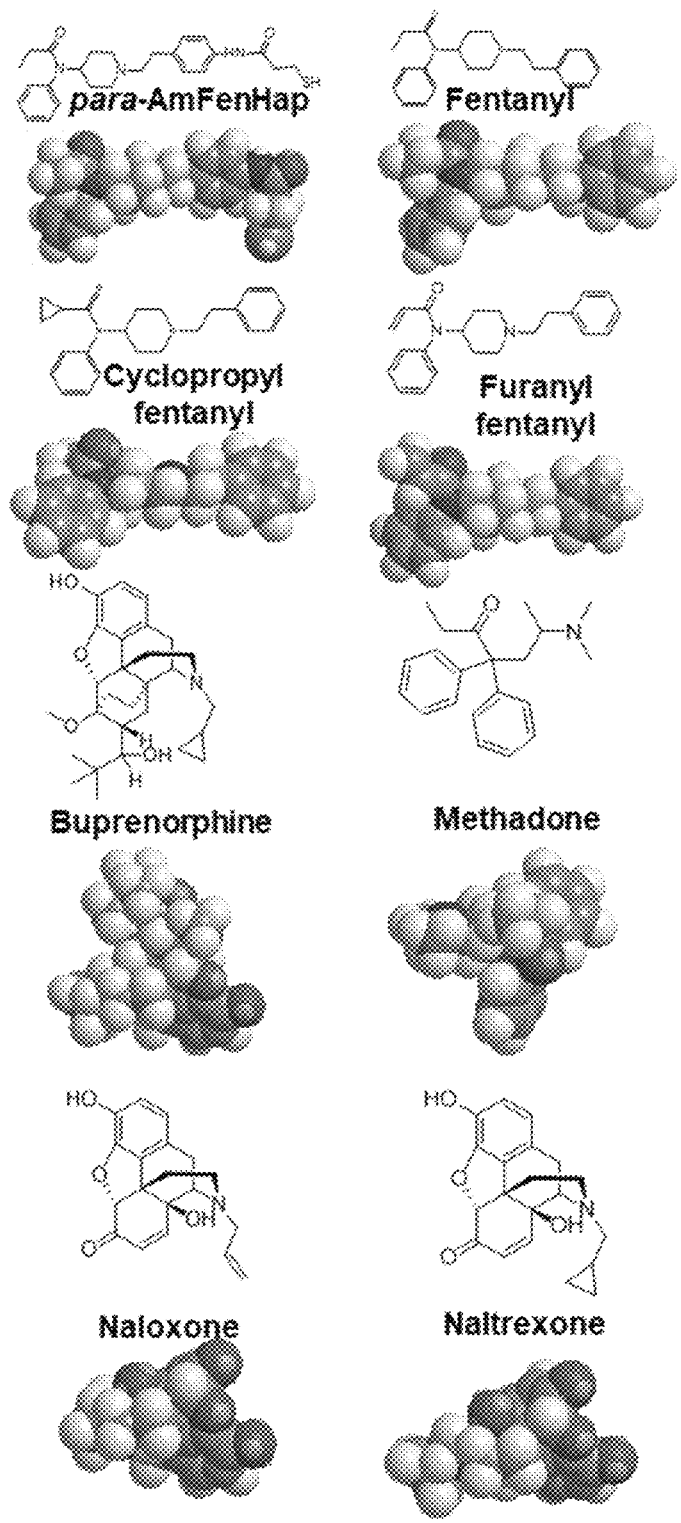
FIG. 11. Space-filling models of para-AmFenHap hapten and drugs tested for drug binding. Structures were drawn in ChemDraw 19.1 and minimized using the built-in MM2 method.
Figure 12:
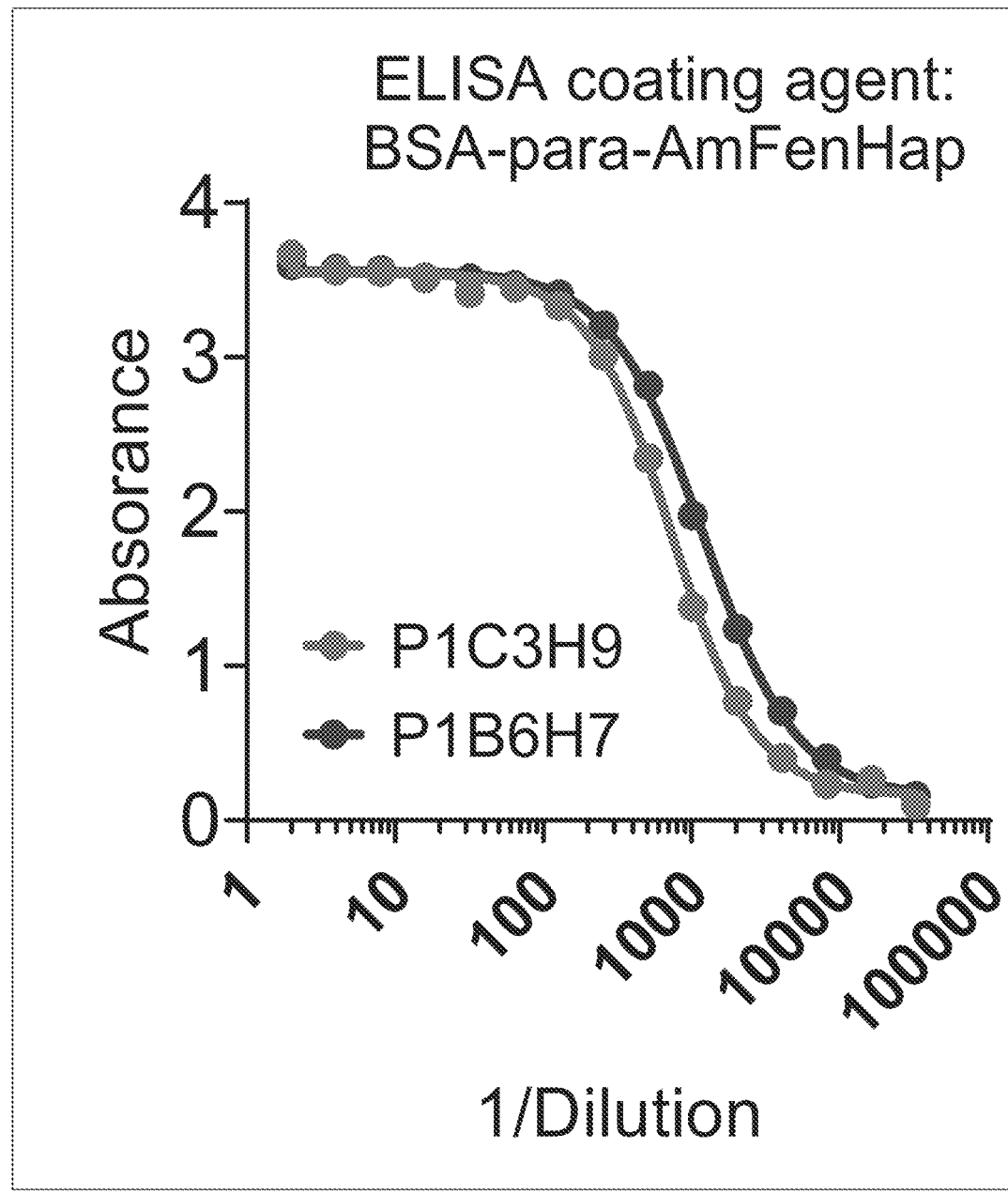
FIG. 12. Binding ELISA of the two mouse hybridomas P1C3H9 and P1B6H7. Coating agent used was BSA-para-AmFenHap.
Figure 13:
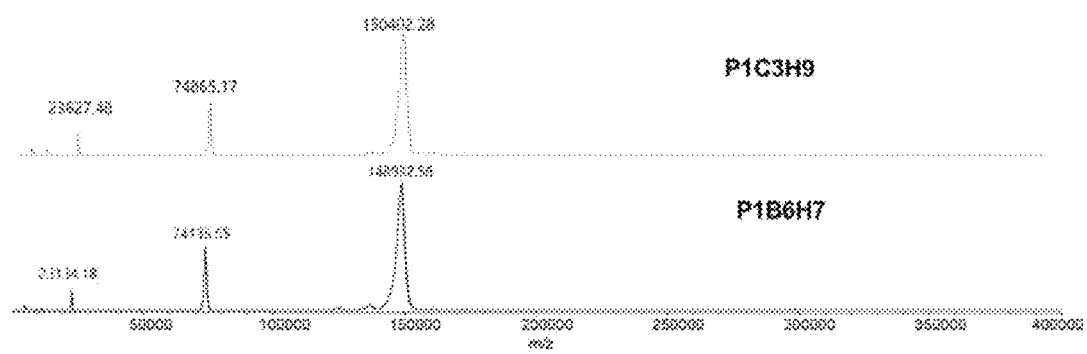
FIG. 13. MALDI-TOF mass spectrometric analysis of mAbs P1C3H9 and P1B6H7. Samples were mixed with sinapinic acid (10 mg/mL) in 50:50 ACN/H2O 0.1% formic acid (FA) and spotted on a MALDI-TOF 384-well stainless plate and loaded to the AXIMA MegaTOF instrument (Shimadzu Scientific Instruments, Columbia, MD). The instrument was calibrated using standard human serum IgG. MS were acquired using the following settings: tuning mode, linear; laser power, 60-80; profiles, 500; shots, 2 per profile. Spectra were smoothed using the Gaussian method, and masses were assigned using threshold apex peak detection method.

It is important that candidate therapeutics do not impede existing medications to OUD. The mAb candidates described here are not cross-reactive with OUD medications. Using ED-LC-MS/MS, we showed that mAb P1C3H9 and P1B6H7 did not bind methadone, buprenorphine, naloxone, and naltrexone (FIG. 5e-h). These findings are not surprising because the chemical structure of these drugs and the hapten used in the TT-para-AmFenHap vaccine are vastly different (FIG. 11). In the active immunization model, mice antisera also did not cross-react to these drugs. These results suggested that the mAbs presented here could be used in tandem with OUD medications for patients who are actively seeking therapy.

The mAb candidates protected mice from the antinociceptive effects of fentanyl. Mice that received 1.0 mg of the mAb P1C3H9 and P1B6H7 (~40 mg/kg, i.v., 25 g mouse) 15 mins before challenge with 0.1 mg/kg fentanyl (s.c.) had significantly reduced antinociception than unimmunized control as measured using a tail immersion test. This test, which evaluates spinal reflex, is one of the standards used to assess the antinociceptive effects of opioids. Previous works have used intraperitoneal (i.p.) administration of mAb and s.c. drug challenges. Typical protective mAb doses ranges from 30 to 120 mg/kg, with higher affinity mAb requiring lower dosing. A sublethal fentanyl challenge dose of 0.1 mg/kg is typically used in mouse models.

Predominantly, immunotherapeutics to drugs of abuse are believed to work by complexing the drugs in the periphery and preventing their access to the brain. We attempted to investigate this mechanism by challenging mice with fentanyl and quantify fentanyl concentrations in blood and brain. After the fentanyl challenge dose and antinociception measurement, mice were sacrificed, and blood and brain samples were immediately collected for fentanyl analysis. The mAb candidates altered the biodistribution of fentanyl in mice. We found that the fentanyl concentration in the blood is higher than in the brain for mice that received the mAbs. This result suggests that fentanyl has been effectively sequestered in the blood and has in effect been blocked from reaching the brain. The reverse is true for mice that did not receive the mAbs: fentanyl concentration was higher in the brain than in the blood.

Figure 5:
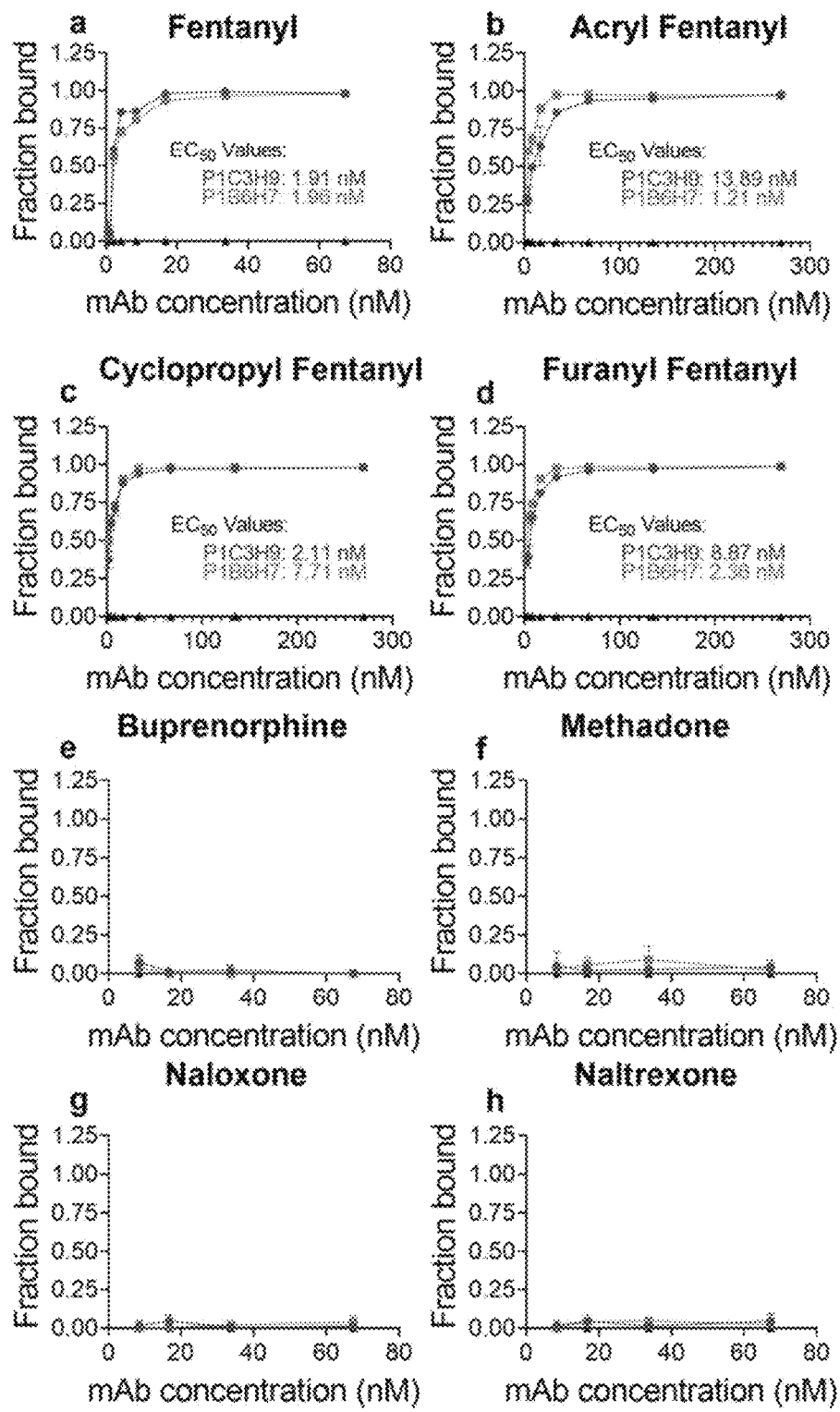
FIG. 5. Specificity and cross-reactivity of mAb. Stock mAb solutions in PBS (1.0 mg/mL) were diluted with a buffer that contained 5 nM of indicated drugs and dialyzed against buffer in an equilibrium dialysis plate. Drug concentrations in the sample and buffer chambers were determined after 24 h, and fraction bound was calculated. 5a) fentanyl, 5b) acryl fentanyl, 5c) cyclopropyl fentanyl, 5d) furanyl fentanyl, 5e) buprenorphine. 5f) methadone, 5g) naloxone, 5h) naltrexone. Data shown are mean±std dev of triplicate measurements. Red: mAb P1C3H9, Blue: mAb P1B6H7.

These observations are consistent with our equilibrium dialysis experiments where these mAbs were found to bind the drugs in vitro (FIG. 5). As such, it is prudent to assume that mAbs have complexed the drugs in the blood and prevented their access to the brain. Undoubtedly, much is needed to be learned on the mechanism of action of immunotherapeutics to drugs of abuse, a subject that remains a rich area for future research. This retention of fentanyl occurs because the mAb circulating in the periphery bind and trap free fentanyl immediately following s.c. administration. The blood-brain biodistribution measurements agree with the findings from the tail-immersion assay. Mice that had reduced fentanyl concentration in the brain and increased concentration in the blood had lower % Maximum Possible Effect (% MPE) compared to controls. Previous reports from the groups of Janda (Bremer P T, Kimishima A, Schlosburg J E, Zhou B. Collins K C, Janda K D. Combatting synthetic designer opioids: a conjugate vaccine ablates lethal doses of fentanyl class drugs. Angew Chem Int Ed Engl. 2016:55(11):3772-75. doi:10.1002/anie.201511654 Janda K D. Monoclonal antibodies for combating synthetic opioid intoxication. J Am Chem Soc. 2019 Jul. 3; 141(26): 10489-503. doi:10.1021/jacs.9b04872) and Pravetoni (Baehr C, Kelcher A H, Khaimraj A, Reed D E, Pandit S G, AuCoin D, Averick S, Pravetoni M. Monoclonal antibodies counteract opioid-induced behavioral and toxic effects in mice and rats. J Pharmacol Exp Ther. 2020:375(3):469-77. doi:10.1124/jpet.120.000124; Raleigh M D, Baruffaldi F, Peterson S J, Le Naour M, Harmon T M, Vigliaturo J R, Pentel P R, Pravetoni M. Alters Fentanyl Alters fentanyl distribution and protects against fentanyl-induced effects in mice and rats. J Pharmacol Exp Ther. 2019; 368(2):282-91. doi:10.1124/jpet.118.253674) on the analysis of fentanyl in blood and brain from either actively or passively immunized mice gave comparable results.

In our study, mice were challenged with 0.1 mg/kg (s.c.) fentanyl. Mice are typically less sensitive to opioids compared to humans. The documented lethal dose for mice was ~4 mg/kg, while it is ~0.03 mg/kg in humans (~2 mg, 70 kg average human). Our study revealed that in vivo, a 1 mg i.v. dose of mAbs (~40 mg/kg, 25 g mouse) could bind and prevent ⅓ of the 0.1 mg/kg fentanyl from reaching the brain. In a real-word scenario where humans receive ~2 mg of fentanyl, and assuming other factors remain constant, a dose of ~40 mg/kg of mAb given prophylactically could prevent fatal overdose. The purpose of the mAbs is to act as a prophylactic and not an antidote to overdose in patients who relapse. Taken together, the data presented in this study indicate that mAbs P1B6H7 and P1C3H9 are highly effective in an in vivo mouse model and warrant further clinical development.

TABLE 2

Sequence Identifiers (SEQ ID NO) of Selected Embodiments of the Present Invention

| Antibody | Complete amino acid sequence | | Complete polynucleotide sequence | |
| --- | --- | --- | --- | --- |
|  | Heavy Chain | Light Chain | Heavy Chain | Light Chain |
| P1B6H7 | 1 | 2 | 17 | 18 |
| P1C3H9 | 9 | 10 | 19 | 20 |

TABLE 3

Antibody Affinity (Kd) and Relative Antibody Binding Site Concentrations ([Ab]) of Fentanyl and Selected Fentanyl Analogs in Vitro as Measured Using Competition ED-LC-MS/MS

| Drug | Kd (nM) | [Ab] (µM) |
| --- | --- | --- |
| Fentanyl | 0.56 ± 0.13 | 13.83 ± 1.62 |
| cyclopropyl fentanyl | 0.36 ± 0.06 | 15.67 ± 1.08 |
| carfentanil | 4.66 ± 0.67 | 1.44 ± 0.18 |
| furanyl fentanyl | 0.44 ± 0.08 | 18.84 ± 1.60 |
| para-fluorofentanyl | 1.16 ± 0.20 | 12.99 ± 1.49 |

TABLE 4

Half-maximal inhibitory concentration (IC50)[a]

| Drug | IC50 (nM)[b] |
| --- | --- |
| Fentanyl | 2.89 ± 0.32 |
| Cyclopropyl fentanyl | 2.36 ± 0.16 |
| Carfentanil | 10.96 ± 1.14 |
| Furanyl fentanyl | 2.89 ± 0.24 |
| para-Fluorofentanyl | 4.70 ± 0.48 |

[a]Using pooled, post-immune (week 16) sera
[b]Mean ± SD of triplicate determinations

TABLE 5

Antibody-drug dissociation constants (Kd) of chimeric mAb.

| | Antibody affinity (Kd), nM | Antibody affinity (Kd), nM |
| --- | --- | --- |
| Drug target | P1C3H9 | P1B6H7 |
| Fentanyl | 0.15 ± 0.03 | 1.28 ± 0.12 |

TABLE 6

List of primers for amplification of variable heavy and light chain from mouse hybridoma.

Heavy chain specific primers

| Name | Sequence |
|---|---|
| PmuFVH 1 | CTAGTAGCAACTGCAACCGGTGTACATTCTGARGTGMAGCTGKTGGAGAC (SEQ ID NO: 21) |
| PmuFVH 2 | CTAGTAGCAACTGCAACCGGTGTACATTCTCAGGTGCAAMTGMAGSAGTC (SEQ ID NO: 22) |
| PmuFVH 3 | CTAGTAGCAACTGCAACCGGTGTACATTCTGAVGTGMWGCTGGTGGAGTC (SEQ ID NO: 23) |
| PmuFVH 4 | CTAGTAGCAACTGCAACCGGTGTACATTCTCAGGTTAYTCTGAAAGAGTC (SEQ ID NO: 24) |
| PmuFVH 5 | CTAGTAGCAACTGCAACCGGTGTACATTCTGAKGTGCAGCTTCAGSAGTC (SEQ ID NO: 25) |
| PmuFVH 6 | CTAGTAGCAACTGCAACCGGTGTACATTCTCAGATCCAGTTSGYGCAGTC (SEQ ID NO: 26) |
| PmuFVH 7 | CTAGTAGCAACTGCAACCGGTGTACAMTCTCAGRTCCAACTGCAGCAGYC (SEQ ID NO: 27) |
| PmuFVH 8 | CTAGTAGCAACTGCAACCGGTGTACATTCTGAGGTGMAGCTASTTGAGWC (SEQ ID NO: 28) |
| PmuFVH 9 | CTAGTAGCAACTGCAACCGGTGTACATTCTGAAGTGAAGMMTGAGGAGTC (SEQ ID NO: 29) |
| PmuFVH 10 | CTAGTAGCAACTGCAACCGGTGTACAMTCTCAGATKCAGCTTMAGGAGTC (SEQ ID NO: 30) |
| PmuFVH 11 | CTAGTAGCAACTGCAACCGGTGTACATTCTCAGGCTTATCTGCAGCAGTC (SEQ ID NO: 31) |
| PmuFVH 12 | CTAGTAGCAACTGCAACCGGTGTACATTCTCAGGTTCACCTACAACAGTC (SEQ ID NO: 32) |
| PmuFVH 13 | CTAGTAGCAACTGCAACCGGTGTACATTCTCAGGTGCAGCTTGTAGAGAC (SEQ ID NO: 33) |
| PmuFVH 14 | CTAGTAGCAACTGCAACCGGTGTACATTCTGARGTGMAGCTGKTGGAGAC (SEQ ID NO: 34) |
| PmuRVH 1 | GGAAGACCGATGGGCCCTTGGTCGACGCCGAGGAGACGGTGACMGTGG (SEQ ID NO: 35) |
| PmuRVH 2 | GGAAGACCGATGGGCCCTTGGTCGACGCCGCAGAGACAGTGACCAGAG (SEQ ID NO: 36) |
| PmuRVH 3 | GGAAGACCGATGGGCCCTTGGTCGACGCCGAGGAGACTGTGAGASTGG (SEQ ID NO: 37) |

Light chain specific primers

| Name | Sequence |
|---|---|
| PmuFVk1 | CTAGTAGCAACTGCAACCGGTGTACATTCTGACAWTGTTCTCACCCAGTC (SEQ ID NO: 38) |
| PmuFVk2 | CTAGTAGCAACTGCAACCGGTGTACATTCTGACATCCAGATGACACAGWC (SEQ ID NO: 39) |
| PmuFVk3 | CTAGTAGCAACTGCAACCGGTGTACATTCTGATRTTGTGATGACCCAGWC (SEQ ID NO: 40) |
| PmuFVk4 | CTAGTAGCAACTGCAACCGGTGTACATTCTGACATTSTGMTGACCCAGTC (SEQ ID NO: 41) |
| PmuFVk5 | CTAGTAGCAACTGCAACCGGTGTACAITCTGATGITGTGVTGACCCAAAC (SEQ ID NO: 42) |

TABLE 6-continued

List of primers for amplification of variable heavy and light chain from mouse hybridoma.

| | |
|---|---|
| PmuFVk6 | CTAGTAGCAACTGCAACCGGTGTACATTCTGACACAACTGTGACCC AGTC (SEQ ID NO: 43) |
| PmuFVk7 | CTAGTAGCAACTGCAACCGGTGTACATTCTGAYATTKTGCTCACTC AGTC (SEQ ID NO: 44) |
| PmuFVk8 | CTAGTAGCAACTGCAACCGGTGTACATTCTGATATTGTGATRACCC AGGM (SEQ ID NO: 45) |
| PmuFVk9 | CTAGTAGCAACTGCAACCGGTGTACATTCTGACATTGTAATGACCC AATC (SEQ ID NO: 46) |
| PmuFVk10 | CTAGTAGCAACTGCAACCGGTGTACATTCTGACATTGTGATGWCA CAGTC (SEQ ID NO: 47) |
| PmuFVk11 | CTAGTAGCAACTGCAACCGGTGTACATTCTGATRTCCAGATGAMC CAGTC (SEQ ID NO: 48) |
| PmuFVk12 | CTAGTAGCAACTGCAACCGGTGTACATTCTGATGGAGAAACAACA CAGGC (SEQ ID NO: 49) |
| PmuFVk13 | CTAGTAGCAACTGCAACCGGTGTACATTCTGACGCTGTTGTGACTC AGG (SEQ ID NO: 50) |
| PmuFVk14 | CTAGTAGCAACTGCAACCGGTGTACATTCTGACCYTGTGCTCACTC AGTC (SEQ ID NO: 51) |
| PmuRVk1 | GAAGACAGATGGTGCAGCCACCGTACGTTTTATTTCCAGCTT (SEQ ID NO: 52) |
| PmuRVk2 | GAAGACAGATGGTGCAGCCACCGTACGTTTTATTTCCAATTTTG (SEQ ID NO: 53) |
| PmuRVk3 | GAAGACAGATGGTGCAGCCACCGTACGGCCTAGGACAGTCAMCYT GG (SEQ ID NO 54) |

TABLE 7

Detailed results of the IMGT/V-QUEST analysis of VH and VL sequences of the P1B6H7 and P1C3H9 antibodies[2].

| P1B6H7 Ab | | | |
|---|---|---|---|
| Heavy chain | | Light chain | |
| Result summary: P1B6H7VH | Productive IGH rearranged sequence ) | Result summary: P1B6H7VK | Productive IGK rearranged sequence |
| V-GENE and allele | Musmus IGHV1-14*01 P | V-GENE and allele | Musmus IGKV6-15*01 F |
| J-GENE and allele | Musmus IGHJ2*01 F (a) | J-GENE and allele | Musmus IGKJ4*01 F |
| D-GENE and allele | Musmus IGHD1-1*01 F | | |

| P1C3H9 Ab | | | |
|---|---|---|---|
| Heavy chain | | Light chain | |
| Result summary: P1C3H9VH | Productive IGH rearranged sequence | Result summary: P1C3H9VK | Productive IGK rearranged sequence |
| V-GENE and allele | Musmus IGHV3-8*02 F | V-GENE and allele | Musmus IGKV2-109*01 F |
| J-GENE and allele | Musmus IGHJ2*01 F | J-GENE and allele | Musmus IGKJ1*01 F |
| D-GENE and allele | Musmus IGHD2-10*01 F | | |

TABLE 8

Variable region of heavy and light chain amino acid sequences of anti-fentanyl antibodies; P1B6H7 and P1C3H9. These sequences were isolated from mouse hybridoma monoclonal antibodies.

P1B6H7 heavy chain amino acid sequence

EVMLVESGPELVKPGASVKMSCKASGYTFTSSVMHWVKQKPGQGLEWIG
NINPYNDGTKYNEKFKGKATLTSDKSSSTAYMELSSLTSEDSAVYYCAR
EGIYYGSSYRDYWGQGTTVTVSS (SEQ ID NO: 1)

P1B6H7 light chain amino acid sequence

DTTVTQSQKFMSTSLGDRVSVTCKASQNVGNNVAWYQHKPGQSPKALIY
SASYRYSGVPDRFTGSGSGTDFTLTISNVQSEDLAEYFCQQYNSYPFTF
GSGTKLEIK (SEQ ID NO: 2)

P1C3H9 heavy chain amino acid sequence

DVQLQESGPSLVKPSQALSLTCSVTGDSITSGYWNWIRKFPGNKLEYLG
YISYSGSTYYNPSLKSRISITRDTSKNQFYLQLNSMTTEDTATYFCVRY
PYNGHNGYLDYWGQGTTLTVSA (SEQ ID NO: 9)

P1C3H9 light chain amino acid sequence

DVVMTQATFSNPVTLGTSASISCRSSKSLLHRNGITYLYWFLQKPGQSP
QLLIYQMSNLASGVPDRFSSSGSGTDFTLRISRVEAEDVGVYYCAQNLE
LPWTFGGGTKLEIK (SEQ ID NO: 10)

LC-MS/MS Parameters

The instrument parameters used in the LC-MS/MS analysis are based on previous works. The column was maintained at 65° C. at a flow rate of 500 µL/min. The injection volume was 10 µL using a full-loop injection mode using the gradient shown in Table 9. The autosampler needle was rinsed with a weak wash (600 µL, 10% MeOH in $H_2O$) and a strong wash (200 µL, 90% ACN in $H_2O$) before each injection. All data were acquired using positive electrospray ionization (ESI) in multiple reaction monitoring (MRM) mode. The electrospray and source settings were as follows: 0.7 kV (capillary voltage), 120° C. (source temperature), 500° C. (desolvation temperature), 900 L/h (desolvation gas flow, N2), and 60 L/h (cone gas flow, N2). The collision gas (Ar) flow in the collision cell was maintained at 0.3 mL/min. MRM transitions are provided in Table 7. Data were processed using external calibration with $1/X^2$ weighting in TargetLynx™ application of MassLynx™ version 4.2 software (Waters, Milford, MA).

TABLE 9

LC-MS/MS gradient

| Time (min) | % A (10 nM $NH_4HCOO$ with 0.1% HCOOH) | % B (MeOH with 0.1% HCOOH) |
| --- | --- | --- |
| 0 | 100 | 0 |
| 0.50 | 100 | 0 |
| 2.70 | 90 | 10 |
| 3.30 | 80 | 20 |
| 4.60 | 20 | 80 |
| 4.61 | 0 | 100 |
| 5.20 | 0 | 100 |
| 5.21 | 100 | 0 |
| 8.00 | 100 | 0 |

TABLE 10

MRM transitions, cone voltage, and collision energy settings

| Analyte | Ret. Time (min) | MRM[a] transition (m/z) | Cone voltage (V) | Collision energy (V) | Dwell time (msec) |
| --- | --- | --- | --- | --- | --- |
| Fentanyl-$d_5$ | 4.74 | 342 > 105 | 40 | 35 | 328 |
| Cyclopropyl fentanyl-$^{13}C_6$ | 4.80 | 355 > 105 | 40 | 35 | 328 |
| Furanyl fentanyl-$d_5$ | 4.74 | 380 > 105 | 40 | 35 | 328 |
| Naloxone-$d_5$ | 3.47 | 333 > 212 | 35 | 30 | 328 |
| Methadone | 4.99 | 310 > 105 | 30 | 30 | 328 |
| Buprenorphine | 4.69 | 468 > 101 | 40 | 50 | 328 |
| Naltrexone-$d_3$ | 3.82 | 345 > 212 | 40 | 45 | 328 |

[a] All ions were detected as $[M + H]^+$

TABLE 11

Ligand-antibody interaction analysis

| Ligand | Receptor | Interaction | Distance Å | E (kcal/mol) |
| --- | --- | --- | --- | --- |
| P1B7H6 mAb | | | | |
| C1 1 | OD2 ASP 101 | H-donor | 3.34 | ~1.6 |
| N1 2 | 6-ring TRY 91 | Cation ~π | 4.06 | ~1.3 |
| C2 5 | 6-ring TRY 91 | H~π | 4.41 | ~0.9 |
| C4 8 | 6-ring TRY 91 | H~π | 3.63 | ~1.0 |
| P1C3H9 mAb | | | | |
| N1 2 | 6-ring TRY 102CD | Cation ~x | 4.25 | ~0.9 |
| C4 8 | 6-ring Try 102 I | H~π | 4.06 | ~0.8 |
| 6-ring | CA TRY 102 I | π~H | 4.41 | ~0.9 |
| 6-ring | OH TRY 102 I | π~H | 3.63 | ~0.6 |

REFERENCES

1. National Vital Statistics System. 2019. Accessed: Mar. 1, 2021. https://www.cdc.gov/nchs/nvss/index.htm
2. Daniulaityte R J M, Strayer K, Sizemore I, Harshbarger M D, Antonides H M, Carlson R R Overdose Deaths Related to Fentanyl and Its Analogs—Ohio, January-February 2017. MMWR Morb Mortal Wkly Rep. 2017; 66:904-08: doi:10.15585/mmwr. mm6638a8externalicon.
3. Somerville N. J., O'Donnell J, Gladden R M, Zibbell J E, Green T C, Younkin M, Ruiz S. Babakhanlou-Chase H, Chan M, Callis B P, et al. Characteristics of Fentanyl Overdose—Massachusetts, 2014-2016; MMWR Morb Mortal Wkly Rep. 2017; 66(14):382-86; doi:10.15585/mmwr.mm6614a2.
4. Carroll J J, Marshall B D L, Rich J D, Green T C. Exposure to fentanyl-contaminated heroin and overdose risk among illicit opioid users in Rhode Island: a mixed methods study. Int J Drug Policy. 2017; 46:136-45. doi: 10.1016/j.drugpo.2017.05.023.
5. Macmadu A, Carroll J J, Hadland S E, Green T C, Marshall B D. Prevalence and correlates of fentanyl-contaminated heroin exposure among young adults who use prescription opioids non-medically. Addict Behav. 2017; 68:35-38. doi:10.1016/j.addbeh.2017.01.014.
6. Talu A. Rajaleid K, Abel-Ollo K, Rüütel K, Rahu M, Rhodes T, Platt L, Bobrova N, Uuskiila A. HIV infection and risk behaviour of primary fentanyl and amphetamine injectors in Tallinn, Estonia: implications for intervention. Int J Drug Policy. 2010; 21(1):56-63. doi:10.1016/j.drugpo.2009.02.007.
7. Lambdin B H, Bluthenthal R N, Zibbell J E, Wenger L, Simpson K, Kral A H. Associations between perceived illicit fentanyl use and infectious disease risks among people who inject drugs. Int J Drug Policy. 2019; 74:299-304. doi:10.1016/j.drugpo.2019.10.004.
8. Florence C S, Zhou C, Luo F, Xu L. The economic burden of prescription opioid overdose, abuse, and dependence in the United States, 2013. Med Care. 2016:54(10):901-06. doi:10.1097/MLR.0625.
9. Rzasa Lynn R. Galinkin J L. Naloxone dosage for opioid reversal: current evidence and clinical implications. Ther Adv Drug Saf. 2018:9(1):63-88. doi:10.1177/2042098617744161.
10. Moss R B, Carlo D J. Higher doses of naloxone are needed in the synthetic opioid era. Subst Abuse Treat Prev Policy. 2019; 14(1):6. doi:10.1186/s13011-019-01954.
11. Levine R. Veliz S, Singer D. Wooden chest syndrome: beware of opioid antagonists, not just agonists. Am J Emerg Med. 2020; 38 (2):411.e5-411.e6. doi:10.1016/j.ajem.2019.09.009.
12. Spector S, Parker C W. Morphine: radioimmunoassay. Science. 1970 12; 168(3937):1347-48. doi:10.1126/science.168.3937.1347.
13. Bonese K F, Wainer B H, Fitch F W, Rothberg R M, Schuster C R. Changes in heroin self-administration by a rhesus monkey after morphine immunization. Nature. 1974; 252(5485):708-10. doi:10.1038/252708a0.
14. Kosten T R, Domingo C B. Can you vaccinate against substance abuse? Expert Opin Biol Ther. 2013; 13(8): 1093-97. doi:10.1517/14712598.2013.791278.
15. Janda K D, Treweek J B. Vaccines targeting drugs of abuse: is the glass half-empty or half-full? Nat Rev Immunol. 2011; 12(1):67-72. doi:10.1038/nri3130. PMID: 22173478.
16. Maurer P, Jennings G T, Willers J, Rohner F, Lindman Y. Roubicek K, Renner W A, Müller P. Bachmann M F. A therapeutic vaccine for nicotine dependence: preclinical efficacy, and Phase I safety and immunogenicity. Eur J Immunol. 2005; 35 (7):2031-40. doi:10.1002/eji.200526285.
17. Cornuz J, Zwahlen S, Jungi W F, Osterwalder J, Klingler K, van Melle G, Bangala Y, Guessous I, Müller P, Willers J, et al. A vaccine against nicotine for smoking cessation: a randomized controlled trial. PLoS One. 2008 Jun. 25; 3(6):e2547. doi:10.1371/journal.pone.0002547.
18. Cerny E H, Cerny T. Vaccines against nicotine. Hum Vaccin. 2009:5(4):200-05. doi:10.4161/hv.5.4.7310.
19. Hatsukami D K, Jorenby D E, Gonzales D, Rigotti N A, Glover E D, Oncken C A, Tashkin D P, Reus V I, Akhavain R C, Fahim R E, et al. Immunogenicity and smoking-cessation outcomes for a novel nicotine immunotherapeutic. Clin Pharmacol Ther. 2011; 89 (3):392-99. doi:10.1038/clpt.2010.317.
20. Hoogsteder P H, Kotz D, van Spiegel P I, Viechtbauer W, Brauer R, Kessler P D, Kalnik M W, Fahim R E. Van Schayck O C. The efficacy and safety of a nicotine conjugate vaccine (NicVAX®) or placebo co-administered with varenicline (Champix®) for smoking cessation study protocol of a phase IIb, double blind, randomized, placebo-controlled trial. BMC Public Health. 2012; 12(1): 1052. doi:10.1186/1471-2458-12-1052.
21. Tonstad S. Heggen E, Giljam H, Lagerbäck PÂ. Tonnesen P, Wikingsson L D, Lindblom N, de Villiers S, Svensson T H. Fagerström K O. Niccine®, a nicotine vaccine, for relapse prevention: a phase II, randomized, placebo-controlled, multicenter clinical trial. Nicotine Tob Res. 2013; 15(9):1492-501. doi:10.1093/ntr/ntt003.
22. Hoogsteder P H, Kotz D, van Spiegel P I, Viechtbauer W, Van Schayck O C. Efficacy of the nicotine vaccine 3'-Am-Nic-rEPA (NicVAX) co-administered with varenicline and counselling for smoking cessation: a randomized placebo-controlled trial. Addiction. 2014; 109(8):1252-59. doi:10.1111/add.12573.
23. Hartmann-Boyce J, Cahill K, Hatsukanu D, Cornuz J. Nicotine vaccines for smoking cessation. Cochrane Database Syst Rev. 2012:2012(8):CD007072. doi:10.1002/14651858.CD007072.
24. Van Schayck O C, Horstman K, Vuurman E, De Wert G, Kotz D. Nicotine vaccination-does it have a future? Addiction. 2014:109 (8):1223-25. doi:10.1111/add.12569.
25. Kosten T R. Domingo C B, Shorter D, Orson F, Green C, Somoza E, Sekerka R, Levin F R, Mariani J A, Stitzer M, et al. Vaccine for cocaine dependence: a randomized double-blind placebo-controlled efficacy trial. Drug Alcohol Depend. 2014; 140:42-47. doi:10.1016/j.drugalcdep.2014.04.003.
26. Bremer P T, Kimishima A, Schlosburg J E, Zhou B, Collins K C, Janda K D. Combatting synthetic designer opioids: a conjugate vaccine ablates lethal doses of fentanyl class drugs. Angew Chem Int Ed Engl. 2016:55(11): 3772-75. doi:10.1002/anie.201511654.
27. Hwang C S, Smith L C, Natori Y, Ellis B, Zhou B, Janda K D. Efficacious Vaccine against Heroin Contaminated with Fentanyl. ACS Chem Neurosci. 2018; 9(6):1269-75. doi:10.1021/acschemneuro.8b00079.
28. Hwang C S, Smith L C, Natori Y. Ellis B. Zhou B, Janda K D. Improved admixture vaccine of fentanyl and heroin hapten immunoconjugates: antinociceptive evaluation of fentanyl-contaminated heroin. ACS Omega. 2018; 3(9): 11537-43. doi:10.1021/acsomega.8b01478.
29. Strayer K E, Antonides H M, Juhascik M P, Daniulaityte R, Sizemore I E. LC-MS/MS-Based Method for the Multiplex Detection of 24 Fentanyl Analogues and Metabolites in Whole Blood at Sub ng mL −1 Concentrations. ACS Omega. 2018; 3 (1):514-23. doi:10.1021/acsomega.7b01536.
30. Townsend E A, Blake S. Faunce K E, Hwang C S, Natori Y, Zhou B, Bremer P T, Janda K D, Banks M L. Conjugate vaccine produces long-lasting attenuation of fentanyl vs. food choice and blocks expression of opioid withdrawal-induced increases in fentanyl choice in rats. Neuropsychopharmacology. 2019:44(10):1681-89. doi:10.1038/s41386-019-0385-9.
31. Tenney R D, Blake S, Bremer P T, Zhou B. Hwang C S, Poklis J L, Janda K D, Banks M L. Vaccine blunts fentanyl potency in male rhesus monkeys. Neuropharmacology. 2019; 158:107730. doi:10.1016/j.neuropharm.2019.107730.
32. Smith L C, Bremer P T. Hwang C S, Zhou B, Ellis B, Hixon M S, Janda K D. Monoclonal antibodies for combating synthetic opioid intoxication. J Am Chem Soc. 2019 Jul. 3:141(26):10489-503. doi:10.1021/jacs.9b04872.
33. Baehr C, Kelcher A H, Khaimraj A, Reed D E, Pandit S G, AuCoin D, Averick S, Pravetoni M. Monoclonal antibodies counteract opioid-induced behavioral and toxic effects in mice and rats. J Pharmacol Exp Ther. 2020:375 (3):469-77. doi:10.1124/jpet.120.000124.
34. Ciccarone D. Fentanyl in the US heroin supply: a rapidly changing risk environment. Int J Drug Policy. 2017:46: 107-11. doi:10.1016/j.drugpo.2017.06.010.
35. Chandler R K, Villani J, Clarke T. McCance-Katz E F, Volkow N D. Addressing opioid overdose deaths: the vision for the HEALing communities study. Drug Alcohol Depend. 2020 Dec. 1:217:108329. doi:10.1016/j.drugalcdep.2020.108329.
36. Frank R G, Pollack H A. Addressing the fentanyl threat to public health. N Engl J Med. 2017; 376(7):605-07. doi:10.1056/NEJMp1615145.
37. Barrientos R C, Bow E W, Whalen C, Torres O B, Sulima A. Beck Z, Jacobson A E, Rice K C. Matyas G R. Novel vaccine that blunts fentanyl effects and sequesters ultrapotent fentanyl analogues. Mol Pharm. 2020; 17(9):3447-60. doi:10.1021/acs. molpharmaceut.0c00497.
38. Al-Lazikani B, Lesk A M, Chothia C. Standard conformations for the canonical structures of immunoglobulins. J Mol Biol. 1997; 273 (4):927-48. doi:10.1006/jmbi.1997.1354.
39. Bogen I L, Boix F, Nerem E, Morland J, Andersen J M. A monoclonal antibody specific for 6-monoacetylmorphine reduces acute heroin effects in mice. J Pharmacol Exp Ther. 2014; 349(3):568-76. doi:10.1124/jpet.113.212035.
40. Fogarty M F, Papsun D M, Logan B K. Analysis of Fentanyl and 18 Novel Fentanyl Analogs and Metabolites by LC-MS-MS, and report of Fatalities Associated with Methoxyacetylfentanyl and Cyclopropylfentanyl. J Anal Toxicol. 2018; 42(9):592-604. doi:10.1093/jat/bky035.
41. Concheiro M, Chesser R, Pardi J, Cooper G. Postmortem Toxicology of New Synthetic Opioids. Front Pharmacol. 2018; 9:1210. doi:10.3389/fphar.2018.01210.
42. Drummer O H. Fatalities caused by novel opioids: a review. Forensic Sci Res. 2018 May 7:4(2):95-110. doi: 10.1080/20961790.2018.1460063.
43. Wilde M, Pichini S, Pacifici R, Tagliabracci A, Busardó FP, Auwärter V, Solimini R. Metabolic Pathways and Potencies of New Fentanyl Analogs. Front Pharmacol. 2019; 10:238. doi:10.3389/fphar.2019.00238.
44. Le Bars D. Gozariu M, Cadden S W. Animal models of nociception. Pharmacol Rev. 2001; 53(4):597-652. PMID: 11734620.
45. Bremer P T, Janda K D. Conjugate Vaccine Immunotherapy for Substance Use Disorder. Pharmacol Rev. 2017; 69(3):298-315. doi:10.1124/pr.117.013904.
46. Raleigh M D, Baruffaldi F, Peterson S J, Le Naour M, Harmon T M, Vigliaturo J R, Pentel P R, Pravetoni M. Alters Fentanyl Alters fentanyl distribution and protects against fentanyl-induced effects in mice and rats. J Pharmacol Exp Ther. 2019; 368(2):282-91. doi:10.1124/jpet.118.253674.
47. Guide for the Care and Use of Laboratory Animals. Washington (DC): National Academies Press (US), National Academy of Sciences; 2011. ISBN-13: 978-0-309-15400-0I SBN-10: 0-309-15400-6.
48. Torres O B, Antoline J F, Li F, Jalah R. Jacobson A E, Rice K C, Alving C R, Matyas G R. A simple nonradioactive method for the determination of the binding affinities of antibodies induced by hapten bioconjugates for drugs of abuse. Anal Bioanal Chem. 2016; 408(4):1191-204. doi:10.1007/s00216-015-9223-z.
49. Molecular Operating Environment (MOE), 2019.01; Chemical Computing Group ULC, 1010 Sherbooke St. West, Suite #910, Montreal, QC, Canada, H3A 2R7, 2021. Accessed: Mar. 1, 2021. https://www.chemcomp.com/
50. Jalah R, Torres O B, Mayorov A V, Li F, Antoline J F, Jacobson A E, Rice K C, Deschamps J R, Beck Z, Alving C R, et al. Efficacy, but not antibody titer or affinity, of a heroin hapten conjugate vaccine correlates with increasing hapten densities on tetanus toxoid, but not on CRM197 carriers. Bioconjug Chem. 2015; 26(6):1041-53. doi:10.1021/acs.bioconjchem.5b00085.
51. von Boehmer, L., Liu, C., Ackerman, S. et al. Sequencing and cloning of antigen-specific antibodies from mouse memory B cells. *Nat Protoc.* 2016; 11, 1908-1923. doi.org/10.1038/nprot.2016.102.
52. Lefranc M-P. Immunoglobulin and T Cell Receptor Genes: IMGT® and the Birth and Rise of Immunoinformatics. Front Immunol 2014; 5:22. doi:10.3389/fimmu.2014.00022.
53. Torres O B, Antoline J F, Li F, Jalah R, Jacobson A E, Rice K C, et al. A simple nonradioactive method for the determination of the binding affinities of antibodies induced by hapten bioconjugates for drugs of abuse. Anal Bioanal Chem. 2016; 408:1191-204; https://doi.org/10.1007/s00216-015-9223.
54. Barrientos R C, Bow E W, Whalen C, Torres O B, Sulima A. Beck Z, Jacobson A E, Rice K C, Matyas G R. Novel Vaccine That Blunts Fentanyl Effects and Sequesters Ultrapotent Fentanyl Analogues. Mol Pharm. 2020; 17(9): 3447-3460. doi: 10.1021/acs.molpharmaceut.0c00497.
55. Gottas A, Oiestad E L, Boix F, Ripel A, Thaulow C H, Pettersen B S, Vindenes V, Morland J. Simultaneous measurement of heroin and its metabolites in brain extracellular fluid by microdialysis and ultra performance liquid chromatography tandem mass spectrometry. J Pharmacol Toxicol Methods. 2012; 66(1):14-21. doi: 10.1016/j.vascn.2012.04.009.

What is claimed is:

1. An isolated recombinant monoclonal antibody, or an antigen-binding fragment thereof, that binds to fentanyl or a fentanyl analog, wherein said antibody comprises a heavy chain variable domain and a light chain variable domain,
   (1) wherein the heavy chain variable domain comprises a complementarity determining region 1 (CDR1) comprising the amino acid sequence of SEQ ID NO: 3; a CDR2 comprising the amino acid sequence of SEQ ID NO:4; and a CDR3 comprising the amino acid sequence of SEQ ID NO:5; and wherein the light chain variable domain comprises: a CDR1 comprising the amino acid sequence of SEQ ID NO:6; a CDR2 comprising the amino acid sequence of SEQ ID NO: 7; and a CDR3 comprising the amino acid sequence of SEQ ID NO:8; or
   (2) wherein the heavy chain variable domain comprises a complementarity determining region 1 (CDR1) comprising the amino acid sequence of SEQ ID NO: 11; a CDR2 comprising the amino acid sequence of SEQ ID NO:12; and a CDR3 comprising the amino acid sequence of SEQ ID NO:13; and wherein the light chain variable domain comprises: a CDR1 comprising the amino acid sequence of SEQ ID NO:14; a CDR2 comprising the amino acid sequence of SEQ ID NO:15; and a CDR3 comprising the amino acid sequence of SEQ ID NO: 16.

2. The isolated recombinant monoclonal antibody, or antigen-binding fragment thereof, of claim 1, wherein the heavy chain variable domain comprises a CDR1 comprising the amino acid sequence of SEQ ID NO:3; a CDR2 comprising the amino acid sequence of SEQ ID NO:4; and a CDR3 comprising the amino acid sequence of SEQ ID NO:5; and the light chain variable domain comprises: a CDR1 comprising the amino acid sequence of SEQ ID NO:6; a CDR2 comprising the amino acid sequence of SEQ ID NO:7; and a CDR3 comprising the amino acid sequence of SEQ ID NO:8.

3. The isolated recombinant monoclonal antibody, or antigen-binding fragment thereof, of claim 2, wherein the heavy chain variable domain comprises the amino acid sequence of SEQ ID NO:1 and the light chain variable domain comprises the amino acid sequence of SEQ ID NO:2.

4. The isolated recombinant monoclonal antibody, or antigen-binding fragment thereof, of claim 1, wherein the heavy chain variable domain comprises a CDR1 comprising the amino acid sequence of SEQ ID NO:11; a CDR2 comprising the amino acid sequence of SEQ ID NO:12; and a CDR3 comprising the amino acid sequence of SEQ ID NO:13; and the light chain variable domain comprises: a CDR1 comprising the amino acid sequence of SEQ ID NO:14; a CDR2 comprising the amino acid sequence of SEQ ID NO:15; and a CDR3 comprising the amino acid sequence of SEQ ID NO:16.

5. The isolated recombinant monoclonal antibody, or antigen-binding fragment thereof, of claim 4, wherein the heavy chain variable domain comprises the amino acid sequence of SEQ ID NO:9 and the light chain variable domain comprises the amino acid sequence of SEQ ID NO:10.

6. The isolated recombinant monoclonal antibody, or antigen-binding fragment thereof of claim 1, wherein said antibody binds specifically to fentanyl or fentanyl analog with a dissociation constant (Kd) equal to or less than 5 nM, and wherein the fentanyl analog is acryl fentanyl, cyclopropyl fentanyl, furanyl fentanyl, cis-3-methyl fentanyl, para-fluorofentanyl, or carfentanil.

7. The isolated recombinant monoclonal antibody, or antigen-binding fragment thereof, of any one of claims 1-6, wherein the antibody is a chimeric antibody or a grafted antibody.

8. The isolated recombinant monoclonal antibody, or antigen-binding fragment thereof, of claim 1, further comprising a human constant region, wherein a source of the heavy chain variable domain and the light chain variable domain is different from a source of the human constant region.

9. A composition comprising one or more of the isolated recombinant monoclonal antibodies, or antigen-binding fragments thereof, of claim 1, and a pharmaceutically acceptable excipient.

10. A method of detecting the presence of fentanyl or fentanyl analogs in a sample, wherein the method comprises contacting the isolated recombinant monoclonal antibody of claim 1 with the said sample and analyzing the sample to detect binding of the isolated recombinant monoclonal antibody to fentanyl or fentanyl analog, and wherein the fentanyl analogs is acryl fentanyl, cyclopropyl fentanyl, furanyl fentanyl, cis-3-methyl fentanyl, para-fluorofentanyl, or carfentanil.

11. The method of claim 10, wherein the sample comprises serum, urine, saliva, mucus, cerebrospinal fluid, blood, tissues, feces, soil, water, food products, or gas.

12. A method of sequestering fentanyl or fentanyl analog in a subject in need thereof, comprising administering to the subject one or more of the recombinant monoclonal antibodies, or antigen-binding fragments thereof, of claim 1 in an amount effective to bind to the fentanyl or fentanyl analog in the subject in need.

13. The method of claim 12, wherein the subject is a human, and wherein the fentanyl analog is acryl fentanyl, cyclopropyl fentanyl, furanyl fentanyl, cis-3-methyl fentanyl, para-fluorofentanyl, or carfentanil.

14. The method of claim 12, wherein the subject in need is experiencing an opioid overdose.

* * * * *

SEQUENCE LISTING

```
<160> NUMBER OF SEQ ID NOS: 54

<210> SEQ ID NO 1
<211> LENGTH: 121
<212> TYPE: PRT
<213> ORGANISM: Mus musculus

<400> SEQUENCE: 1

Glu Val Met Leu Val Glu Ser Gly Pro Glu Leu Val Lys Pro Gly Ala
1               5                   10                  15

Ser Val Lys Met Ser Cys Lys Ala Ser Gly Tyr Thr Phe Thr Ser Ser
            20                  25                  30

Val Met His Trp Val Lys Gln Lys Pro Gly Gln Gly Leu Glu Trp Ile
        35                  40                  45
```

```
Gly Asn Ile Asn Pro Tyr Asn Asp Gly Thr Lys Tyr Asn Glu Lys Phe
    50                  55                  60

Lys Gly Lys Ala Thr Leu Thr Ser Asp Lys Ser Ser Thr Ala Tyr
 65                  70                  75                  80

Met Glu Leu Ser Ser Leu Thr Ser Glu Asp Ser Ala Val Tyr Tyr Cys
                 85                  90                  95

Ala Arg Glu Gly Ile Tyr Tyr Gly Ser Ser Tyr Arg Asp Tyr Trp Gly
            100                 105                 110

Gln Gly Thr Thr Val Thr Val Ser Ser
            115                 120

<210> SEQ ID NO 2
<211> LENGTH: 107
<212> TYPE: PRT
<213> ORGANISM: Mus musculus

<400> SEQUENCE: 2

Asp Thr Thr Val Thr Gln Ser Gln Lys Phe Met Ser Thr Ser Leu Gly
  1               5                  10                  15

Asp Arg Val Ser Val Thr Cys Lys Ala Ser Gln Asn Val Gly Asn Asn
                 20                  25                  30

Val Ala Trp Tyr Gln His Lys Pro Gly Gln Ser Pro Lys Ala Leu Ile
             35                  40                  45

Tyr Ser Ala Ser Tyr Arg Tyr Ser Gly Val Pro Asp Arg Phe Thr Gly
     50                  55                  60

Ser Gly Ser Gly Thr Asp Phe Thr Leu Thr Ile Ser Asn Val Gln Ser
 65                  70                  75                  80

Glu Asp Leu Ala Glu Tyr Phe Cys Gln Gln Tyr Asn Ser Tyr Pro Phe
                 85                  90                  95

Thr Phe Gly Ser Gly Thr Lys Leu Glu Ile Lys
            100                 105

<210> SEQ ID NO 3
<211> LENGTH: 5
<212> TYPE: PRT
<213> ORGANISM: Mus musculus

<400> SEQUENCE: 3

Ser Ser Val Met His
  1               5

<210> SEQ ID NO 4
<211> LENGTH: 17
<212> TYPE: PRT
<213> ORGANISM: Mus musculus

<400> SEQUENCE: 4

Asn Ile Asn Pro Tyr Asn Asp Gly Thr Lys Tyr Asn Glu Lys Phe Lys
  1               5                  10                  15

Gly

<210> SEQ ID NO 5
<211> LENGTH: 12
<212> TYPE: PRT
<213> ORGANISM: Mus musculus

<400> SEQUENCE: 5

Glu Gly Ile Tyr Tyr Gly Ser Ser Tyr Arg Asp Tyr
  1               5                  10
```

```
<210> SEQ ID NO 6
<211> LENGTH: 11
<212> TYPE: PRT
<213> ORGANISM: Mus musculus

<400> SEQUENCE: 6

Lys Ala Ser Gln Asn Val Gly Asn Asn Val Ala
1               5                   10

<210> SEQ ID NO 7
<211> LENGTH: 7
<212> TYPE: PRT
<213> ORGANISM: Mus musculus

<400> SEQUENCE: 7

Ser Ala Ser Tyr Arg Tyr Ser
1               5

<210> SEQ ID NO 8
<211> LENGTH: 9
<212> TYPE: PRT
<213> ORGANISM: Mus musculus

<400> SEQUENCE: 8

Gln Gln Tyr Asn Ser Tyr Pro Phe Thr
1               5

<210> SEQ ID NO 9
<211> LENGTH: 120
<212> TYPE: PRT
<213> ORGANISM: Mus musculus

<400> SEQUENCE: 9

Asp Val Gln Leu Gln Glu Ser Gly Pro Ser Leu Val Lys Pro Ser Gln
1               5                   10                  15

Ala Leu Ser Leu Thr Cys Ser Val Thr Gly Asp Ser Ile Thr Ser Gly
                20                  25                  30

Tyr Trp Asn Trp Ile Arg Lys Phe Pro Gly Asn Lys Leu Glu Tyr Leu
            35                  40                  45

Gly Tyr Ile Ser Tyr Ser Gly Ser Thr Tyr Tyr Asn Pro Ser Leu Lys
    50                  55                  60

Ser Arg Ile Ser Ile Thr Arg Asp Thr Ser Lys Asn Gln Phe Tyr Leu
65                  70                  75                  80

Gln Leu Asn Ser Met Thr Thr Glu Asp Thr Ala Thr Tyr Phe Cys Val
                85                  90                  95

Arg Tyr Pro Tyr Asn Gly His Asn Gly Tyr Leu Asp Tyr Trp Gly Gln
            100                 105                 110

Gly Thr Thr Leu Thr Val Ser Ala
        115                 120

<210> SEQ ID NO 10
<211> LENGTH: 112
<212> TYPE: PRT
<213> ORGANISM: Mus musculus

<400> SEQUENCE: 10

Asp Val Val Met Thr Gln Ala Thr Phe Ser Asn Pro Val Thr Leu Gly
1               5                   10                  15

Thr Ser Ala Ser Ile Ser Cys Arg Ser Ser Lys Ser Leu Leu His Arg
                20                  25                  30
```

```
Asn Gly Ile Thr Tyr Leu Tyr Trp Phe Leu Gln Lys Pro Gly Gln Ser
             35                  40                  45

Pro Gln Leu Leu Ile Tyr Gln Met Ser Asn Leu Ala Ser Gly Val Pro
 50                  55                  60

Asp Arg Phe Ser Ser Gly Ser Gly Thr Asp Phe Thr Leu Arg Ile
 65                  70                  75                  80

Ser Arg Val Glu Ala Glu Asp Val Gly Val Tyr Tyr Cys Ala Gln Asn
                 85                  90                  95

Leu Glu Leu Pro Trp Thr Phe Gly Gly Gly Thr Lys Leu Glu Ile Lys
            100                 105                 110
```

<210> SEQ ID NO 11
<211> LENGTH: 5
<212> TYPE: PRT
<213> ORGANISM: Mus musculus

<400> SEQUENCE: 11

```
Ser Gly Tyr Trp Asn
 1               5
```

<210> SEQ ID NO 12
<211> LENGTH: 16
<212> TYPE: PRT
<213> ORGANISM: Mus musculus

<400> SEQUENCE: 12

```
Tyr Ile Ser Tyr Ser Gly Ser Thr Tyr Tyr Asn Pro Ser Leu Lys Ser
 1               5                  10                  15
```

<210> SEQ ID NO 13
<211> LENGTH: 12
<212> TYPE: PRT
<213> ORGANISM: Mus musculus

<400> SEQUENCE: 13

```
Tyr Pro Tyr Asn Gly His Asn Gly Tyr Leu Asp Tyr
 1               5                  10
```

<210> SEQ ID NO 14
<211> LENGTH: 16
<212> TYPE: PRT
<213> ORGANISM: Mus musculus

<400> SEQUENCE: 14

```
Arg Ser Ser Lys Ser Leu Leu His Arg Asn Gly Ile Thr Tyr Leu Tyr
 1               5                  10                  15
```

<210> SEQ ID NO 15
<211> LENGTH: 7
<212> TYPE: PRT
<213> ORGANISM: Mus musculus

<400> SEQUENCE: 15

```
Gln Met Ser Asn Leu Ala Ser
 1               5
```

<210> SEQ ID NO 16
<211> LENGTH: 9
<212> TYPE: PRT
<213> ORGANISM: Mus musculus

<400> SEQUENCE: 16

```
Ala Gln Asn Leu Glu Leu Pro Trp Thr
```

<210> SEQ ID NO 17
<211> LENGTH: 365
<212> TYPE: DNA
<213> ORGANISM: Mus musculus

<400> SEQUENCE: 17

```
gaggtgatgc tggtggagtc tggacctgag ctggtaaagc ctggggcttc agtgaagatg      60
tcctgcaagg cttctggata cacattcact agctctgtta tgcactgggt gaagcagaag     120
cctgggcagg gccttgagtg gattggaaat attaatcctt acaatgatgg aactaagtac     180
aatgagaagt tcaaaggcaa ggccacactg acttcagaca atcctccag cacagcctac      240 atggagctca gcagcctgac ctctgaggac tctgcggtct attactgtgc aagagaggga     300
atttactacg gtagtagtta tagggactac tggggccaag gcaccactgt caccgtctcc     360
tcggc                                                                  365
```

<210> SEQ ID NO 18
<211> LENGTH: 321
<212> TYPE: DNA
<213> ORGANISM: Mus musculus

<400> SEQUENCE: 18

```
gacacaactg tgacccagtc tcaaaaattc atgtccacat cattaggaga cagggtcagc      60
gtcacctgca aggccagtca gaatgtgggt aataatgtag cctggtatca acataaacca     120
gggcaatctc ctaaagcact gatttactcg gcatcctacc ggtacagtgg agtccctgat     180
cgcttcacag gcagtggatc tgggacagat ttcactctca ccatcagcaa tgtgcagtct     240
gaagacttgg cagagtattt ctgtcagcaa tataacagct atccattcac gttcggctcg     300
gggacaaaat tggaaataaa a                                                321
```

<210> SEQ ID NO 19
<211> LENGTH: 362
<212> TYPE: DNA
<213> ORGANISM: Mus musculus

<400> SEQUENCE: 19

```
gatgtgcagc ttcaggagtc aggacctagc ctcgtgaagc cttctcaggc tctgtccctc      60
acctgttctg tcactggcga ctccatcacc agtggttact ggaactggat ccggaaattc     120
ccagggaata aacttgaata cttggggtac ataagctaca gtggtagcac ttactacaat     180
ccgtctctca aaagtcgaat ctccatcact cgagacacat ccaagaacca gttctacctg     240
cagttgaatt ctatgactac tgaggacaca gccacatatt tttgtgtaag atatccctac     300
aatgggcaca acggctactt ggactactgg ggccaaggca ccactctcac tgtctctgcg     360
gc                                                                     362
```

<210> SEQ ID NO 20
<211> LENGTH: 336
<212> TYPE: DNA
<213> ORGANISM: Mus musculus

<400> SEQUENCE: 20

```
gatgttgtga tgacccaggc tacattctcc aatccagtca ctcttggaac atcagcttcc      60
atctcctgca ggtctagtaa gagtctccta catagaaatg gcatcactta tttgtattgg     120
tttctgcaga agccaggcca gtctcctcag ctcctgattt atcagatgtc caaccttgcc     180
```

```
tcaggagtcc cagacaggtt cagtagcagt gggtcaggaa ctgatttcac actgagaatc    240
agcagagtgg aggctgagga tgtgggtgtt tattactgtg ctcaaaatct agaacttcct    300
tggacgttcg gtggaggcac caagctggaa ataaaa                              336
```

```
<210> SEQ ID NO 21
<211> LENGTH: 50
<212> TYPE: DNA
<213> ORGANISM: Artificial Sequence
<220> FEATURE:
<223> OTHER INFORMATION: primer

<400> SEQUENCE: 21
ctagtagcaa ctgcaaccgg tgtacattct gargtgmagc tgktggagac               50

<210> SEQ ID NO 22
<211> LENGTH: 50
<212> TYPE: DNA
<213> ORGANISM: Artificial Sequence
<220> FEATURE:
<223> OTHER INFORMATION: primer

<400> SEQUENCE: 22
ctagtagcaa ctgcaaccgg tgtacattct caggtgcaam tgmagsagtc               50

<210> SEQ ID NO 23
<211> LENGTH: 50
<212> TYPE: DNA
<213> ORGANISM: Artificial Sequence
<220> FEATURE:
<223> OTHER INFORMATION: primer

<400> SEQUENCE: 23
ctagtagcaa ctgcaaccgg tgtacattct gavgtgmwgc tggtggagtc               50

<210> SEQ ID NO 24
<211> LENGTH: 50
<212> TYPE: DNA
<213> ORGANISM: Artificial Sequence
<220> FEATURE:
<223> OTHER INFORMATION: primer

<400> SEQUENCE: 24
ctagtagcaa ctgcaaccgg tgtacattct caggttaytc tgaaagagtc               50

<210> SEQ ID NO 25
<211> LENGTH: 50
<212> TYPE: DNA
<213> ORGANISM: Artificial Sequence
<220> FEATURE:
<223> OTHER INFORMATION: primer

<400> SEQUENCE: 25
ctagtagcaa ctgcaaccgg tgtacattct gakgtgcagc ttcagsagtc               50

<210> SEQ ID NO 26
<211> LENGTH: 50
<212> TYPE: DNA
<213> ORGANISM: Artificial Sequence
<220> FEATURE:
<223> OTHER INFORMATION: primer

<400> SEQUENCE: 26
ctagtagcaa ctgcaaccgg tgtacattct cagatccagt tsgygcagtc               50
```

<210> SEQ ID NO 27
<211> LENGTH: 49
<212> TYPE: DNA
<213> ORGANISM: Artificial Sequence
<220> FEATURE:
<223> OTHER INFORMATION: primer

<400> SEQUENCE: 27
ctagtagcaa ctgcaaccgg tgtacattct cagrtccaac tgcagcagy                49

<210> SEQ ID NO 28
<211> LENGTH: 50
<212> TYPE: DNA
<213> ORGANISM: Artificial Sequence
<220> FEATURE:
<223> OTHER INFORMATION: primer

<400> SEQUENCE: 28
ctagtagcaa ctgcaaccgg tgtacattct gaggtgmagc tasttgagwc                50

<210> SEQ ID NO 29
<211> LENGTH: 50
<212> TYPE: DNA
<213> ORGANISM: Artificial Sequence
<220> FEATURE:
<223> OTHER INFORMATION: primer

<400> SEQUENCE: 29
ctagtagcaa ctgcaaccgg tgtacattct gaagtgaagm ttgaggagtc                50

<210> SEQ ID NO 30
<211> LENGTH: 50
<212> TYPE: DNA
<213> ORGANISM: Artificial Sequence
<220> FEATURE:
<223> OTHER INFORMATION: primer

<400> SEQUENCE: 30
ctagtagcaa ctgcaaccgg tgtacattct cagatkcagc ttmaggagtc                50

<210> SEQ ID NO 31
<211> LENGTH: 50
<212> TYPE: DNA
<213> ORGANISM: Artificial Sequence
<220> FEATURE:
<223> OTHER INFORMATION: primer

<400> SEQUENCE: 31
ctagtagcaa ctgcaaccgg tgtacattct caggcttatc tgcagcagtc                50

<210> SEQ ID NO 32
<211> LENGTH: 50
<212> TYPE: DNA
<213> ORGANISM: Artificial Sequence
<220> FEATURE:
<223> OTHER INFORMATION: primer

<400> SEQUENCE: 32
ctagtagcaa ctgcaaccgg tgtacattct caggttcacc tacaacagtc                50

<210> SEQ ID NO 33
<211> LENGTH: 50
<212> TYPE: DNA
<213> ORGANISM: Artificial Sequence
<220> FEATURE:
<223> OTHER INFORMATION: primer

```
<400> SEQUENCE: 33
ctagtagcaa ctgcaaccgg tgtacattct caggtgcagc ttgtagagac            50

<210> SEQ ID NO 34
<211> LENGTH: 50
<212> TYPE: DNA
<213> ORGANISM: Artificial Sequence
<220> FEATURE:
<223> OTHER INFORMATION: primer

<400> SEQUENCE: 34
ctagtagcaa ctgcaaccgg tgtacattct gargtgmagc tgktggagac            50

<210> SEQ ID NO 35
<211> LENGTH: 48
<212> TYPE: DNA
<213> ORGANISM: Artificial Sequence
<220> FEATURE:
<223> OTHER INFORMATION: primer

<400> SEQUENCE: 35
ggaagaccga tgggcccttg gtcgacgccg aggagacggt gacmgtgg              48

<210> SEQ ID NO 36
<211> LENGTH: 48
<212> TYPE: DNA
<213> ORGANISM: Artificial Sequence
<220> FEATURE:
<223> OTHER INFORMATION: primer

<400> SEQUENCE: 36
ggaagaccga tgggcccttg gtcgacgccg cagagacagt gaccagag              48

<210> SEQ ID NO 37
<211> LENGTH: 48
<212> TYPE: DNA
<213> ORGANISM: Artificial Sequence
<220> FEATURE:
<223> OTHER INFORMATION: primer

<400> SEQUENCE: 37
ggaagaccga tgggcccttg gtcgacgccg aggagactgt gagastgg              48

<210> SEQ ID NO 38
<211> LENGTH: 50
<212> TYPE: DNA
<213> ORGANISM: Artificial Sequence
<220> FEATURE:
<223> OTHER INFORMATION: primer

<400> SEQUENCE: 38
ctagtagcaa ctgcaaccgg tgtacattct gacawtgttc tcacccagtc            50

<210> SEQ ID NO 39
<211> LENGTH: 50
<212> TYPE: DNA
<213> ORGANISM: Artificial Sequence
<220> FEATURE:
<223> OTHER INFORMATION: primer

<400> SEQUENCE: 39
ctagtagcaa ctgcaaccgg tgtacattct gacatccaga tgacacagwc            50

<210> SEQ ID NO 40
```

```
<211> LENGTH: 50
<212> TYPE: DNA
<213> ORGANISM: Artificial Sequence
<220> FEATURE:
<223> OTHER INFORMATION: primer

<400> SEQUENCE: 40
ctagtagcaa ctgcaaccgg tgtacattct gatrttgtga tgacccagwc        50

<210> SEQ ID NO 41
<211> LENGTH: 50
<212> TYPE: DNA
<213> ORGANISM: Artificial Sequence
<220> FEATURE:
<223> OTHER INFORMATION: primer

<400> SEQUENCE: 41
ctagtagcaa ctgcaaccgg tgtacattct gacattstgm tgacccagtc        50

<210> SEQ ID NO 42
<211> LENGTH: 50
<212> TYPE: DNA
<213> ORGANISM: Artificial Sequence
<220> FEATURE:
<223> OTHER INFORMATION: primer

<400> SEQUENCE: 42
ctagtagcaa ctgcaaccgg tgtacattct gatgttgtgv tgacccaaac        50

<210> SEQ ID NO 43
<211> LENGTH: 50
<212> TYPE: DNA
<213> ORGANISM: Artificial Sequence
<220> FEATURE:
<223> OTHER INFORMATION: primer

<400> SEQUENCE: 43
ctagtagcaa ctgcaaccgg tgtacattct gacacaactg tgacccagtc        50

<210> SEQ ID NO 44
<211> LENGTH: 50
<212> TYPE: DNA
<213> ORGANISM: Artificial Sequence
<220> FEATURE:
<223> OTHER INFORMATION: primer

<400> SEQUENCE: 44
ctagtagcaa ctgcaaccgg tgtacattct gayattktgc tcactcagtc        50

<210> SEQ ID NO 45
<211> LENGTH: 50
<212> TYPE: DNA
<213> ORGANISM: Artificial Sequence
<220> FEATURE:
<223> OTHER INFORMATION: primer

<400> SEQUENCE: 45
ctagtagcaa ctgcaaccgg tgtacattct gatattgtga tracccaggm        50

<210> SEQ ID NO 46
<211> LENGTH: 50
<212> TYPE: DNA
<213> ORGANISM: Artificial Sequence
<220> FEATURE:
<223> OTHER INFORMATION: primer

<400> SEQUENCE: 46
```
ctagtagcaa ctgcaaccgg tgtacattct gacattgtaa tgacccaatc     50

<210> SEQ ID NO 47
<211> LENGTH: 50
<212> TYPE: DNA
<213> ORGANISM: Artificial Sequence
<220> FEATURE:
<223> OTHER INFORMATION: primer

<400> SEQUENCE: 47
ctagtagcaa ctgcaaccgg tgtacattct gacattgtga tgwcacagtc     50

<210> SEQ ID NO 48
<211> LENGTH: 50
<212> TYPE: DNA
<213> ORGANISM: Artificial Sequence
<220> FEATURE:
<223> OTHER INFORMATION: primer

<400> SEQUENCE: 48
ctagtagcaa ctgcaaccgg tgtacattct gatrtccaga tgamccagtc     50

<210> SEQ ID NO 49
<211> LENGTH: 50
<212> TYPE: DNA
<213> ORGANISM: Artificial Sequence
<220> FEATURE:
<223> OTHER INFORMATION: primer

<400> SEQUENCE: 49
ctagtagcaa ctgcaaccgg tgtacattct gatggagaaa caacacaggc     50

<210> SEQ ID NO 50
<211> LENGTH: 49
<212> TYPE: DNA
<213> ORGANISM: Artificial Sequence
<220> FEATURE:
<223> OTHER INFORMATION: primer

<400> SEQUENCE: 50
ctagtagcaa ctgcaaccgg tgtacattct gacgctgttg tgactcagg     49

<210> SEQ ID NO 51
<211> LENGTH: 50
<212> TYPE: DNA
<213> ORGANISM: Artificial Sequence
<220> FEATURE:
<223> OTHER INFORMATION: primer

<400> SEQUENCE: 51
ctagtagcaa ctgcaaccgg tgtacattct gaccytgtgc tcactcagtc     50

<210> SEQ ID NO 52
<211> LENGTH: 42
<212> TYPE: DNA
<213> ORGANISM: Artificial Sequence
<220> FEATURE:
<223> OTHER INFORMATION: primer

<400> SEQUENCE: 52
gaagacagat ggtgcagcca ccgtacgttt tatttccagc tt     42

<210> SEQ ID NO 53
<211> LENGTH: 44
<212> TYPE: DNA

```
<213> ORGANISM: Artificial Sequence
<220> FEATURE:
<223> OTHER INFORMATION: primer

<400> SEQUENCE: 53
gaagacagat ggtgcagcca ccgtacgttt tatttccaat tttg                44

<210> SEQ ID NO 54
<211> LENGTH: 47
<212> TYPE: DNA
<213> ORGANISM: Artificial Sequence
<220> FEATURE:
<223> OTHER INFORMATION: primer

<400> SEQUENCE: 54
gaagacagat ggtgcagcca ccgtacggcc taggacagtc amcytgg             47
```